(12) United States Patent
Takaoka

(10) Patent No.: US 9,561,612 B2
(45) Date of Patent: *Feb. 7, 2017

(54) METHOD FOR MANUFACTURING THREE-DIMENSIONAL NETTED STRUCTURE

(71) Applicant: C-ENG CO., LTD., Gamagori-shi, Aichi-ken (JP)

(72) Inventor: Nobuyuki Takaoka, Gamagori (JP)

(73) Assignee: C-ENG CO., LTD., Gamagori-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,646

(22) Filed: Sep. 14, 2015

(65) Prior Publication Data

US 2016/0263802 A1   Sep. 15, 2016

Related U.S. Application Data

(63) Continuation of application No. 14/050,417, filed on Oct. 10, 2013, now Pat. No. 9,174,404, which is a
(Continued)

(30) Foreign Application Priority Data

| Mar. 15, 2000 | (JP) | 2000-072977 |
|---|---|---|
| Sep. 14, 2000 | (JP) | 2000-279721 |
| Sep. 14, 2000 | (JP) | 2000-279792 |
| Sep. 18, 2000 | (JP) | 2000-281309 |
| Sep. 18, 2000 | (JP) | 2000-281319 |
| Sep. 18, 2000 | (JP) | 2000-281329 |

(Continued)

(51) Int. Cl.
*B29C 47/00*   (2006.01)
*B29D 28/00*   (2006.01)
(Continued)

(52) U.S. Cl.
CPC ........... *B29C 47/0014* (2013.01); *B29C 43/22* (2013.01); *B29C 47/0033* (2013.01);
(Continued)

(58) Field of Classification Search
USPC ..... 264/171.12, 171.2, 171.18; 428/218, 220
See application file for complete search history.

(56) References Cited

U.S. PATENT DOCUMENTS

| 7,625,629 B2 * | 12/2009 | Takaoka | B29C 43/02 264/171.2 |
| 8,563,121 B2 * | 10/2013 | Takaoka | B29C 43/22 264/171.12 |

(Continued)

*Primary Examiner* — Lynda Salvatore
(74) *Attorney, Agent, or Firm* — Matthias Scholl, PC; Matthias Scholl

(57) ABSTRACT

A three-dimensional netted structure having an upper surface, a lower surface, two side surfaces a left end surface, and a right end surface, including at least a plurality of filaments helically and randomly entangled and thermally bonded together, wherein the filaments are formed out of a thermoplastic resin by extrusion molding followed by cooling with a liquid; and the netted structure is four-surface molded, the upper surface, the lower surface and the two side surfaces being molded. An apparatus and a method for manufacturing the three-dimensional netted structure.

4 Claims, 35 Drawing Sheets

Related U.S. Application Data continuation-in-part of application No. 12/497,567, filed on Jul. 3, 2009, now Pat. No. 8,563,121, and a continuation-in-part of application No. 13/344,653, filed on Jan. 6, 2012, now Pat. No. 8,757,996, which is a continuation-in-part of application No. 12/497,567, filed on Jul. 3, 2009, now Pat. No. 8,563,121, said application No. 14/050,417 is a continuation-in-part of application No. 13/570,880, filed on Aug. 9, 2012, now Pat. No. 8,563,123, which is a continuation of application No. 12/497,567, filed on Jul. 3, 2009, now Pat. No. 8,563,121, said application No. 14/050,417 is a continuation-in-part of application No. 13/600,279, filed on Aug. 31, 2012, now Pat. No. 8,828,293, which is a continuation-in-part of application No. 12/497,567, filed on Jul. 3, 2009, now Pat. No. 8,563,121, said application No. 14/050,417 is a continuation-in-part of application No. 13/600,304, filed on Aug. 31, 2012, now Pat. No. 8,568,635, which is a continuation-in-part of application No. 12/497,567, filed on Jul. 3, 2009, now Pat. No. 8,563,121, which is a continuation-in-part of application No. 10/221,568, filed as application No. PCT/JP01/02046 on Mar. 15, 2001, now Pat. No. 7,625,629.

(30) Foreign Application Priority Data

| | | |
|---|---|---|
| Sep. 18, 2000 | (JP) | 2000-281341 |
| Sep. 20, 2000 | (JP) | 2000-285855 |

(51) Int. Cl.

| | |
|---|---|
| B29C 47/08 | (2006.01) |
| B29C 47/12 | (2006.01) |
| B29C 47/30 | (2006.01) |
| B29C 47/34 | (2006.01) |
| B29C 43/22 | (2006.01) |
| D04H 3/10 | (2012.01) |
| D04H 3/011 | (2012.01) |
| D04H 3/033 | (2012.01) |
| D04H 3/037 | (2012.01) |
| B29L 31/30 | (2006.01) |
| B29K 105/10 | (2006.01) |
| B29L 28/00 | (2006.01) |
| B29L 31/00 | (2006.01) |
| B29C 47/02 | (2006.01) |
| B29K 23/00 | (2006.01) |
| B29K 25/00 | (2006.01) |
| B29K 27/06 | (2006.01) |
| B29K 67/00 | (2006.01) |
| B29K 77/00 | (2006.01) |
| B29C 47/88 | (2006.01) |
| B29K 105/06 | (2006.01) |
| B29K 105/26 | (2006.01) |
| B29C 43/34 | (2006.01) |
| B29C 43/46 | (2006.01) |
| B29K 105/08 | (2006.01) |
| B29K 101/12 | (2006.01) |

(52) U.S. Cl.
CPC ........ *B29C 47/0038* (2013.01); *B29C 47/084* (2013.01); *B29C 47/12* (2013.01); *B29C 47/126* (2013.01); *B29C 47/30* (2013.01); *B29C 47/34* (2013.01); *B29C 47/8895* (2013.01); *B29D 28/005* (2013.01); *D04H 3/011* (2013.01); *D04H 3/033* (2013.01); *D04H 3/037* (2013.01); *D04H 3/10* (2013.01); *B29C 47/004* (2013.01); *B29C 47/02* (2013.01); *B29C 47/8815* (2013.01); *B29C 2043/3416* (2013.01); *B29C 2043/3433* (2013.01); *B29C 2043/463* (2013.01); *B29C 2043/464* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2077/00* (2013.01); *B29K 2101/12* (2013.01); *B29K 2105/06* (2013.01); *B29K 2105/0854* (2013.01); *B29K 2105/10* (2013.01); *B29K 2105/26* (2013.01); *B29L 2028/00* (2013.01); *B29L 2031/3041* (2013.01); *B29L 2031/731* (2013.01)

(56) References Cited

U.S. PATENT DOCUMENTS

| | | | | |
|---|---|---|---|---|
| 8,563,123 B2 * | 10/2013 | Takaoka | ................... | B29C 43/22 264/171.12 |
| 8,568,635 B2 * | 10/2013 | Takaoka | ................... | B29C 43/22 264/171.12 |
| 8,757,996 B2 * | 6/2014 | Takaoka | ................... | B29C 43/22 264/171.12 |
| 8,828,293 B2 * | 9/2014 | Takaoka | ................... | B29C 43/22 264/112 |
| 9,174,404 B2 * | 11/2015 | Takaoka | ............... | B29D 28/005 |

\* cited by examiner

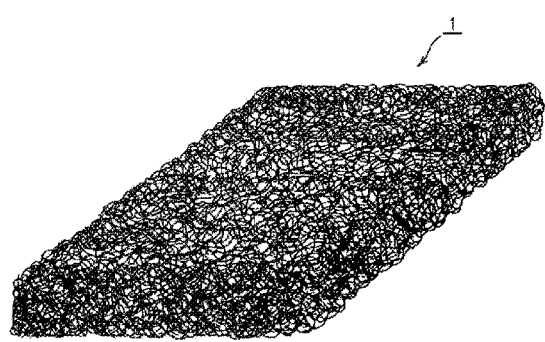
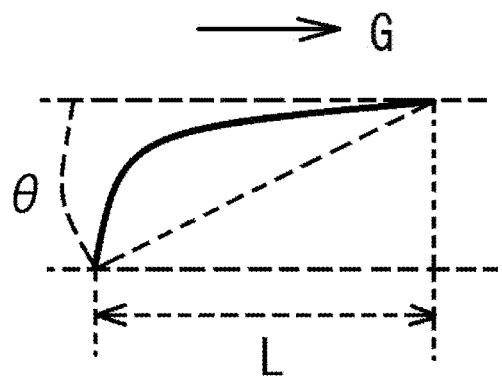
FIG. 1A    FIG. 1B
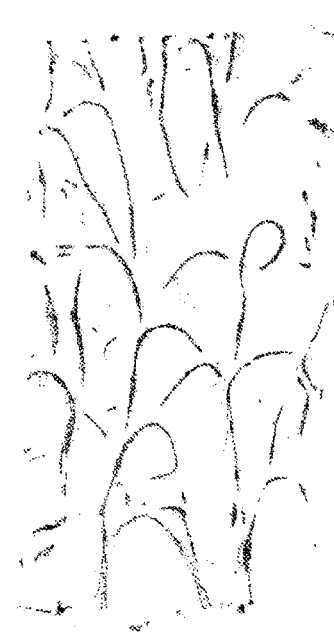
FIG. 1C    FIG. 1D    FIG. 1E

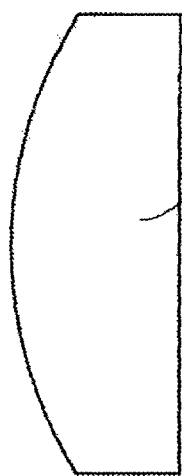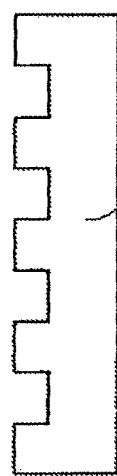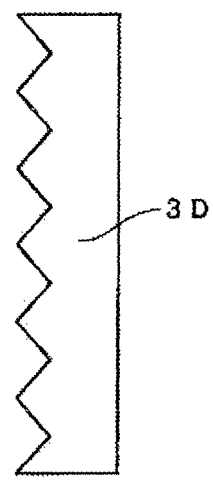
FIG. 4A  FIG. 4B  FIG. 4C  FIG. 4D

FIG. 4E  FIG. 4F  FIG. 4G

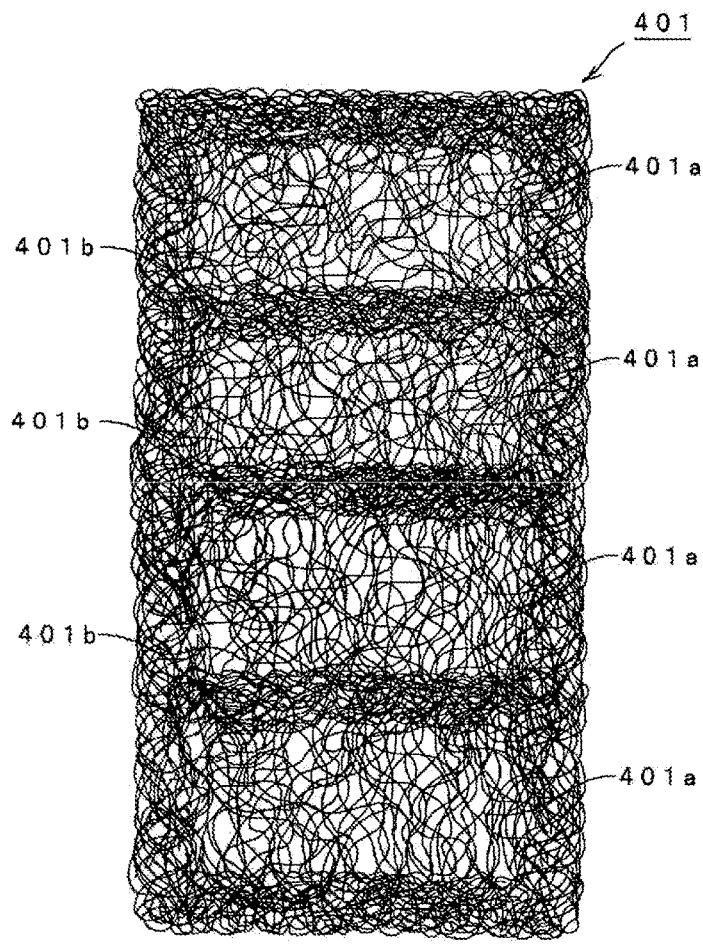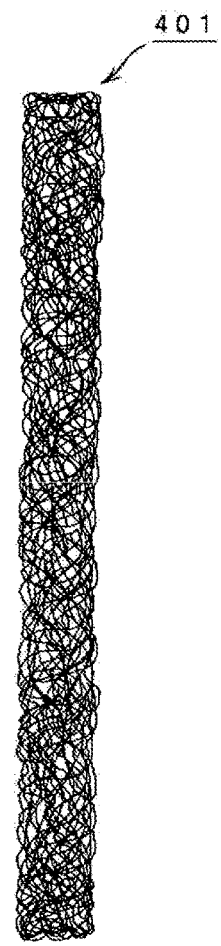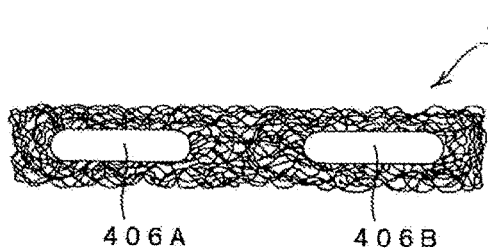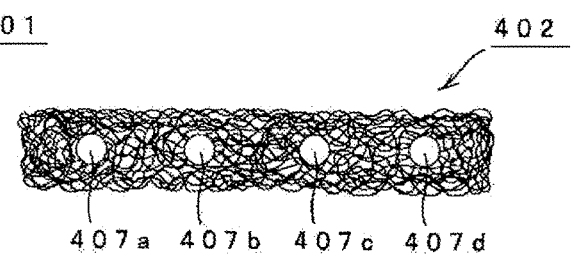
FIG. 23A  FIG. 23C
FIG. 23B  FIG. 23D

METHOD FOR MANUFACTURING THREE-DIMENSIONAL NETTED STRUCTURE

CROSS-REFERENCE TO RELATED APPLICATIONS

This Application is a continuation of, and claims domestic priority benefits to U.S. patent application Ser. No. 14/050,417, filed Oct. 10, 2013, issued as U.S. Pat. No. 9,174,404 on Nov. 3, 2015. U.S. patent application Ser. No. 14/050,417, filed Oct. 10, 2013, issued as U.S. Pat. No. 9,174,404 on Nov. 3, 2015, is a continuation-in-part of, and claims domestic priority benefits to U.S. patent application Ser. No. 12/497,567, filed Jul. 3, 2009, issued as U.S. Pat. No. 8,563,121 on Oct. 22, 2013. U.S. patent application Ser. No. 14/050,417, filed Oct. 10, 2013, issued as U.S. Pat. No. 9,174,404 on Nov. 3, 2015, is also a continuation-in-part of, and claims domestic priority benefits to U.S. patent application Ser. No. 13/344,653, filed Jan. 6, 2012, issued as U.S. Pat. No. 8,757,996 on Jun. 24, 2014, which is a continuation-in-part of U.S. patent application Ser. No. 12/497,567, filed Jul. 3, 2009, issued as U.S. Pat. No. 8,563,121 on Oct. 22, 2013. U.S. patent application Ser. No. 14/050,417, filed Oct. 10, 2013, issued as U.S. Pat. No. 9,174,404 on Nov. 3, 2015, is also a continuation-in-part of, and claims domestic priority benefits to U.S. patent application Ser. No. 13/570,880, filed Aug. 9, 2012, issued as U.S. Pat. No. 8,563,123 on Oct. 22, 2013, which is a continuation of U.S. patent application Ser. No. 12/497,567, filed Jul. 3, 2009, issued as U.S. Pat. No. 8,563,121 on Oct. 22, 2013. U.S. patent application Ser. No. 14/050,417, filed Oct. 10, 2013, issued as U.S. Pat. No. 9,174,404 on Nov. 3, 2015, is also a continuation-in-part of, and claims domestic priority benefits to U.S. patent application Ser. No. 13/600,279, filed Aug. 31, 2012, issued as U.S. Pat. No. 8,828,293 on Sep. 9, 2014, which is a continuation-in-part of U.S. patent application Ser. No. 12/497,567, filed Jul. 3, 2009, issued as U.S. Pat. No. 8,563,121 on Oct. 22, 2013. U.S. patent application Ser. No. 14/050,417, filed Oct. 10, 2013, issued as U.S. Pat. No. 9,174,404 on Nov. 3, 2015, is also a continuation-in-part of, and claims domestic priority benefits to U.S. patent application Ser. No. 13/600,304, filed Aug. 31, 2012, issued as U.S. Pat. No. 8,568,635 on Oct. 29, 2013, which is a continuation-in-part of U.S. patent application Ser. No. 12/497,567, filed Jul. 3, 2009, issued as U.S. Pat. No. 8,563,121 on Oct. 22, 2013. U.S. patent application Ser. No. 12/497,567, filed Jul. 3, 2009, issued as U.S. Pat. No. 8,563,121 on Oct. 22, 2013, is a continuation-in-part of U.S. patent application Ser. No. 10/221,568 filed on Sep. 13, 2002, issued as U.S. Pat. No. 7,625,629 on Dec. 1, 2009, which is a National Stage Appl. filed under 35 USC 371 of Int'l Pat. Appl. No. PCT/JP2001/002046 filed on Mar. 15, 2001. This application claims foreign priority benefits to Japanese Pat. Appl. Nos. 2000-072977 filed Mar. 15, 2000, 2000-279721 filed Sep. 14, 2000, 2000-279792 filed Sep. 14, 2000, 2000-281309 filed Sep. 18, 2000, 2000-281319 filed Sep. 18, 2000, 2000-281329 filed Sep. 18, 2000, 2000-281341 filed Sep. 18, 2000, and 2000-285855 filed Sep. 20, 2000. The contents of all of the aforementioned applications, including any intervening amendments thereto, are incorporated herein by reference in their entirety.

BACKGROUND OF THE INVENTION

Field of the Invention

This invention relates to a three-dimensional netted structure used for a cushioning material and the like, and a method of and an apparatus for manufacturing the same.

Brief Description of the Related Arts

Known methods of manufacturing a void-carrying three-dimensional netted structure include a method disclosed in Japanese Patent Publication KOKOKU No. 550-39185, or a method disclosed in Japanese Patent Laid-Open KOKAI No. S60-11352, etc., which is adapted to manufacture resin cotton on which polyester fibers are bonded with a bonding agent made of, for example, a rubber-based material. There are also methods of or apparatuses for manufacturing a void-carrying three-dimensional netted structure by entangling resin threads by endless belts, and such methods or apparatuses include the invention disclosed in Japanese Patent Laid-Open KOKAI No. H11-241264, etc.

However, the demands for a product of such a three-dimensional netted structure have been diversified. It is necessary that each of netted structures manufactured be finished to one of different shapes by cutting or molding the netted structures to demanded shapes in a later stage of the manufacturing stage. This causes a product finishing operation to become very complicated.

A three-dimensional netted structure manufactured by a prior art method becomes low in density in some cases. Since both surface portions of a bundle contact belt conveyors, outer surfaces of the bundle are substantially flattened. However, left and right end surfaces of the bundle have an irregular, helical shape, and side surfaces thereof have a laterally wavy non-straight shape.

The endless belts mentioned above by which a resin threads are entangled is liable to be damaged due to the heat, etc., so that there is a fear of encountering a problem concerning the durability of the endless belts.

Therefore, the invention provides a method of and an apparatus for manufacturing a three-dimensional netted structure, capable of rendering it unnecessary to carry out a finishing operation in a later stage, improving the degree of straightness of the side surfaces of the netted structure, meeting a demand for finishing the netted structure to modified shapes, and improving the durability of the netted structure.

SUMMARY OF THE INVENTION

In view of these various problems, in certain embodiments, the invention is directed to a three-dimensional netted structure having an upper surface, a lower surface, two side surfaces, a left end surface, and a right end surface, the structure comprising a plurality of filaments helically and randomly entangled and thermally bonded together, wherein the filaments are formed out of a thermoplastic resin by extrusion molding followed by cooling in a liquid. The structure is four-surface molded, the upper surface, the lower surface and the two side surfaces being molded; and the structure has a pattern of sparse and dense portions arranged in surfaces, wherein four surfaces of an outer peripheral region of the structure that are in parallel to an extruding direction have a higher density than a density of remaining portions of the structure. The pattern of sparse and dense portions is formed by cooling in a liquid. An apparent density of the sparse portion is between 0.01 and 0.09 g/cm$^3$, and an apparent density of the dense portion is between 0.030 and 0.1 g/cm$^3$, the ratio of the apparent density of the dense portion to the sparse portion is between 2.2 and 8 thereby obtaining high tensile strength. A netted structure having an apparent density between 0.008 to 0.9 g/cm³ and preferably 0.02 to 0.20 g/cm³ in a whole cushion. The experimentally measured diameter of a filament on the surface side is preferably between 0.55 mm and 0.85 mm (density measurement).

In particular provided is a method of manufacturing a three-dimensional netted structure, the method comprising: extruding molten filaments of a thermoplastic resin downward from a die via a mouthpiece of the die having a plurality of holes, whereby the filaments drop under the force of gravity in between chutes and a pair of drawing-down units, the drawing-down units being submerged or partly-submerged in a liquid, wherein a distance between upper parts of the chutes is wider than a width of an assembly of the extruded filaments, and a distance between lower parts of the chutes and a distance between the drawing-down units are smaller than the width of the assembly of the extruded filaments; flowing the filaments along a liquid layer formed on the chutes to form loops in the filaments, contacting adjacent filaments with each other, entangling the filaments with each other, and dropping the filaments in-between the drawing-down units; drawing down the assembly of extruded filaments at a speed lower than the filament dropping speed by the drawing-down units, wherein four surfaces of the assembly of the filaments are contacting the chutes and a pair of the drawing-down units before or after the drawing-down units are submerged; and cooling the resultant filaments with a liquid.

In particular provided is a method of manufacturing a three-dimensional netted structure, the method comprising: a) extruding filaments of a thermoplastic resin downward from a die via a mouthpiece of the die, the mouthpiece having a plurality of holes, whereby the filaments drop in between drawing-down units under a force of gravity at a dropping speed and form an assembly of filaments, the drawing-down units being submerged or partly-submerged in a liquid, wherein a distance between the drawing-down units is smaller than a width of the assembly of filaments; b) drawing down the assembly of filaments at a speed lower than the dropping speed by the drawing-down units, and contacting and compressing four surfaces of the assembly of filaments by the drawing-down units, whereby the four surfaces are formed to be flat, and a density of regions of the assembly of filaments which extend a predetermined distance from the four surfaces into an inner portion of the assembly of filaments is higher than a density of the inner portion; and c) cooling the assembly of filaments in a liquid.

In a class of this embodiment, the mouthpiece further comprises a slit extending in a lengthwise direction of the mouthpiece whereby the three-dimensional netted structure further comprises a substantially non-void-carrying sheet which forms a wavy shape in a direction in which the thermoplastic resin is extruded.

In a class of this embodiment, after extruding the filaments of the thermoplastic resin downward from the die via the mouthpiece, the filaments flow along a liquid layer formed on a chute to form loops in the filaments, and the filaments contact one another and become entangled with one another.

In particular, provided is a three-dimensional netted structure having a netted structure being manufactured by preparing a thermoplastic resin as a raw material or a main raw material, wherein the resin is formed into a plurality of helically and randomly entangled, partly and thermally bonded filaments by extrusion molding; and the resultant filaments are cooled with a liquid so as to obtain a netted structure having hollow portions arranged continuously in the material extruding direction, the structure is a three-dimensional plate type netted structure that the apparent density is 0.008 to 0.9 g/cm³, having regenerated members inserted in the hollow portions.

In particular, provides is a three-dimensional netted structure comprising: a netted structure being manufactured by preparing a thermoplastic resin as a raw material or a main raw material; and a plurality of hollow portions which are spaced apart and formed in the netted structure, wherein the hollow portions extend within the netted structure from one end to another end of the netted structure, wherein the resin is formed into a plurality of helically and randomly entangled, partly and thermally bonded filaments by extrusion molding, wherein the filaments are cooled with a liquid so as to obtain the a netted structure having the hollow portions arranged continuously in a material extruding direction, and wherein the netted structure is a three-dimensional plate type netted structure having an apparent density of 0.008 to 0.9 g/cm³.

In other embodiments, the invention is directed to a three-dimensional netted structure manufactured by preparing a thermoplastic resin as a raw material or a main raw material; forming the resin into a plurality of helically and randomly entangled, partly and thermally bonded filaments by extrusion molding; and cooling the resultant filaments with a liquid so as to obtain a netted structure having hollow portions arranged in the material extruding direction. This enables the hollow portions to be utilized effectively by inserting other members therein or by using the hollow portions in a different manner, and the netted structure to be thereby applied to various uses.

In particular provided is a three-dimensional netted structure having a netted structure being manufactured by preparing a thermoplastic resin as a raw material or a main raw material, wherein the resin is formed into a plurality of helically and randomly entangled, partly and thermally bonded filaments by extrusion molding; and the resultant filaments are cooled with a liquid so as to obtain a sheet having a percentage of void of zero continuously in the material extruding direction, forming the sheet into wavy shape in the material extruding direction, the structure is a three-dimensional plate type netted structure that the apparent density is 0.008 to 0.9 g/cm³.

In particular provided is a three-dimensional netted structure comprising: a netted structure being manufactured by preparing a thermoplastic resin as a raw material or a main raw material; and a sheet which is included in an internal portion of the netted structure, wherein the sheet is formed in a wavy pattern and extends from one end to another end of the netted structure, wherein the resin is formed into a plurality of helically and randomly entangled, partly and thermally bonded filaments by extrusion molding, wherein the resultant filaments are cooled with a liquid so as to obtain a netted structure which includes the sheet having a percentage of void of zero continuously in a material extruding direction, thereby forming the sheet into the wavy pattern in the netted structure in the material extruding direction, and wherein the netted structure is a three-dimensional plate type netted structure having an apparent density of 0.008 to 0.9 g/cm³.

In other embodiments, the invention is described to a three-dimensional netted structure manufactured by preparing a thermoplastic resin as a raw material or a main raw material; forming the resin into a plurality of helically and randomly entangled, partly and thermally bonded filaments by extrusion molding; and cooling the resultant filaments with a liquid so as to obtain a sheet having a percentage of void of substantially zero in the material extruding direction. This enables the soundproofing and shock absorbing performance of the sheet to be improved.

In other embodiments, the invention is directed to a three-dimensional netted structure manufactured by preparing a thermoplastic resin as a raw material or a main raw material; forming the resin into a plurality of helically and randomly entangled, partly and thermally bonded filaments by extrusion molding; and cooling the resultant filaments with a liquid so as to obtain a netted structure having not smaller than two separable regions. This enables the difficulty, which was encountered in a related art netted structure of this kind, in recycling a complex resin and the like to be overcome by providing the netted structure with not smaller than two separable regions.

In other embodiments, the invention is directed to a three-dimensional netted structure manufactured by preparing a thermoplastic resin as a raw material or a main raw material; forming the resin into a plurality of helically and randomly entangled, partly and thermally bonded filaments by extrusion molding; and cooling the resultant filaments with a liquid so as to obtain an insulating material or a sound absorbing material. This enables the netted structure to be used as a building material, an interior finishing material for automobiles, and materials for similar purposes.

In other embodiments, the invention is directed to a three-dimensional netted structure manufactured by preparing a thermoplastic resin as a raw material or a main raw material; forming the resin into a plurality of helically and randomly entangled, partly and thermally bonded filaments by extrusion molding; cooling the resultant filaments with a liquid; and applying a fire-resistant material to the cooled filaments or enclosing the cooled filaments with the same material or adding the same material to the cooled filaments. This enables the reliability of an interior heat insulating material, an exterior heat insulating material, an interior finishing material for a side wall and an interior finishing material for automobiles to be improved.

In other embodiments, the invention is directed to a three-dimensional netted structure manufactured by preparing a thermoplastic resin as a raw material or a main raw material; forming the resin into a plurality of helically and randomly entangled, party and thermally bonded filaments by extrusion molding; and cooling the resultant filaments with a liquid so as to obtain a seedbed for planting trees on a roof. This enables the recycling of the seedbed to be done, and the planting of trees on a roof to be promoted.

In other embodiments, the invention is directed to a three-dimensional netted structure manufactured by preparing a thermoplastic resin as a raw material or a main raw material; forming the resin into a plurality of helically and randomly entangled, partly and thermally bonded filaments by extrusion molding; and cooling the resultant filaments with a liquid so as to obtain a gardening cushioning material. This enables the netted structure to be used instead of a wooden trellis, and the durability thereof to be improved.

In other embodiments, the invention is directed to a three-dimensional netted structure manufactured by preparing a thermoplastic resin as a raw material or a main raw material; forming the resin into a plurality of helically and randomly entangled, partly and thermally bonded filaments by extrusion molding; and cooling the resultant filaments with a liquid so as to obtain a netted structure having polyhedral or miscellaneously shaped side surfaces.

In other embodiments, the invention is directed to a three-dimensional netted structure manufactured by preparing a regenerated thermoplastic resin, especially, polyethylene terephthalate as a raw material or a main raw material; forming the resin into a plurality of helically and randomly entangled, partly and thermally bonded filaments by extrusion molding; and cooling the resultant filaments with a liquid so as to obtain a recycled netted structure. This enables the recovery of polyethylene terephthalate bottles, etc. to be promoted.

In other embodiments, the invention is directed to a three-dimensional netted structure manufactured by preparing a brittleness-causing raw material-containing thermoplastic resin as a raw material or a main raw material; forming the resin into a plurality of helically and randomly entangled, partly and thermally bonded filaments by extrusion molding, and cooling the resultant filaments with a liquid so as to obtain a netted structure capable of being brittle fractured by applying an external force thereto. This enables a shock occurring due to the collision of a vehicle to break the texture of the three-dimensional netted structure, so that damage to a vehicle due to the collision thereof can be prevented.

In particular, provided is a three-dimensional netted structure having a netted structure being manufactured by preparing thermoplastic resin as a raw material or a main raw material containing a brittleness-causing raw material; wherein the resin is formed into a plurality of helically and randomly entangled, partly and thermally bonded filaments by extrusion molding; and the resultant filaments are cooled with a liquid so as to obtain a netted structure capable of being fractured by applying an external force thereto after cooling and hardening.

In particular, provided is a three-dimensional netted structure comprising: a netted structure being manufactured by preparing thermoplastic resin as a raw material or a main raw material containing a brittleness-causing raw material, wherein the resin is formed into a plurality of helically and randomly entangled, partly and thermally bonded filaments by extrusion molding, wherein the filaments are extruded along a plane in a single direction to form the netted structure, wherein the filaments upon being extruded are cooled with a liquid so as to obtain a netted structure having hardened filaments, and wherein the netted structure is brittle and can be fractured by applying an external force of a predetermined amount thereto.

In other embodiments, the invention is directed to a three-dimensional netted structure comprising: a netted structure being manufactured by preparing a thermoplastic resin as a raw material or a main raw material, wherein the netted structure includes an inner region having a predetermined apparent density and an outer peripheral region adjacent the inner region having an apparent density higher than the predetermined apparent density, wherein the resin is formed into a plurality of helically and randomly entangled, partly and thermally bonded filaments by extrusion molding, wherein the filaments are cooled with a liquid so as to obtain the netted structure having the inner region and the outer peripheral region arranged continuously in a material extruding direction, and wherein the netted structure is a three-dimensional plate type netted structure having the predetermined apparent density and the apparent density greater than the predetermined apparent density of 0.008 to 0.9 g/cm$^3$.

In other embodiments, the invention is directed to a three-dimensional netted structure formed out of a thermoplastic resin as a raw material or a main raw material by extrusion molding, in which a plurality of filaments are helically and randomly entangled and thermally bonded together and the resultant filaments are cooled with a liquid so as to obtain the netted structure having upper and lower surfaces, two side surfaces and left and right end surfaces; characterized in that the structure is four-surface molded wherein the upper and lower surfaces and the two side surfaces are molded.

In a class of this embodiment, the structure additionally comprises a substantially non-void-carrying sheet, which forms a wavy shape in the material extruding direction.

In a class of this embodiment, the apparent density of the netted structure is 0.008 to 0.9 g/cm$^3$.

In a class of this embodiment, the netted structure has sparse and dense portions arranged alternately in the material extruding direction.

In a class of this embodiment, the netted structure has a single or a plurality of beam-like high-density regions arranged in the direction of the thickness of the netted structure.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly-submerged drawing-down units; when a three-dimensional netted structure is manufactured by drawing the filaments between the drawing-down units at a speed lower than a filament dropping speed, a distance between the drawing-down units being set smaller than a width of an assembly of the extruded filaments, the drawing-down units being arranged so that at least three or four surfaces of the assembly of the filaments contact the drawing-down units before or after the drawing-down units are submerged. This renders it unnecessary to carry out a finishing operation in a later stage, and enables the degree of straightness of the side surfaces of the netted structure to be heightened.

In particular provided is an apparatus for manufacturing a three-dimensional netted structure having a netted structure being obtained by extruding molten filaments of a thermoplastic resin as a raw material or a main raw material, comprising: a die having a plurality of holes, the filaments being downward from the die; and drawing-down units partly-submerged in water, having the filaments drop naturally in between; wherein the drawing-down units draw the filaments in between at a speed lower than a filament dropping speed, a distance between the drawing-down units being set smaller than a width of an assembly of the extruded filaments, and the drawing-down units are arranged so that four surfaces of the assembly of the filaments contact the drawing-down units before or after the drawing-down units being submerged, driving systems of the opposite drawing-down units are formed by fixing.

In particular provided is an apparatus for manufacturing a three-dimensional netted structure, having a mouthpiece to extrude an filament assembly having continuous filaments downward, a pair of opposing chutes located below said mouthpiece along the width direction of said filament assembly and vertical to the thickness direction of said filament assembly, said chutes being inclined so that the distance between each said chute becomes narrower downward and toward the center of said filament assembly, water supplying units for supplying cooling water to cool said filament assembly downward on a surface of said chutes, water-permeable sheets for covering the surface of said chutes, fixing members for fixing said water-permeable sheets to said chutes, and drawing-down units located below said chutes to convey a netted structure ejected downward from said chutes in water; wherein said cooling water is supplied on the surface of said chutes, said cooling water flowing on the chutes receives the filaments in a surface part of said filament assembly to form loops and make the adjacent continuous filaments contact and be entangled with each other, and a level of said cooling water is above said lower end of said chutes.

In other embodiments, the invention is directed the apparatus for manufacturing a three-dimensional netted structure, wherein said water supplying units are located above said water-permeable sheets, and said cooling water spreads and flows on an upper surface of said water-permeable sheets.

In other embodiments, the invention is directed the apparatus for manufacturing a three-dimensional netted structure, wherein said water supplying units are located above said chutes and below said water-permeable sheets, said cooling water is supplied to a space between said chutes and said water-permeable sheets to form a lower cooling water layer, said cooling water permeates to an upper surface of the water-permeable sheets to form an upper cooling water layer and flow.

In other embodiments, the invention is directed the apparatus for manufacturing a three-dimensional netted structure, wherein said filament assembly is enclosed by said chute and said cooling water flows all of surface of said chute.

In other embodiments, the invention is directed the apparatus for manufacturing a three-dimensional netted structure, wherein said fixing members fix said water-permeable sheets to said chutes at an upper part and a lower part of the chute.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly-submerged rollers; and drawing the filaments between the rollers at a speed lower than a filament dropping speed, a distance between the rollers being set smaller than a width of an assembly of the extruded filaments, at least one surface of the assembly of the filaments contacting the rollers before or after the rollers are submerged. This enables the simplicity of the apparatus and the easiness of designing the apparatus to be attained.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly-submerged, slidable surface-carrying plate members a distance between which is set so as to decrease gradually in the downward direction; and drawing the resultant filaments between the plate members at a speed lower than a filament dropping speed, a distance between lower portions of the plate members being set smaller than a width of an assembly of the extruded filaments, at least one surface of the assembly of the filaments contacting the plate members before or after the plate members are submerged. This enables the miniaturization of the apparatus to be attained by reducing or omitting movable parts.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly submerged drawing-down units; and drawing the filaments between the drawing-down units at a speed lower than a filament dropping speed, a distance between the drawing-down units being set smaller than a width of an assembly of the extruded filaments, at least one surface of the assembly of the filaments contacting the drawing-down units before or after the drawing-down units are submerged, a cross section of outer circumferential members of the drawing-down units being set to modified shapes. This enables an operation in a later stage to be omitted.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly-submerged drawing-down units; and drawing the filaments between the drawing-down units at a speed lower than a filament dropping speed, a distance between the drawing-down units being set smaller than a width of an assembly of the extruded filaments, at least one surface of the assembly of the filaments contacting the drawing-down units before or after the drawing-down units are submerged, the die being provided with a complex die which has not smaller than two chambers and a plural-hole-carrying mouthpiece, the molten filaments of a thermoplastic resin, a raw material or a main raw material being extruded downward from the holes of the mouthpiece via different passages isolated from one another by partitions. This enables a separable three-dimensional netted structure to be manufactured.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly-submerged drawing-down units; and drawing the resultant filaments between the drawing-down units at a speed lower than a filament dropping speed, a distance between the drawing-down units being set smaller than a width of an assembly of the extruded filaments, at least one surface of the assembly of the filaments contacting the drawing-down units before or after the drawing-down units are submerged, the drawing-down units being provided with circumferentially moving members, which are provided at circumferences thereof with circumferentially extending metal nets or plate members. This enables the durability of the drawing-down units to be improved.

In other embodiments, the invention is directed to an apparatus for manufacturing a three-dimensional netted structure which is obtained by extruding molten filaments of a thermoplastic resin as a raw material or a main raw material downward from a die having a plurality of holes; having the filaments drop naturally between partly-submerged drawing-down units; and drawing the filaments between the drawing-down units at a speed lower than a filament dropping speed, a distance between the drawing-down units being set smaller than a width of an assembly of the extruded filaments, at least one surface of the assembly of the filaments contacting the drawing-down units before or after the drawing-down units are submerged, regions of a high density of holes and regions of a low density of holes being formed on a mouthpiece of the die. This enables the range of designing of the apparatus to be widened.

In other embodiments, the invention is directed to an apparatus for manufacturing a three-dimensional netted structure having a netted structure being obtained by extruding molten filaments of a thermoplastic resin as a raw material or a main raw material, comprising: a die having a plurality of holes, the filaments being downward from the die; and drawing-down units partly submerged in water, having the filaments drop naturally in between; and wherein the drawing-down units draw the filaments in between at a speed lower than a filament dropping speed, a distance between the drawing-down units is set smaller than a width of an assembly of the extruded filaments, at least one surface of the assembly of the filaments contact the drawing-down units before or after the drawing-down units being submerged, forming a slit in a suitable portion of a mouthpiece.

In other embodiments, the invention is directed to an apparatus for manufacturing a three-dimensional netted structure having a netted structure being obtained by extruding molten filaments of thermoplastic resin as a raw material or a main raw material containing a brittleness-causing raw material, comprising: a die having a plurality of holes, the filaments being downward from the die; and drawing-down units partly-submerged in water, having the filaments drop naturally in between; wherein the drawing-down units draw the filaments in between at a speed lower than a filament dropping speed, a distance between the drawing-down units being set smaller than a width of an assembly of the extruded filaments, and the drawing-down units are arranged so that at least one surface of the assembly of the filaments contact the drawing-down units before or after the drawing-down units being submerged, the netted structure capable of being fractured by applying an external force thereto.

In other embodiments, the invention is directed to an apparatus for manufacturing a three-dimensional netted structure, as described herein, having a netted structure being obtained by extruding molten filaments of a thermoplastic resin as a raw material or a main raw material, comprising: a die having a plurality of holes, the filaments being downward from the die; and drawing-down units partly-submerged in water, having the filaments drop naturally in between, wherein the drawing-down units draw the filaments in between at a speed lower than a filament dropping speed, a distance between the drawing-down units being set smaller than a width of an assembly of the extruded filaments, wherein the drawing-down units are arranged so that four surfaces of the assembly of the filaments contact the drawing-down units before or after the drawing-down units being submerged, wherein a curved plate extends between the die and the draw-down unit thereby introducing the filaments to the draw-down unit, and wherein the curved plate is given at their outer surfaces having a slidability, the curved plate is arranged so that a distance inbetween decreases from upper portions thereof toward lower portions thereof.

In other embodiments, the invention is directed to an apparatus for manufacturing a three-dimensional netted structure having a netted structure being obtained by extruding molten filaments of a thermoplastic resin as a raw material or a main raw material, the apparatus comprising: a die, a mouthpiece of the die having a plurality of holes, the filaments being extruded downward from the die via the mouthpiece; and drawing-down units partly-submerged in liquid, having the filaments drop in between; wherein the drawing-down units draw the filaments in between at a speed lower than the filament dropping speed, and the distance between the drawing-down units is set smaller than the width of the assembly of the extruded filaments, and wherein the drawing-down units are arranged so that four surfaces of the assembly of the filaments contact the drawing-down units before or after the drawing-down units are submerged.

In a class of this embodiment, the mouthpiece has a slit in addition to the plurality of holes, the slit extending in the lengthwise direction of the mouthpiece, whereby the three dimensional netted structure additionally comprises a substantially non-void-carrying sheet, the non-void-carrying sheet forming a wavy shape in the material extruding direction.

In another class of this embodiment, the mouthpiece has a region not provided with holes so as to make a hollow portion in the three-dimensional netted structure arranged in the material extruding direction.

In other embodiments, the invention is directed to an apparatus for manufacturing a three-dimensional netted structure, the netted structure comprising: a netted structure being manufactured by preparing a thermoplastic resin as a raw material or a main raw material; and a sheet which is included in an internal portion of the netted structure, wherein the sheet is formed in a wavy pattern and extends from one end to another end of the netted structure, wherein the resin is formed into a plurality of helically and randomly entangled, partly and thermally bonded filaments by extrusion molding, wherein the filaments are cooled with a liquid so as to obtain the netted structure which includes the sheet having a percentage of void of zero continuously in a material extruding direction, thereby forming the sheet into the wavy pattern in the netted structure in the material extruding direction, and wherein the netted structure is a three-dimensional plate type netted structure having an apparent density of 0.008 to 0.9 g/cm$^3$; the apparatus comprising: a die, a mouthpiece of the die having a plurality of holes, the filaments being extruded downward from the die via the mouthpiece; and drawing-down units partly-submerged in liquid, having the filaments drop in between; wherein the drawing-down units draw the filaments in between at a speed lower than the filament dropping speed, and the distance between the drawing-down units is set smaller than the width of the assembly of the extruded filaments, and wherein the drawing-down units are arranged so that four surfaces of the assembly of the filaments contact the drawing-down units before or after the drawing-down units are submerged.

In a class of this embodiment, the mouthpiece has a slit in addition to the plurality of holes, the slit extending in the lengthwise direction of the mouthpiece, whereby the three dimensional netted structure additionally comprises a substantially non-void-carrying sheet, the non-void-carrying sheet forming a wavy shape in the material extruding direction.

In another class of this embodiment, the mouthpiece has a region not provided with holes so as to make a hollow portion in the three-dimensional netted structure arranged in the material extruding direction.

In other embodiments, the invention is directed to an apparatus for manufacturing a three-dimensional netted structure as described herein, comprising: a die, a mouthpiece of the die having a plurality of holes, the filaments being extruded downward from the die via the mouthpiece; and, drawing-down units partly-submerged in liquid, having the filaments drop in between; wherein the drawing-down units draw the filaments in between at a speed lower than the filament dropping speed, and the distance between the drawing-down units is set smaller than the width of the assembly of the extruded filaments, characterized in that the drawing-down units are arranged so that four surfaces of the assembly of the filaments contact the drawing-down units before or after the drawing-down units are submerged.

In a class of this embodiment, the mouthpiece has a slit in addition to the plurality of holes, the slit extending in the lengthwise direction of the mouthpiece such that the three dimensional netted structure additionally comprises a substantially non-void-carrying sheet which forms a wavy shape in the material extruding direction.

In a class of this embodiment, the mouthpiece has a region not provided with holes so as to make a hollow portion in the three-dimensional netted structure arranged in the material extruding direction.

In other embodiments, the invention is directed to a method of manufacturing a three-dimensional netted structure as described herein, A method for manufacturing a three-dimensional netted structure, comprising steps of setting a water level of a tank is above said lower end of a chutes, extruding a filament assembly comprising continuous filaments downward, flowing cooling water on a pair of opposing chutes and water-permeable sheets located on said chutes and on water of said tank, letting both end portions of said extruded filament assembly free-fall onto said water-permeable sheets and guiding them along a slope towards the center, and drawing said filament assembly flowing down from said water-permeable sheets by drawing-down units. In a class of this embodiment, said water-permeable sheets is prevented from moving by fixing the water-permeable sheets at an upper part and a lower part of said chutes.

In particular provided is a method for manufacturing a three-dimensional netted structure, comprising the steps of: extruding a filament assembly comprising continuous filaments downward, flowing cooling water on a pair of opposing chutes and water-permeable sheets located on said chutes, letting both end portions of said extruded filament assembly free-fall onto said water-permeable sheets and guiding them along a slope towards the center, preventing said water-permeable sheets from moving by fixing the water-permeable sheets at an upper part and an lower part of said chutes, and drawing said filament assembly flowing down from said water-permeable sheets by drawing-down units.

In a class of this embodiment, the mouthpiece has a slit in addition to the plurality of holes, the slit extending in the lengthwise direction of the mouthpiece such that the three dimensional netted structure additionally comprises a substantially non-void-carrying sheet which forms a wavy shape in the material extruding direction.

In a class of this embodiment, the mouthpiece has a region not provided with holes so as to make a hollow portion in the three-dimensional netted structure arranged in the material extruding direction.

In other embodiments, the invention is directed to a method of manufacturing a three-dimensional netted structure, the method being applied to form netted structures described herein.

In other embodiments, the invention is directed to a method of manufacturing a three-dimensional netted structure, comprising applying the apparatus described herein to form a netted structure.

In other embodiments, the invention is directed to a method of manufacturing a three-dimensional netted structure, comprising applying the apparatus described herein to form a netted structure described herein.

BRIEF DESCRIPTION OF THE DRAWINGS

FIG. 1A is a perspective view of a three-dimensional netted structure of an exemplary embodiment of the invention;

FIG. 1B is a partial side view of a single loop of a filament arranged in the surface of the three-dimensional netted structure shown in FIG. 1A;

FIG. 1C is an image view of a surface of the three-dimensional netted structure shown in FIG. 1A, which is obtained by coloring the surface of the three-dimensional netted structure with vermilion ink and pressing the surface against a paper;

FIG. 1D is an image view of the three-dimensional netted structure shown in FIG. 1A which is cut by 3 mm from the surface obtained by coloring a surface of the three-dimensional netted structure 1 with vermilion ink and pressing it against a paper to show an interior of the three-dimensional netted structure;

FIG. 1E is an image view of a surface of a three-dimensional netted structure corresponding to FIG. 1C, which is made from a material having a higher viscosity as compared with FIG. 1C;

FIGS. 4A, 4B, 4C, 4D, 4E, 4F, and 4G are sectional views of a three-dimensional netted structure of another exemplary embodiment of the invention;

FIG. 23A is a front view of the three-dimensional netted structure (applied to a gardening cushioning material and the like) of another exemplary embodiment of the invention;

FIG. 23B is a plan view of the same three-dimensional netted structure;

FIG. 23C is a side view of the same three-dimensional netted structure;

FIG. 23D shows another exemplary embodiment of the three-dimensional netted structure;

FIG. 29A is a plan view of a chute 604; FIG. 29B is a sectional view along the D-D line;

FIG. 30A shows a chute 604 according to the present invention; FIG. 30B shows a chute of comparative example without lower fixing members 673a, 673b;

FIG. 32A shows a chute 704 according to the present invention; FIG. 32B shows a chute of comparative example without lower fixing members 773a, 773b;

FIG. 33A is a plan view of a chute 804. FIG. 33B is a sectional view along the E-E line;

DETAILED DESCRIPTION OF THE PREFERRED EMBODIMENTS

Figure 2A:
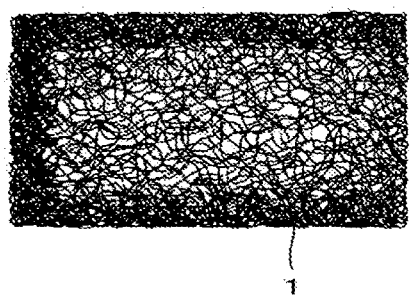
FIG. 2A is a longitudinal sectional view of the three-dimensional netted structure of an exemplary embodiment of the invention.

As shown in FIGS. 1A, 1B, 1C, 1D, 1E and 2A, a three-dimensional netted structure 1 is a three-dimensional netted structure the characteristics of which reside in that the structure is a three-dimensional plate type netted structure formed out of a regenerated thermoplastic resin as a raw material or a main raw material, in which a plurality of filaments are helically and randomly entangled and partly and thermally bonded together and have two side surfaces, left and right end surfaces and upper and lower end surfaces.

It is preferable that the density of surface-side portions of three surfaces out of the side surfaces of this three-dimensional netted structure be relatively higher than that of the portion exclusive of the mentioned surface-side portions. As shown in FIG. 1B, which is a partial side view of a single loop of a filament arranged in the surface of the three-dimensional netted structure 1, the loop is bent significantly along a horizontal direction G from the entangled portion of the filament to have a bending degree θ, which can be set between 5 and 20 degrees. A width W of the loop can be set between 5 and 23 mm and a length L of the loop between 8 and 35 mm. FIG. 1C is an image view of a surface of the three-dimensional netted structure 1 made from PE, which is obtained by coloring the surface of the three-dimensional netted structure 1 with vermilion ink and pressing the surface against a paper. FIG. 1D is an image view of the three-dimensional netted structure 1 which is cut by 3 mm from the surface and is obtained by coloring a surface of the three-dimensional netted structure 1 with vermilion ink and pressing it against a paper to show an interior of the three-dimensional netted structure 1. FIG. 1E is an image view of a surface of the three-dimensional netted structure 1 made from EVA which has a higher viscosity as compared with PE in corresponding FIG. 1C. Namely, referring to FIG. 2A, the three-dimensional netted structure 1 is in this embodiment three-surface-molded. In this structure, regions thereof which extend inward from the opposite surfaces thereof by a predetermined distance are molded to a high density, and the density of a region which extends in a central inner portion of the netted structure is set lower than the mentioned density. Thus, the remaining one surface of the structure has a non-straight extending surface. Therefore, this netted structure has an advantage in being not subjected to a process in a later stage. In short, a pair of surfaces of a large width and one side surface are forcibly molded by endless conveyors and the like which will be described later, and the edges of these surfaces are formed more esthetically pleasing than that of the other surface.

In this embodiment, flaked or chipped PET bottles are used as a raw material or a main raw material of the regenerated thermoplastic resin. The raw material is obtained by pulverizing unmodified PET bottles, melting the pulverized products, and forming the molten product into flakes. This material is suited to the recycling promoting age. When the material is not a recycled product but a genuine product, the manufacturing cost per 1 square meter of the netted structure doubles due to the dry crystallization of or the removal of waste from the material. The material used in this embodiment allows for a reduction of the product scrapping cost. However, this embodiment can also be applied to a thermoplastic resin and the like other than regenerated materials of this kind. For example, polyolefines, such as polyethylene, polypropylene, etc., polyesters, such as polyethylene terephthalate, etc. polyamides, such as nylon 66, etc, polyvinyl chloride, polystyrene, a copolymer and an elastomer obtained by copolymerizing these resins as base materials, a material obtained by blending these resins, and some other similar materials.

The three-dimensional netted structure, is used mainly as a cushioning material, a shock absorbing material, a moisture absorbing material, a sound absorbing material (to be provided under a floor material, in an inner portion of a structure and inside a wall), a heat insulating material (inner and outer heat insulating purposes), a wall surface material, a roof gardening material, a concrete and mortar cracking preventing material, interior finishing material for automobiles, and has some other uses. This netted structure can also be applied to an inner portion of a double wall.

When a fire resistant material is mixed with the three-dimensional netted structure by holding the three-dimensional netted structure between nonwoven cloths or by attaching such cloths thereto, and applying fire resistant paint to the netted structure, so as to give fire resistance to the three-dimensional netted structure, the resultant netted structure becomes more preferable as a heat insulating building material, a sound absorbing building material and the like.

The netted structure in this embodiment is molded so as to have a substantially uniform density at an inner portion thereof. The apparent density of this embodiment is preferably 0.008 to 0.9 g/cm$^3$ (corresponding to a percentage of void of 36 to 98.4%), and especially preferably 0.05 to 0.5 g/cm$^3$. The three-dimensional netted structure 1 preferably has, for example, a width of 0.1 m to 2 m and a thickness of 5 mm to 200 mm, and extends endlessly in the lengthwise direction. The netted structure is cut to a suitable length (for example, 90 mm) but the sizes of the netted structure are not limited to the examples mentioned above.

Figure 2E:
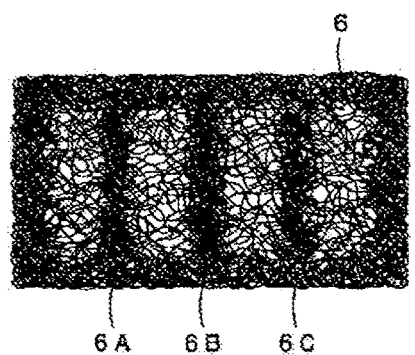
FIG. 2E is a longitudinal sectional view of a three-dimensional netted structure of another exemplary embodiment of the invention.
Figure 2B:
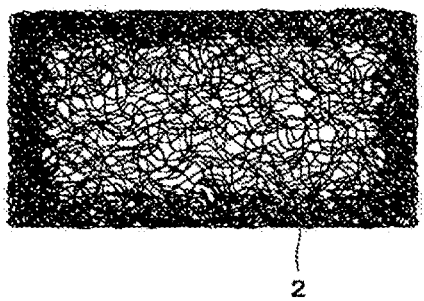
FIG. 2B is a longitudinal sectional view of a three-dimensional netted structure of another exemplary embodiment of the invention.

Referring to FIG. 2B, a three-dimensional netted structure 2 of another exemplary embodiment is four-surface-molded, and all the surfaces of the netted structure extend straight. This netted structure is formed so that the density of the regions thereof which correspond to those of the three-dimensional netted structure 1, and which extend inward from the left and right surfaces of the netted structure toward an inner portion thereof by a predetermined distance, becomes high, and so that the density of the region of the netted structure which is at a central inner portion thereof be set lower than the mentioned density. Namely, the regions of the netted structure which extends from all the surfaces thereof except the upper and bottom surfaces thereof to an inner portion of the netted structure by a predetermined distance are molded to a density higher than the above-mentioned density.

In another embodiment, a three-dimensional netted structure 3 has a surface of modified shapes or a polyhedral surface. With reference to, this type of netted structures include, for example, a netted structure 3A provided with a convex surface (FIG. 4A) a netted structure 3B provided with a concave surface (FIG. 4B), a netted structure 3C provided with a plurality of continuously formed projecting and recessed portions (FIG. 4C), a netted structure 3D provided with a plurality of saw-tooth-like portions (FIG. 4D), a netted structure 3E provided with a plurality of wavy portions (FIG. 4E), a netted structure 3F provided with rounded corner portions (FIG. 4F), a netted structure 3G provided with cut corner portions of a predetermined angle, e.g., 45° (FIG. 4G), or a suitable combination thereof, etc.

In the field of construction, various types of netted structures are demanded as products, and these embodiment can meet a demand for such netted structures. It is considered that forming netted structures of complicated shapes causes various uses thereof to be newly found. Especially, forcibly molding three or four surfaces of the three-dimensional netted structure as in the above-described first and second modes of embodiment enables the various demands for the products to be met. Furthermore, in order to obtain netted structures of miscellaneous surface shapes, netted structures are generally cut or molded so as to provide surfaces of modified shapes thereon on a later stage. According to this mode of embodiment, products can be provided instantly without finishing the netted structure as to the shape and sizes, which the products demand, on a later stage, so that a later stage can be rendered unnecessary.

Figure 2F:
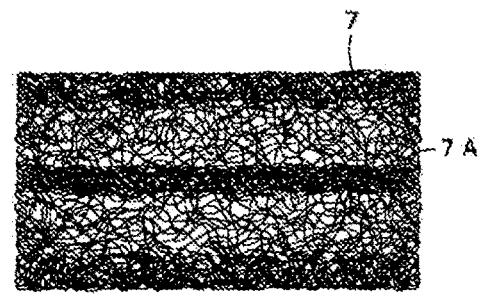
FIG. 2F is a longitudinal sectional view of a three-dimensional netted structure of another exemplary embodiment of the invention.
Figure 2C:
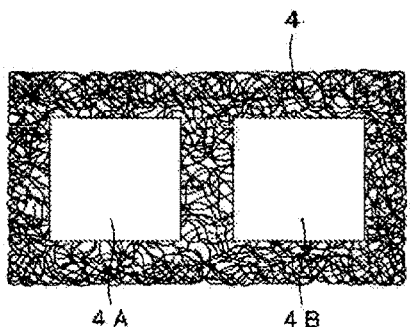
FIG. 2C is a longitudinal sectional view of a three-dimensional netted structure of another exemplary embodiment of the invention.

The three-dimensional netted structure 4 (shown in FIG. 2C) is provided with a single or a plurality (two in this embodiment) of hollow portions 4A, 4B, and aims at further reducing the manufacturing cost.

Figure 2G:
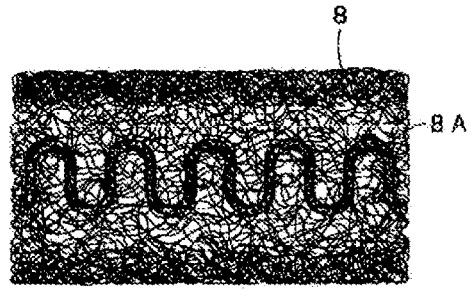
FIG. 2G is a longitudinal sectional view of a three-dimensional netted structure of another exemplary embodiment of the invention.
Figure 2D:
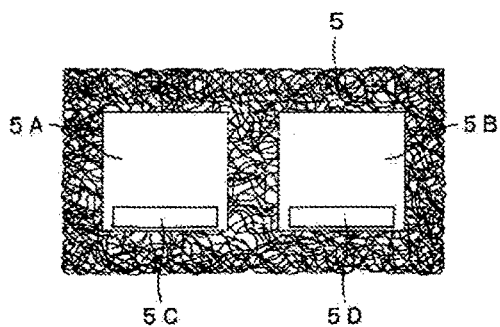
FIG. 2D is a longitudinal sectional view of a three-dimensional netted structure of another exemplary embodiment of the invention.

The three-dimensional netted structure 5 (shown in FIG. 2D) has regenerated members 5C, 5D of the same or different materials, such as plate type regenerated veneer members, plate type members of regenerated shredder dust and the like inserted in hollow portions 5A, 5B identical with the hollow portions 4A, 4B of the three-dimensional netted structure 4. This embodiment aims at improving the sound absorbability, heat insulating characteristics, cushioning characteristics and the like of the netted structure by using regenerated plate members.

In the three-dimensional netted structure 6 (shown in FIG. 2E), the sound absorbing characteristics, heat insulating characteristics, cushioning characteristics and impact resistance are improved by increasing the density of parts of the inner portion of the three-dimensional netted structure 1 in the direction of the thickness thereof, and thereby partly forming a single or a plurality (e.g., three in this embodiment) of beam-like high-density regions 6A, 6B and 6C at predetermined intervals.

In the three-dimensional netted structure 7 (shown in FIG. 2F), the sound absorbing characteristics, heat insulating characteristics, cushioning characteristics and impact resistance thereof are improved by increasing the density of parts of the inner portion thereof in the widthwise direction thereof, and thereby partly forming a plurality (one in this embodiment) of or a single high-density region 7A.

In the three-dimensional netted structure 8 (shown in FIG. 2G), the sound absorbing characteristics, heat insulating characteristics, cushioning characteristics and impact resistance are improved by forming a wavy high-density region 8A in an inner portion of the three-dimensional netted structure 7.

In the above-mentioned three-dimensional netted structure 1, 2, 6, 7, 8, an apparent density of the sparse portion is between 0.01 and 0.09 g/cm$^3$, an apparent density of the dense portion is between 0.030 and 0.1 g/cm$^3$, and the ratio of the apparent density of the dense portion to the sparse portion is between 2.2 and 8 thereby obtaining high tensile strength of the dense portion.

In an prior art method of manufacturing a three-dimensional netted structure, a surface portion is flattened only by slightly contacting a plate member and an outermost side of an assembly of the extruded filaments or instantly slipping the assembly between rolls. There has been no close contact between a plate member and filaments. However, the method of the present invention provides enough slip property to the chute of the apparatus for manufacturing a three-dimensional netted structure by running water over the surface of the chute which is coated by a layer made of TEFLON®, a chute which is coated with cloth, or a chute with shot-blasted to occur close contact between filaments and the chute. This allows a porosity of the surface layer of the filament assembly to be lower than that of the prior art, thereby forming rigid high-density layer in the three-dimensional netted structure. Further, the prior art method has a disadvantage in that a surface layer becomes uneven when an apparent density of the surface portion exceeds 0.15 g/cm³. According to the present invention, the effective cooling of the chute provides for a flat surface layer with a higher apparent density. Additionally, the surface layer has looped filaments bent inward of the assembly enough to make the surface layer smooth with a lower porosity by the chute and water flowing on the chute.

According to the manufacturing apparatus of the three-dimensional netted structure of the present invention, the width of the chute is set to be narrower than the width of the assembly of the extruded molten resin filaments. The loop is bent inward of the assembly along the inclination of the chute to make the surface layer smooth by the chute and water flowing on the chute. The surfaces of the assembly which contact the chute move inward of the assembly to become intense. A porosity of the surfaces part is smaller than that of the center part which is directly dropped down into water. It should be understood that the surface part having a lower porosity has more intersections than the center part having a higher porosity, which drastically improves the tensile strength.

In the three-dimensional netted structure 9 (shown in FIG. 3A), the sound absorbing characteristics, heat insulating characteristics, cushioning characteristics and impact resistance are improved by forming a sheet 9A (a non-void-carrying region) in a predetermined widthwise extending inner portion of the three-dimensional netted structures 1 or 2. Around the sheet 9A, filaments (resin threads) are entangled with one another. The sheet 9A may be provided fully in the lateral direction as shown in the drawing, and also partly, for example, in the central portion and the like.

Figure 11A:
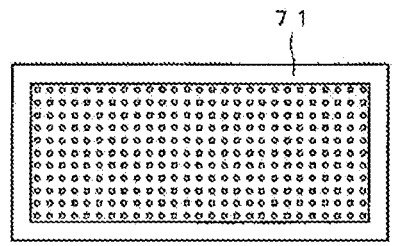
FIGS. 11A, 11B, 11C, 11D, 11E, 11F, 11G, and 11H are plan views and a front view showing various exemplary embodiments of mouthpieces of a die.
Figure 11B:
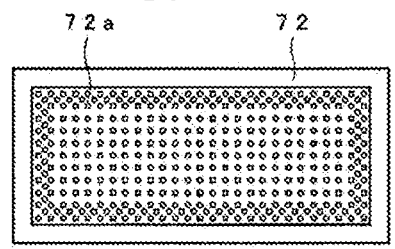
Figure 11C:
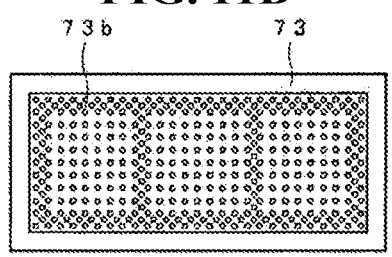
Figure 11D:
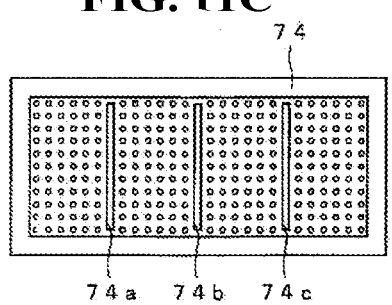
Figure 11E:
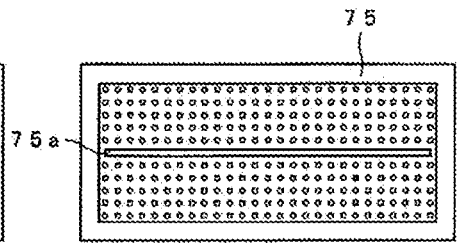

The sheet 9A in the three-dimensional netted structure 9 (shown in FIG. 3B) is wave form in general and the sound absorbing characteristics, heat insulating characteristics, cushioning characteristics and impact resistance of the netted structure are improved. The reason for why the sheet 9A can be molded in wave form resides in that a draw-down speed of rolls is lower than a resin thread dropping speed, as will be described in more detail later. The intervals, height and width of the waves of the sheet 9A differ depending upon the manufacturing conditions, and are not limited to those shown in the drawing. When the intervals of the waves of the sheet 9A are small, the waves are bonded to one another in some cases. The three-dimensional netted structure 9 can be manufactured by using a slit (linear through hole) 75a shown in FIG. 11E.

Although illustrations are omitted, the invention can also be applied to three-dimensional netted structures of modified cross-section shapes, such as a triangular cross-section shape, a Y-type cross-section shape and the like.

Apparatus for Manufacturing a Three-Dimensional Netted Structure

Figure 5:
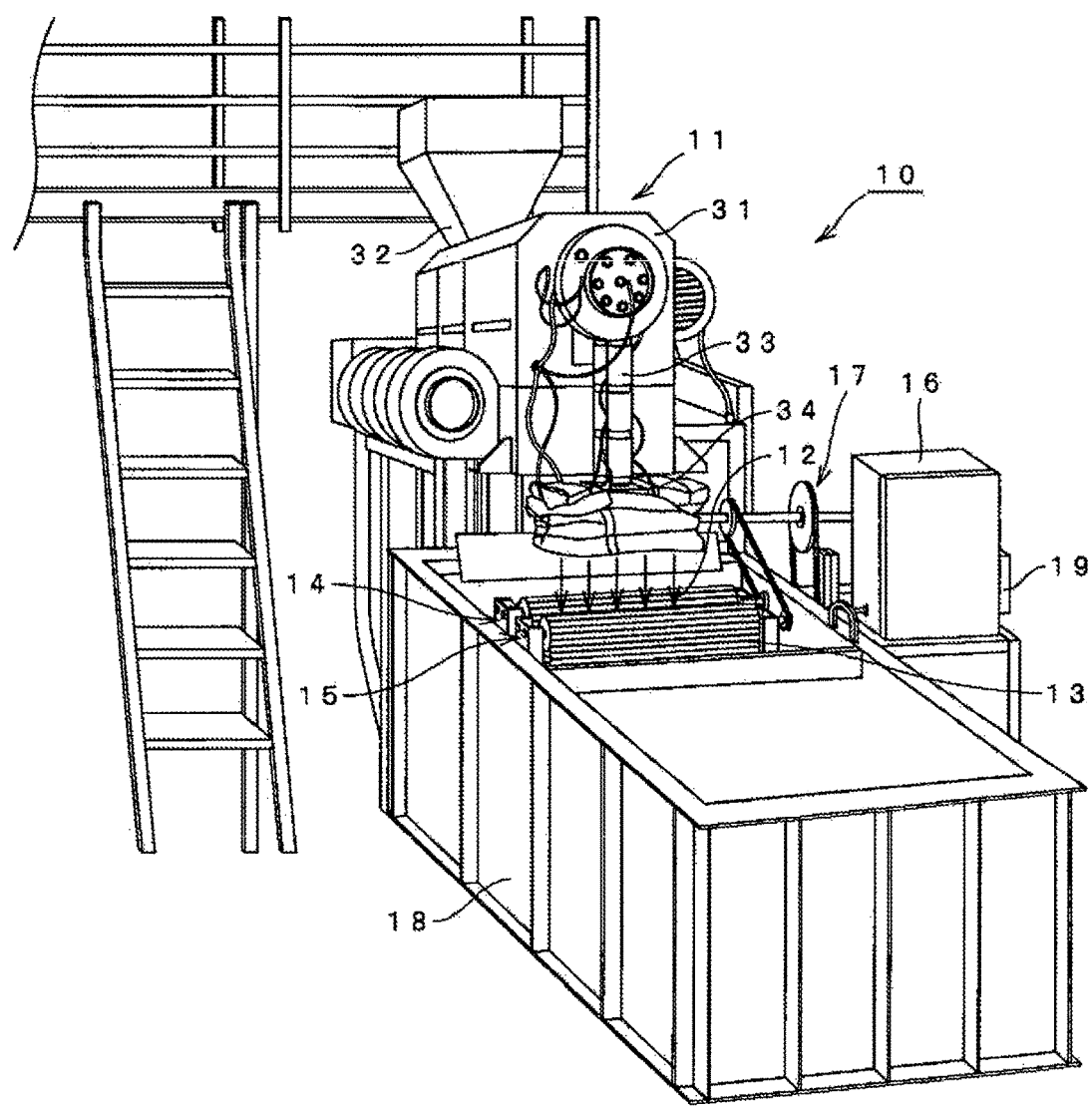
FIG. 5 is a perspective view of an apparatus for manufacturing the three-dimensional netted structure of an exemplary embodiment of the invention.

An apparatus 10 for manufacturing a three-dimensional netted structure will now be described. As shown in FIG. 5, the apparatus 10 for manufacturing a three-dimensional netted structure, comprises: an extrusion molding machine 11, a pair of endless conveyors 14, 15 (shown in FIGS. 7A and 7B) provided with endless members 12, 13, a motor 16 adapted to drive the endless members 12, 13, a transmission 17 formed of a chain and a gear and adapted to change a moving speed of the endless members 12, 13, a water tank 18 adapted to partly submerge the two endless conveyors 14, 15 therein, a control unit 19, and other meters, etc.

The endless members 12, 13 are formed by fixing with screws (not shown) a plurality of metal plate members 21 (made of stainless steel and the like in this embodiment) to a plurality of endless chains 12a, 13a (two for each conveyor) (see FIGS. 7A and 7B) with a predetermined width of clearance 22 (refer to FIG. 8A) left therebetween. Instead of these plate members, a belt 23 of a stainless steel mesh (metal net) which does not have the clearance 22 may also be used as shown in FIG. 8B. This mesh belt is formed by combining spiral wires with rods (power ribs), and various types of mesh belts are formed by varying the shapes, diameters and pitch of these two elements. Such mesh belts move smoothly, keep the smooth belt surfaces horizontal excellently, stand use in hot temperature condition excellently, and are repaired simply.

Figure 7A:
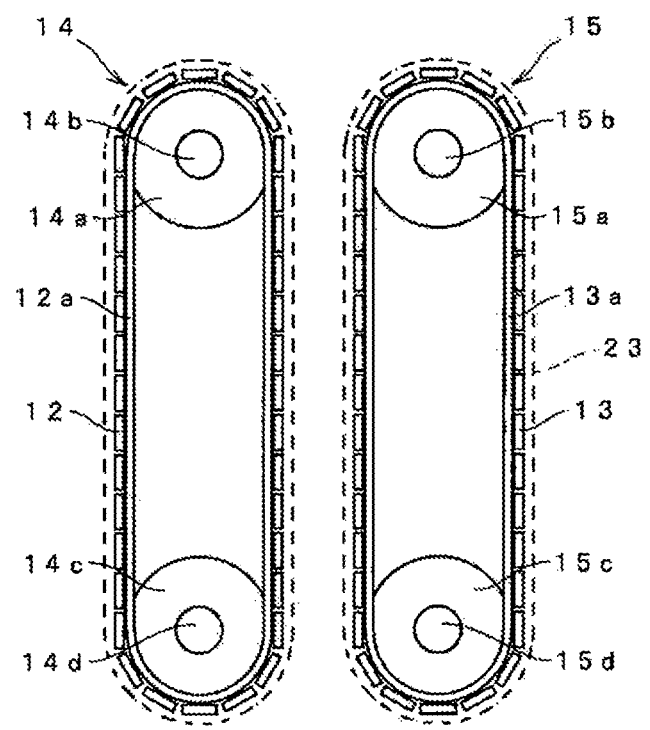
FIGS. 7A and 7B are a side view and a front view, respectively, of endless conveyors in the same apparatus for manufacturing the three-dimensional netted structure.
Figure 7B:
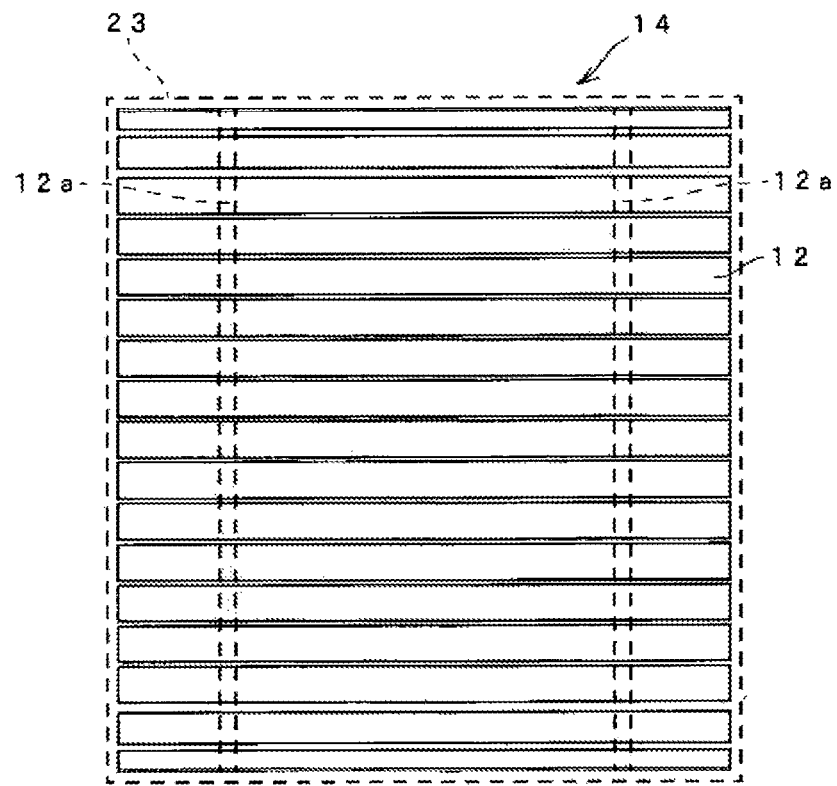
Figure 8A:
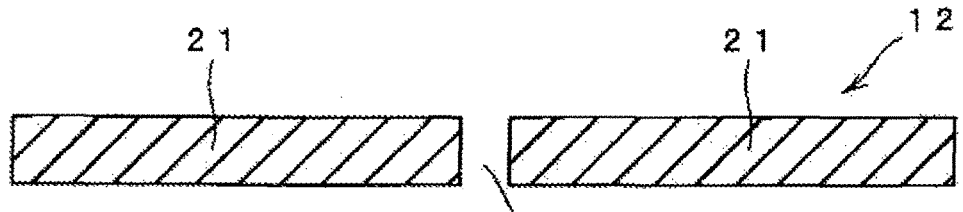
FIGS. 8A, 8B, 8C, 8D, 8E, and 8F are side views of modified modes of endless conveyors in the same apparatus for manufacturing the three-dimensional netted structure.
Figure 8B:
Figure 8C:
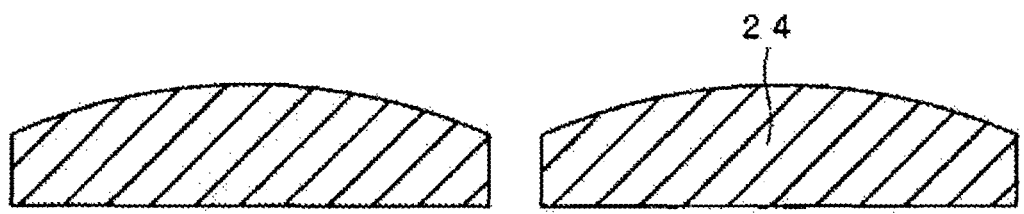
Figure 8D:
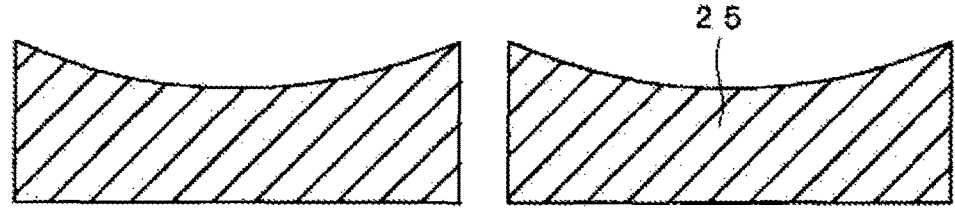
Figure 8E:
Figure 8F:
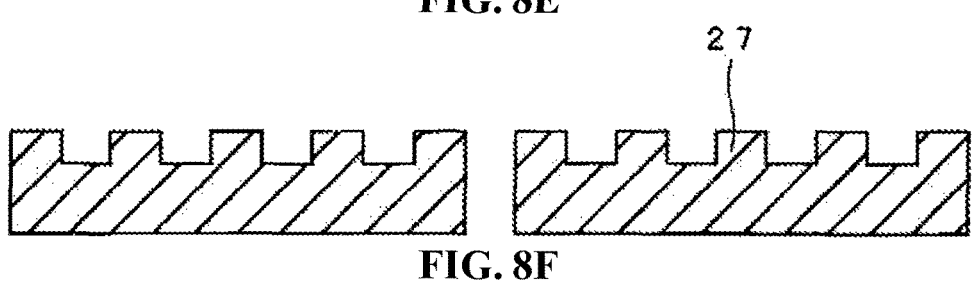

As shown by dotted lines in FIGS. 7A and 7B, stainless mesh belts 23 passed around outer circumferences of the endless members 12, 13 can also be used in practice, and are preferably used when it is desirable to prevent the occurrence, which is ascribed to the presence of the clearance 22, of recessed and projecting portions on the mesh belt. The cross section of the plate member 21 is rectangular, and various modified modes of plate members 21 are conceivable, which include a convex plate member 24 (FIG. 8C), a concave plate member 25 (FIG. 8D), a saw-tooth plate member 26 (FIG. 8E), a continuously recessed and projecting plate member 27 (FIG. 8F), etc.

As shown in FIGS. 7A and 7B, the endless conveyor 14 is provided with a driving shaft 14b having a sprocket 14a around which the endless chain 12a provided vertically is passed, and a driven shaft 14d having a sprocket 14c. The endless conveyor 15 is driven synchronously with the endless conveyor 14, and provided with a driven shaft 15b mounted with a sprocket 15a around which the endless chain 13a is passed, and a driven shaft 15d mounted with a sprocket 15c.

As shown in FIG. 5, the extrusion molding machine 11 includes a container 31, a raw material feed port 32 provided on an upper portion of the container 31, a die 33, a mouthpiece 34 capable of being fixed detachably to a lower end portion of the die 33. A range of the temperature in an inner portion of the die of the extrusion molding machine 11 can be set to between 100 and 400° C., and an extrusion rate of the machine can be set to between 20 to 200 kg/hr and the like. A range of the pressure in the die is 0.2 to 25 MPa, which is equal to, for example, a discharge pressure of a 75 mm screw.

When the thickness of the three-dimensional netted structure exceeds 100 mm, the equalization of the pressure in the die by a gear pump and the like is needed in some cases. Therefore, it becomes necessary that the pressure in the die be increased by a gear pump and the like so as to discharge filaments uniformly from the whole region of the interior of the die. To meet the requirement, the surfaces of the endless conveyors 14, 15 are formed so that these surfaces can be moved freely so as to set the shape of a three-dimensional netted sheet. This enables a product having desired density and strength to be manufactured in accordance with the shape (density or diameter of the holes H) of the mouthpiece 34 of the die 33 and a transfer speed of the endless conveyors 14, 15, and various demands for the products to be met.

Figure 9A:
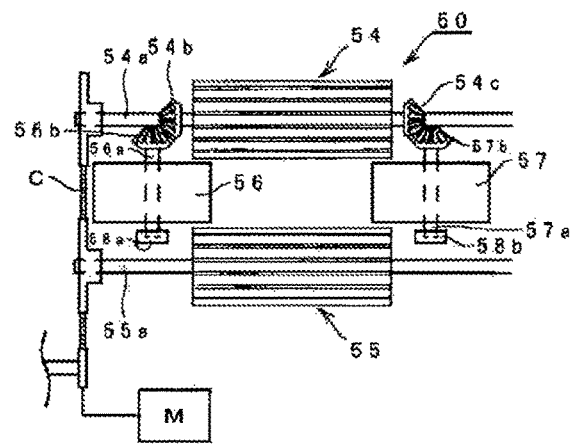
FIG. 9A is a plan view of endless conveyors for an apparatus for manufacturing a four-surface-molded three-dimensional netted structure.
Figure 9B:
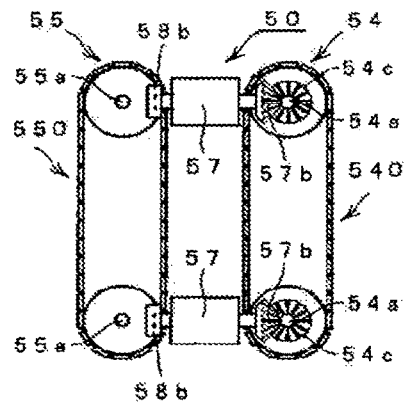
FIG. 9B is a side view of the same apparatus for manufacturing the three-dimensional netted structure.

An apparatus 50 for manufacturing a three-dimensional netted structure which is made of such a four-surface-molding machine as shown in FIGS. 9A and 9B will now be described. This apparatus 50 for manufacturing a three-dimensional netted structure is provided with endless conveyors 54, 55 having rotary shafts 54a, 55a which correspond to the endless conveyors 14, 15 used in a two-surface-molding operation, shown in FIGS. 7A and 7B, and a pair of rolls 56, 57 disposed at lengthwise end portions of the endless conveyors 54, 55 and having rotary shafts 56a, 57a extending at right angles to the shafts of the endless conveyors. The rotary shaft 54a is mounted with bevel gears 54b, 54c, while the rotary shafts 56a, 57a are also mounted with bevel gears 56b, 57b. The bevel gears 54b, 54c and the bevel gears 56b, 57b are meshed with each other, and the rotary shafts Ma, 55a are driven synchronously by a motor M via a chain C. Therefore, the rotary shafts 56a, 57a are also driven synchronously. The other end portions of the rotary shafts 56a, 57a are supported on bearings 58a, 58b.

Figure 9C:
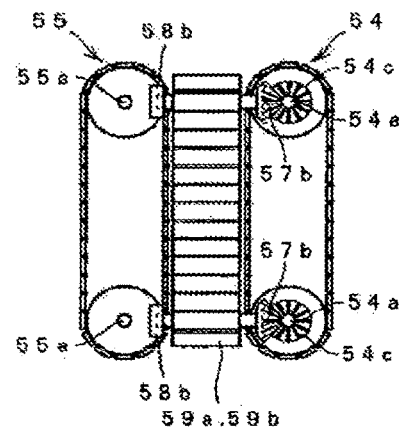
FIG. 9C is a side view of another exemplary embodiment of the apparatus for manufacturing a four-surface-molded three-dimensional netted structure.

As shown in FIG. 9C, the apparatus may be an apparatus formed by arranging a pair of short endless conveyors 59a, 59b, the construction of which is identical with the endless conveyors 54, 55, at right angles to rotary shafts of rolls. In this case, the molding of a product can be done more precisely, and the dimensional accuracy of a product is improved.

Figure 9D:
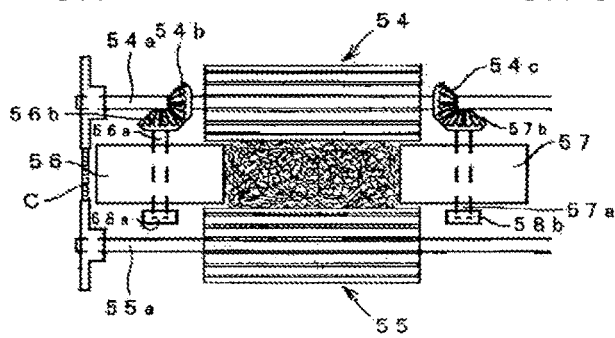
FIG. 9D is a plan view showing the condition of a four-surface molding operation carried out by the same apparatus for manufacturing the three-dimensional netted structure.
Figure 9E:
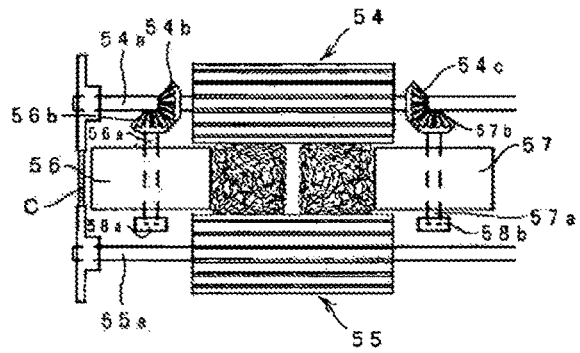
FIG. 9E is a plan view showing the condition of a three-surface molding operation carried out by the same apparatus for manufacturing the three-dimensional netted structure.

As shown in FIG. 9D, the manufacturing of a three-dimensional netted structure can be done by using four-surface-molding techniques. The three-surface-molding of the product can also be done by using the mentioned techniques as shown in FIG. 9E. Namely, when a certain type of three-dimensional netted structure is manufactured, two systems of dies are provided, and filaments are extruded in parallel. As a result, the productive efficiency of the netted structure doubles.

Figure 10A:
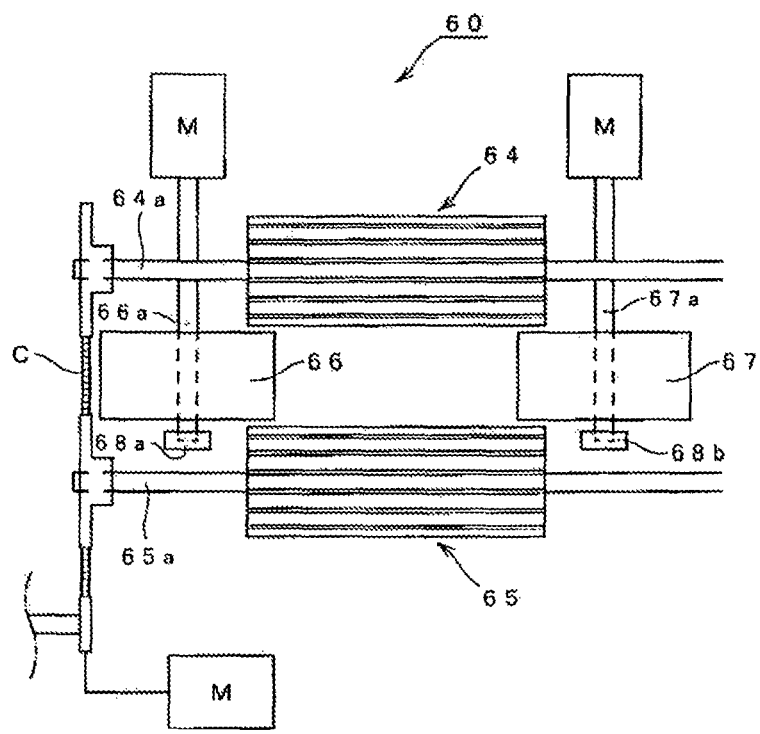
FIG. 10A is a plan view of endless conveyors in an apparatus of an independent driving system for manufacturing a four-surface-molded three-dimensional netted structure.

As shown in FIG. 10A, an apparatus of a modified mode can be also used which is formed by providing driving power sources (motors) instead of the previously-mentioned synchronous driving system so that endless conveyors 64, 65 and rolls 66, 67 (endless conveyors also serve the purpose) are driven independently of each other. Namely, in order to carry out three-surface or four-surface-molding operation, endless conveyors 64, 65 having rotary shafts 64a, 65a, and a pair of rolls 66, 67 arranged at lengthwise end portions of these endless conveyors 64, 65, and having rotary shafts 66a, 67a extending at right angles to those of the endless conveyors are provided. The rotary shafts 66a, 67a are also provided with respective motors M so that these rotary shafts are driven independently of each other. The other end portions of the rotary shafts 66a, 67a are supported on bearings 68a, 68b.

Figure 10B:
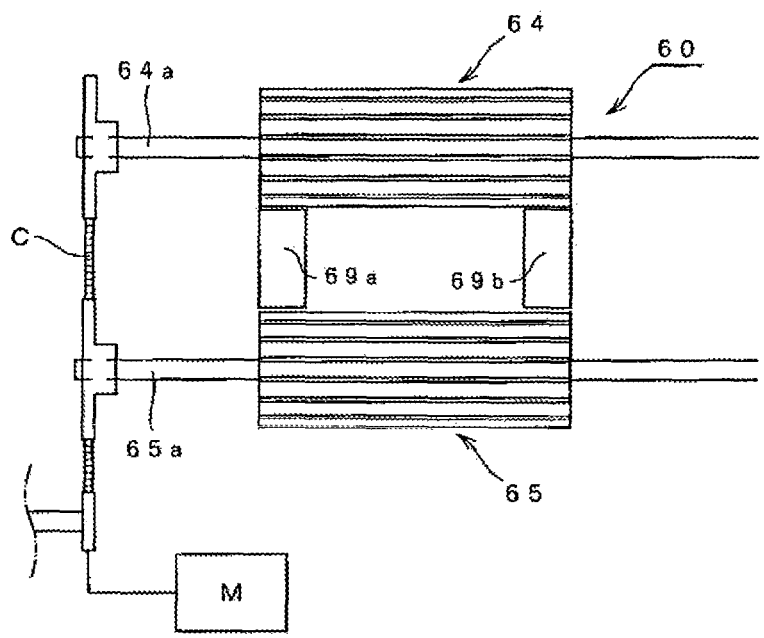
FIG. 10B shows endless conveyors provided with sliding plates at end surfaces thereof in an apparatus for manufacturing a three-dimensional netted structure.
Figure 10C:
FIG. 10C shows the sliding plates of the endless conveyors.

As shown in FIGS. 10B and 10C, which show another modified mode of the apparatus, in which a driving mechanism can be simplified by removing such two rolls 66, 67, two rotary shafts 66a, 67a, two bearings 68a, 68b and two motors M as are provided in the preceding example, and providing sliding curved plates 69a, 69b, the surfaces of which are coated with polytetrafluoroethylene, in positions in which the rolls 66, 67 were placed. These curved plates 69a, 69b are arcuate in side elevation and positioned so that a distance between these curved plates decreases gradually from upper portions thereof toward lower portions thereof. The curved plates are formed to a rectangular shape in plan.

Figure 11F:
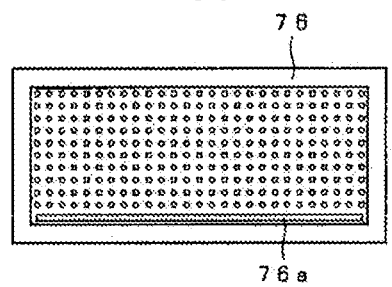
Figure 11G:
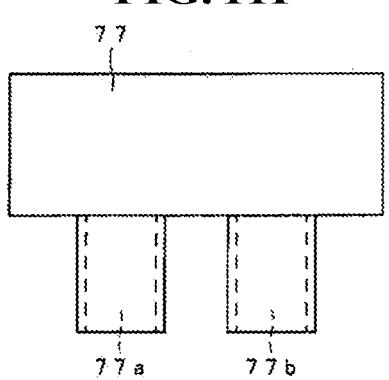
Figure 11H:
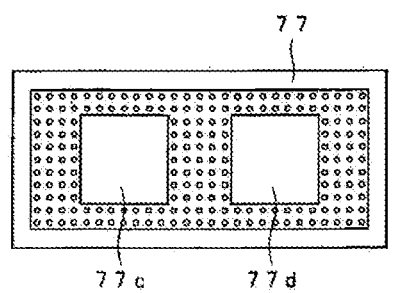

The holes of the mouthpiece 34 are downwardly made in series, from which filaments come out downward. The holes may be arranged at regular intervals or at non-regular intervals. The holes may employ staggered, orthogonal and various other types of configurations. When it is desired that the arrangement density of the holes be changed, a method of positively increasing the arrangement density thereof in end regions only is used in some cases. Changing the mode of the mouthpiece variously enables various demands for the products to be met. Mouthpieces of a multiplicity of specifications can be used practically which include, for example, a mouthpiece 71 (having holes H accounting for 90% of the area of the mouthpiece 71) (refer to FIG. 11A) of 1.0 m×180 mm in which about 3500 holes H of 0.5 mm in diameter are made, a mouthpiece 72 (refer to FIG. 11B) in which the density of the holes H is set high only in a circumferential portion 72a thereof, a mouthpiece 73 (refer to FIG. 11C) in which the density of the holes H of frame-forming portion 73b is increased so that the frame-forming portion constitutes series-connected frames, a mouthpiece 74 (refer to FIG. 11D) in which slits (linear through holes) 74a to 74c in addition to a multiplicity of holes H are formed so that the slits extend in parallel with shorter sides of the mouthpiece, a mouthpiece 75 (refer to FIG. 11E) in which a slit (linear through hole) 75a in addition to a multiplicity of holes H is formed so that the slit extends in the lengthwise direction of the mouthpiece, a mouthpiece 76 (refer to FIG. 11F) and the like in which a slit (linear through hole) 76a in addition to a multiplicity of holes H is formed so that the slit extends in a position near a lengthwise side of the mouthpiece, and similar other mouthpieces, and a mouthpiece 77 (refer to FIGS. 11G and 11H) and the like which have regions 77c, 77d not provided with the holes H so as to make hollow portions therein, and which is provided under these regions with cross-section square introduction members (pipes, etc.) 77a, 77b projecting downward therefrom. The density of the holes H formed in these mouthpieces is preferably 1 to 5/cm$^2$.

Method of Manufacturing a Three-Dimensional Netted Structure

This three-dimensional netted structure 1 is manufactured in the following manner. First, flakes of regenerative PET bottles are heated and dried for preventing the same from being hydrolyzed, and chemicals for finishing the resultant product, or an antibacterial agent and the like are added suitably in some cases. When filaments come out flat from the mouthpiece 34 in the downward direction, the filaments are entangled helically owing to the entangling actions of the endless members 12, 13 of the endless conveyors 14, 15. The filaments start being entangled at the portions thereof which contact the surfaces of the endless members 12, 13 at the entangling-starting time. The density of the portions of the filaments which are entangled is high, and that of the portions thereof which are not entangled is low.

Figure 6:
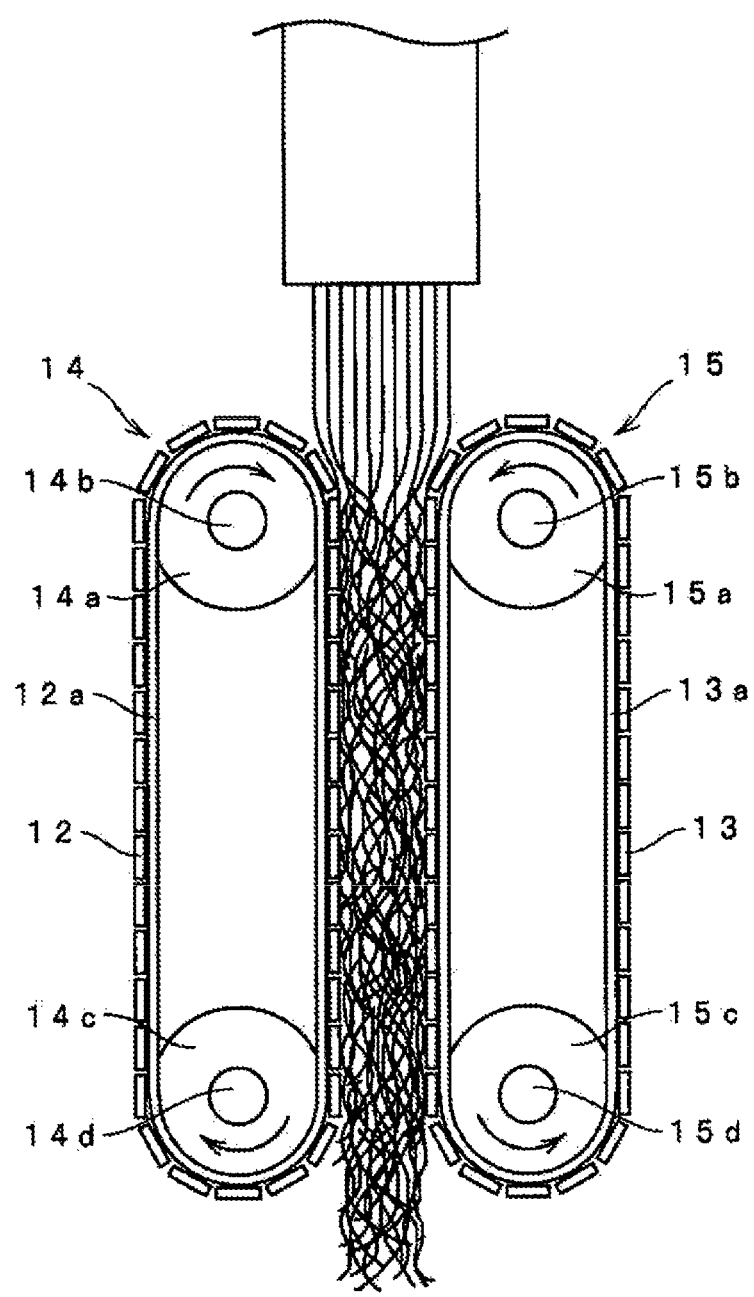
FIG. 6 is an explanatory drawing showing the condition of an operation of the apparatus for manufacturing the three-dimensional netted structure of an exemplary embodiment of the invention.

Next, as shown in FIG. 6, a three-dimensional netted structure 1, an object netted structure is manufactured by extruding a molten thermoplastic resin downward from a plurality of dies 33, having the extruded filaments of the resin drop naturally to a position between a pair of partly submerged endless conveyors 14, 15, and drawing down the filaments of the resin at a speed lower than the filament dropping speed. When this netted structure 1 is thus manufactured, the two endless conveyors 14, 15 are arranged so that a distance between the endless conveyors is set smaller than a width of an assembly of the extruded filaments of the molten resin, and so that both or one surface of the assembly of the filaments of the molten resin contacts the endless conveyors 14, 15 before or after these conveyors are submerged.

Both or one of the surface portion of the assembly of the molten thermoplastic resin drops on the endless conveyors 14, 15, and moves to an inner side of the assembly, so that the surface portion of the assembly becomes dense. Therefore, the percentage of void of the surface portion becomes lower than that of a central portion which drops as it is into the water. It is a matter of course that the surface portion in which the percentage of void becomes low comes to have an increased number of nodes as compared with the central portion having a high percentage of voids, and that the tensile strength of the surface portion becomes noticeably high. The surface portion having a low percentage of void comes to have a small area of voids, and forms an impact absorbing layer and a soundproofing layer.

A result showing that a percentage of void of the three-dimensional netted structure 1 as a whole high enough to have the netted structure function well is in the range of 50% to 98%, though these levels differ with the condition of execution of works on a job site was obtained. In short, it is considered that, when the density of the netted structure is high, sounds are blocked. A result showing that, in order to have the three-dimensional netted structure function as a recycled sound absorbing building material, a cushioning material, a heat insulating material and the like, the percentage of void thereof may be set preferably to not lower than 70% was obtained. In short, when the percentage of void is lower than 70%, the impact absorbing effect, soundproofing effect, heat insulating effect and cushioning characteristics of the netted structure are not in some cases so improved as was expected. It is recommended that the three-dimensional netted structure 1 may be designed suitably with the percentage of void set in the range of 70% to 98% in accordance with the use of the netted structure.

A sound absorbing material and a cushioning material have a preferable percentage of void of 85 to 98%, an impact absorbing material to be provided under a floor 40 to 80%, and a collision-preventing impact absorbing material 60 to 90%. A preferable range of the percentage of void varies with the use of the netted structure.

The percentage of void=100%−{(B÷A)×100%}, wherein A represents a product of the specific gravity of the resin and the volume of the three-dimensional netted structure; and B represents the weight of the netted structure.

The thermoplastic resin used in this method is obtained by pulverizing PET bottles into flakes, which are used as a raw material or a main raw material. However, resins including a polymer, such as polypropylene, etc. or a resin obtained by blending a plurality of kinds of polymers together, etc. may be used as a main raw material without trouble as long as the resin can be processed by a regular extrusion molding machine.

In the step of forming three-dimensional netted structures to final modified shapes, a mechanism for equalizing the inner pressure of the dies, and drawing down an assembly of filaments at two, three or four surfaces thereof or at an intermediate portion thereof is used. This enables such characteristics to be given to this netted structure manufacturing method that include its capability of attaining an apparent density of a product of 0.008 to 0.9 g/cm$^3$, changing the filaments of the molten resin from a randomly and helically entangled state into a state of a flat plate, and turning the surface portions of the three-dimensional netted structure including the front, rear, left end and right end surfaces with respect to the direction of the thickness thereof into flat surfaces and surfaces of modified shapes, i.e., projecting and recessed surfaces. The mouthpiece of a die used to form the three-dimensional netted structure is made so that a netted structure of a rod type shape, modified shapes (shape of a pipe and a shape of the letter "Y"), etc. and a netted structure of various other shapes devised by combining these shapes together can be obtained.

The three-dimensional netted structure is subjected to compression by the rolls of a drawdown machine to obtain a super-dense sheet structure. The inner pressure of the dies used to have the regenerated PET resin discharged uniformly from the dies is equalized, and the three or four surfaces of an assembly of filaments of a molten resin extruded when the three-dimensional netted structure is manufactured is brought into contact with the draw-down conveyors by which these surfaces are shaped. In short, the assembly of filaments of the molten regenerated PET resin is formed at the three or four surfaces thereof to shapes of a final product. For example, a resin filament assembly is drawn up as necessary around polygonal conveyors to form a product. In one of the methods of obtaining a three-dimensional netted sheet, filaments of a molten resin are extruded downward from a plurality of dies, and dropped naturally onto water surface or to a position between partly-submerged conveyors. Thus, a randomly and helically entangled filament assembly is made, which forms a three-dimensional netted sheet.

It was ascertained that, when the speed of the endless conveyors was varied, the density of a sheet of 1.0 m in width and 100 mm in thickness varied.

It was further ascertained that the density of the sheet varied in accordance with the variation of a discharge rate of the extruder.

The mouthpiece 34 having about 3500 substantially regularly spaced holes H of 0.5 mm in diameter was fixed to the dies 33 having an area of 1.0 m×180 mm in an uniaxial extruder having a screw of 75 mm in diameter. The water tank 18 having a water level in a position about 120 mm below the dies 33 is provided, and a pair of endless conveyors 14, 15 of 1.2 m in width were installed substantially vertically in the tank with a clearance of 50 mm left therebetween, in such a manner that upper portions of the endless conveyors project upward from the water level by around 40 mm.

In this apparatus, the molten resin filament assembly was extruded from the mouthpiece 34 at an extrusion rate of 120 kg/hr to a position between the endless conveyors 14, 15 so that two surfaces of the molten resin filament assembly dropped on the endless conveyors, by controlling the temperature of the dies 33 so that the temperature of the dies became 240° C. while plasticizing a regenerated PET resin by heating the same. During this time, the draw-down speed of the endless conveyors 14, 15 was set to 0.7 m/min. The molded product held between the endless conveyors 14, 15 and moved down changed its direction in a lower portion of the interior of the water tank 18, and was moved from the side of the water tank which is opposite to the extruder to the water surface. When the molded product came out of the water tank 18, the water thereon was blown off with compressed air or by a vacuum pump.

The three-dimensional netted structure thus obtained had a width of 1.0 m, a thickness of 50 mm, and a density of 0.07 g/cm$^3$ to 0.14 g/cm$^3$. This netted structure may be used as a heat insulating material, a ground material, and a sound absorbing material, and for a drain pipe, etc.

The above-described three-dimensional netted structure 1 and apparatus 10 for manufacturing the same netted structure enable a finishing operation on a later stage to be omitted, the degree of straightness of surfaces of the netted structure to be improved, a demand for a netted structure having modified shapes to be met, and the durability of the netted structure to be improved.

Owing to this mode of embodiment, the PET bottles which do not have uses in the existing circumstances newly find a use as materials for a three-dimensional netted structure, and it is considered that a recovery percentage of the PET bottles will increase. This causes the recycling of the PET bottles to be greatly promoted.

Figure 12A:
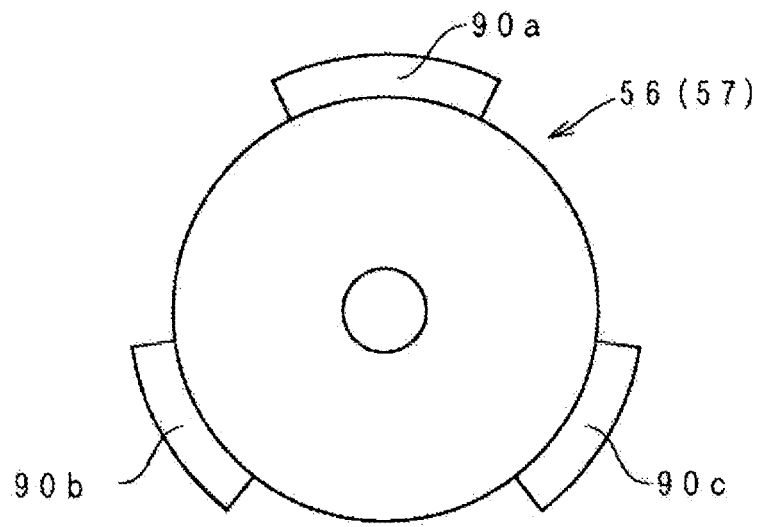
FIGS. 12A and 12B are front views of modified modes of endless conveyors, which are used for carrying out a four-surface molding operation, in an apparatus for manufacturing a three-dimensional netted structure.
Figure 12B:
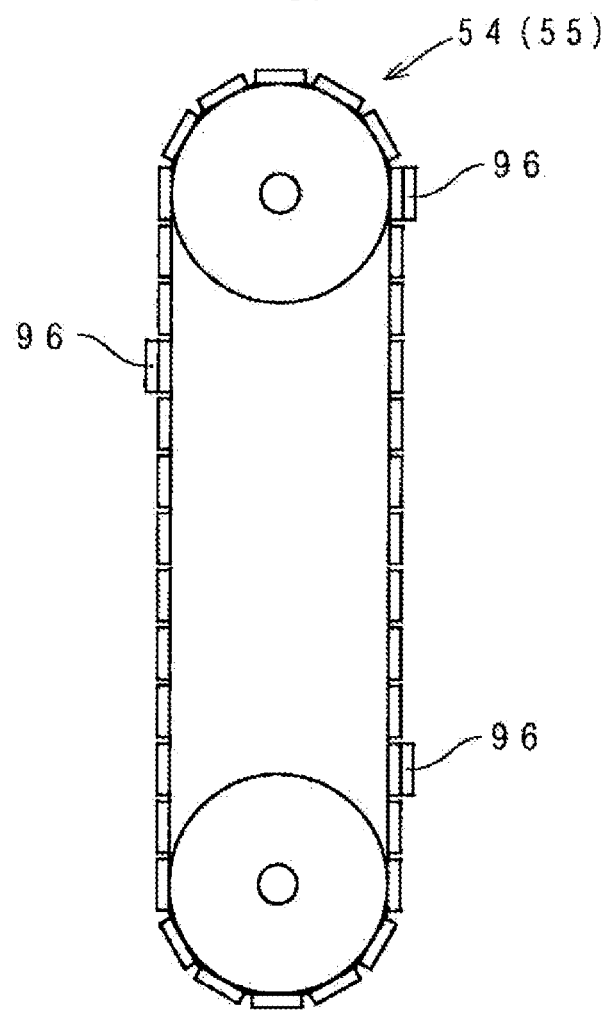

FIGS. 12A and 12B show a modified mode of the apparatus 50 for manufacturing a four-surface-molded three-dimensional netted structure, and FIG. 12A is a drawing corresponding to FIG. 9B and shows a pair of rolls 56, 57 as described above which have a single or a plurality of projections 90a to 90c on the respective surfaces thereof (the illustrations of the roll 57 and its projections are omitted). These projections are formed so as to provide recesses in side surfaces of the three-dimensional netted structure. Each of the projections 90a to 90c has angular portions and an arcuate side portion in cross section. Although the recesses referred to above and formed in the side surfaces of the netted structure ought to become rectangular theoretically, the recesses become curvilinear since the resin filaments drop into the space between the endless conveyors from above as above-mentioned, causing blind regions in which the resin filaments do not enter to occur. In short, the recesses become roundish.

FIG. 12B corresponds to FIG. 9C, and shows endless conveyors (the illustrations of the endless conveyor 55 and its projections are omitted) formed by providing a single or a plurality of projections 96 on the surfaces of two endless belt conveyors like those of the above-mentioned belt conveyors 54, 55, etc. This modified apparatus can also be formed by incorporating cams and springs in the rotary bodies, such as the above-mentioned rolls 56, 57 or endless conveyors 54, 55 so that the projections are forced out in the outward direction by the cams synchronously with the rotations of the rotary bodies. This enables the occurrence of blind regions to be reduced, and more precise recesses to be formed. Since the construction of the other parts is identical with that of the corresponding parts of the apparatus shown in FIGS. 9B and 9C, the illustrations and description of the latter will be utilized and quoted.

The demands for the recycling of the products of the three-dimensional netted structures have become diversified, and cannot be met under the present circumstances in some cases. For example, when it is desired that a mixture of not smaller than two kinds of regenerated resins be utilized, some of these raw materials prove separable during recycling operations therefor, and some prove non-separable. Non-separable raw materials are sometimes mixed into a starting material, and the recycling and utilizing of raw materials actually become impossible in some cases in spite of the effort made to recycle the materials. There are various cases where the same raw material is used for a certain purpose, which include a case where changing the shape of a product is desired, such as a case where forming sparse and dense regions is desired, a case where forming hollow portions on a later stage is desired and similar cases, or a case where improving the moldability of the materials is desired. The below-described embodiment is carried out so as to prevent troubles from occurring in the regeneration of a thermoplastic resin, and attain the easiness of changing the shape of a product.

Figure 13A:
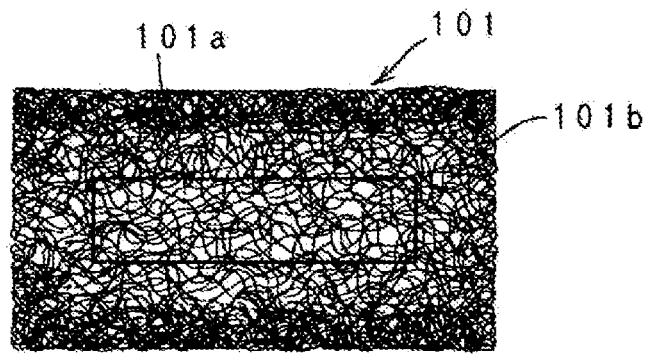
FIG. 13A is a longitudinal sectional view of a three-dimensional netted structure of another exemplary embodiment of the invention.

A three-dimensional netted structure 101 is a plate type three-dimensional netted structure, the characteristics of which reside in that the netted structure is formed by using a regenerated thermoplastic resin as a raw material or a main raw material, and has a plurality of filaments helically and randomly entangled and partly and thermally bonded together, as shown in FIG. 13A. This netted structure is made of an inner region 101a and an outer region 101b of the same or different raw materials. A boundary between the inner region 101a and outer region 101b is shown by a solid line. The solid line is an imaginary line showing the boundary, and the same applies to the other modes of embodiment which will be described later. It is preferable that the densities of two, three or four surface portions of this three-dimensional netted structure may be relatively higher than that of the portion of the netted structure which is exclusive of these surface portions. Namely, the three-dimensional netted structure 101 (refer to FIG. 13A) of this embodiment is two-surface-molded.

This netted structure is molded so that the density of regions thereof which extend from the opposite surfaces thereof toward an inner portion thereof by a predetermined distance is high. The density of an inner part of the central portion thereof is set lower than the mentioned density, and the other non-surface-molded surfaces are not straight-formed. Therefore, it becomes unnecessary that this netted structure may be processed on a later stage. In short, a pair of surfaces of a large width and one side surface of the netted structure are forcibly molded by endless conveyors which will be described later, and edges of these surfaces are set more esthetically pleasing than those of the other surfaces.

Figure 13B:
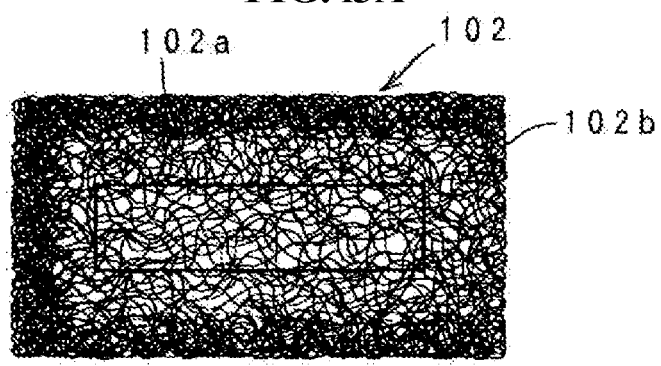
FIG. 13B is a longitudinal sectional view of a three-dimensional netted structure of another exemplary embodiment of the invention.

A three-dimensional netted structure 102 (refer to FIG. 13B) is a three-surface-molded netted structure, in which all the surfaces except the end surfaces and one side surface are set straight. The regions extending from all the surfaces of the netted structure except the right side surface thereof toward an inner portion thereof by a predetermined distance are molded to a high density. This netted structure is made of an inner region 102a and an outer region 102b of the same or different raw materials.

Figure 13C:
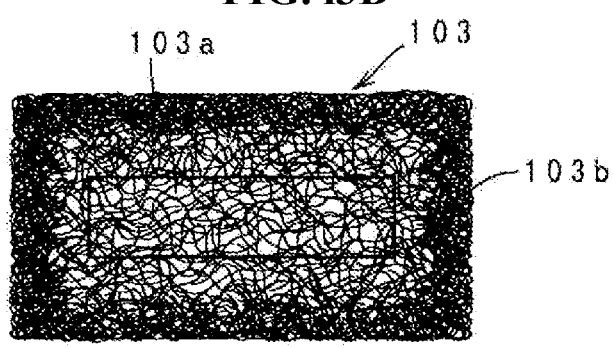
FIG. 13C is a longitudinal sectional view of a three-dimensional netted structure of another exemplary embodiment of the invention.

A three-dimensional netted structure 103 (refer to FIG. 13C) is four-surface-molded, in which all the surfaces thereof except an end surface thereof are set straight. This netted structure is formed by molding the regions, which extend from the left and right side surfaces of the same netted structure as that of the first mode of embodiment to the inner part of the central portion thereof by a predetermined distance, to a high density with the density of the region in the inner part of the central portion of the netted structure set lower than the mentioned density. Namely, the regions extending from all the side surfaces of the netted structure toward the inner portion thereof by a predetermined distance are molded to a high density. This netted structure is made of an inner region 103a and an outer region 103b of the same or different raw materials.

Figure 13D:
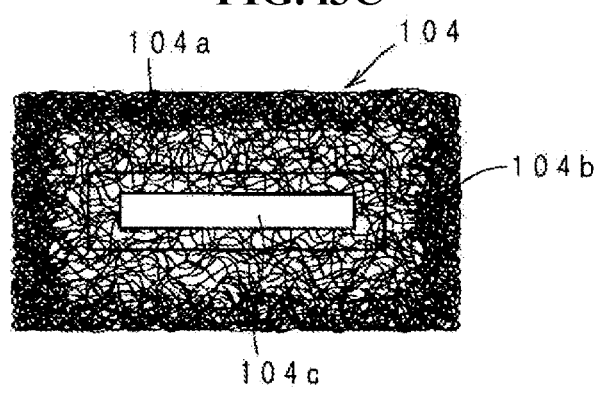
FIG. 13D is a longitudinal sectional view of a three-dimensional netted structure of another exemplary embodiment of the invention.

A three-dimensional netted structure 104 (refer to FIG. 13D) is a three-dimensional netted structure provided with a single or a plurality of (one in this embodiment) hollow portions 104c, and formed for the purpose of further reducing the cost and for some other purposes. This netted structure is made of an inner region 104a and an outer region 104b of the same or different raw materials.

Figure 14A:
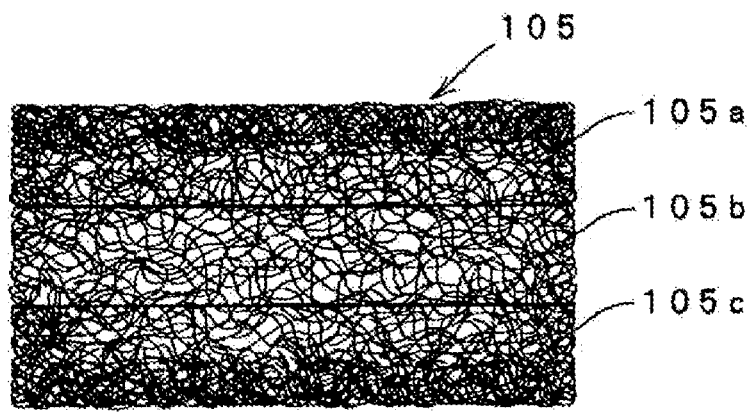
FIG. 14A is a longitudinal sectional view of a three-dimensional netted structure of another exemplary embodiment of the invention.

A three-dimensional netted structure 105 (refer to FIG. 14A) is formed of three layers of regions 105a, 105b and 105c of the same or different raw materials. The raw materials of all of the three layers of regions may be different. The raw materials of the regions 105a, 105c may be identical, and that of the region 105b may be different. The raw materials of the three layers of regions may be all identical. The netted structure is divided into three layers of regions 105a, 105b and 105c in the lengthwise direction thereof.

Figure 14B:
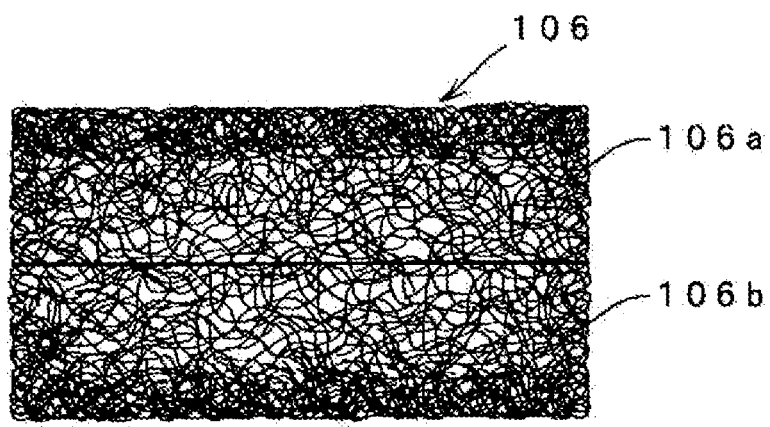
FIG. 14B is a longitudinal sectional view of a three-dimensional netted structure of another exemplary embodiment of the invention.

A three-dimensional netted structure 106 (refer to FIG. 14B) is made of two layers of regions 106a, 106b of the same or different raw materials. The raw material of the two layers of regions 106a, 106b may be different or identical. This netted structure is divided into two layers of regions 106a, 106b in the lateral direction thereof.

Figure 14C:
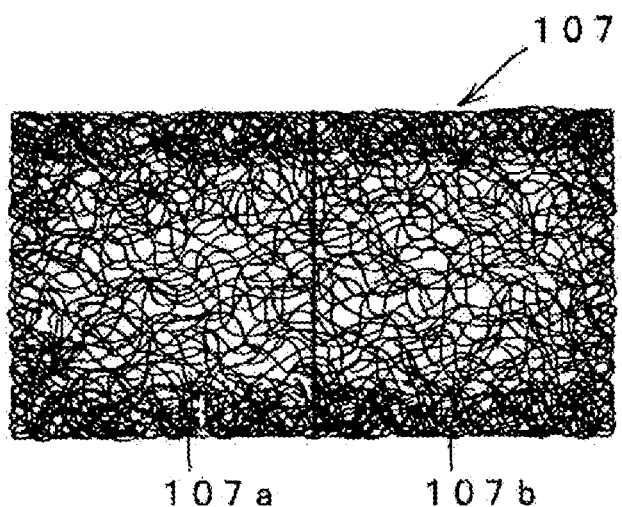
FIG. 14C is a longitudinal sectional view of a three-dimensional netted structure of another exemplary embodiment of the invention.

A three-dimensional netted structure 107 (refer to FIG. 14C) of a sixteenth mode of embodiment is made of two layers of regions 107a, 107b of the same or different raw materials. The raw materials of the two layers of regions 107a, 107b may be different or identical. The direction in which this netted structure is divided into these regions is that of the thickness of the netted structure unlike the direction in which the fourteenth and fifteenth modes of embodiment are divided.

Figure 3A:
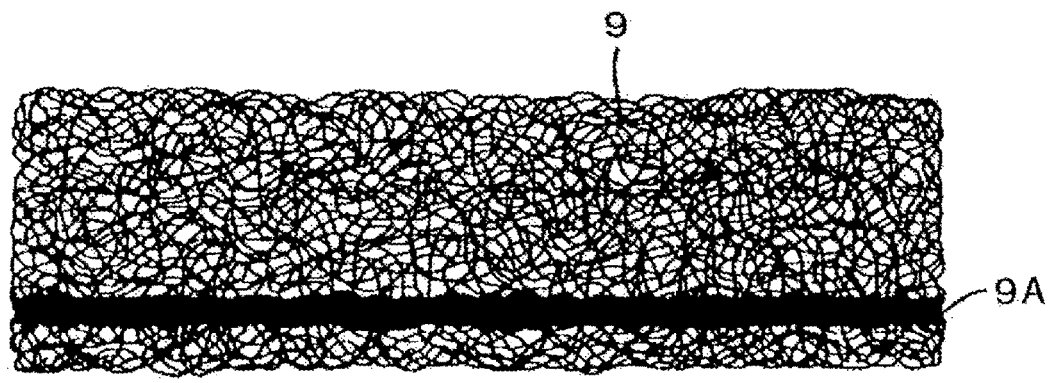
FIG. 3A is a longitudinal sectional view of the three-dimensional netted structure of another exemplary embodiment of the invention.
Figure 3B:
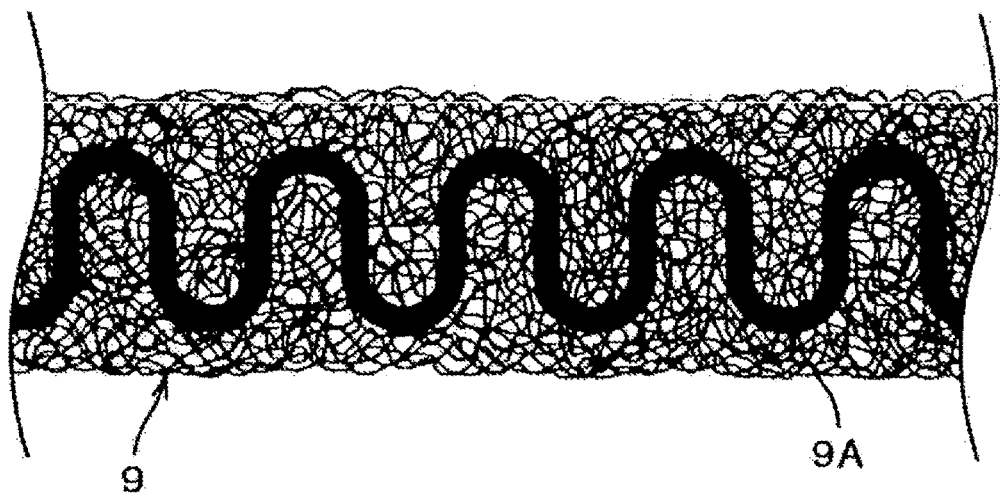
FIG. 3B is a side view of the three-dimensional netted structure of another exemplary embodiment of the invention.

In the embodiment shown in FIGS. 3A and 3B, a high-density sheet 9A (a substantially non-void-carrying filled region) can be provided partly in a predetermined position in the lateral direction in the embodiment by forming the sheet and the other region by different extrusion molding machines through different paths. The description of this embodiment will be quoted from that given previously with respect to the embodiment of FIGS. 3A and 3B.

Beside these netted structures, netted structures of modified cross-section shapes, such as a triangular shape, a shape of the letter "Y", etc., the illustrations of which are omitted, can also be formed in practice. As mentioned above, when a raw material is supplied to not smaller than two regions provided on the mouthpiece, the regulation of the manufacturing conditions, such as the temperature of the raw material, extrusion rate of the filaments, etc. can be made easily.

An apparatus 110 for manufacturing a three-dimensional netted structure 2 will now be described.

Figure 15:
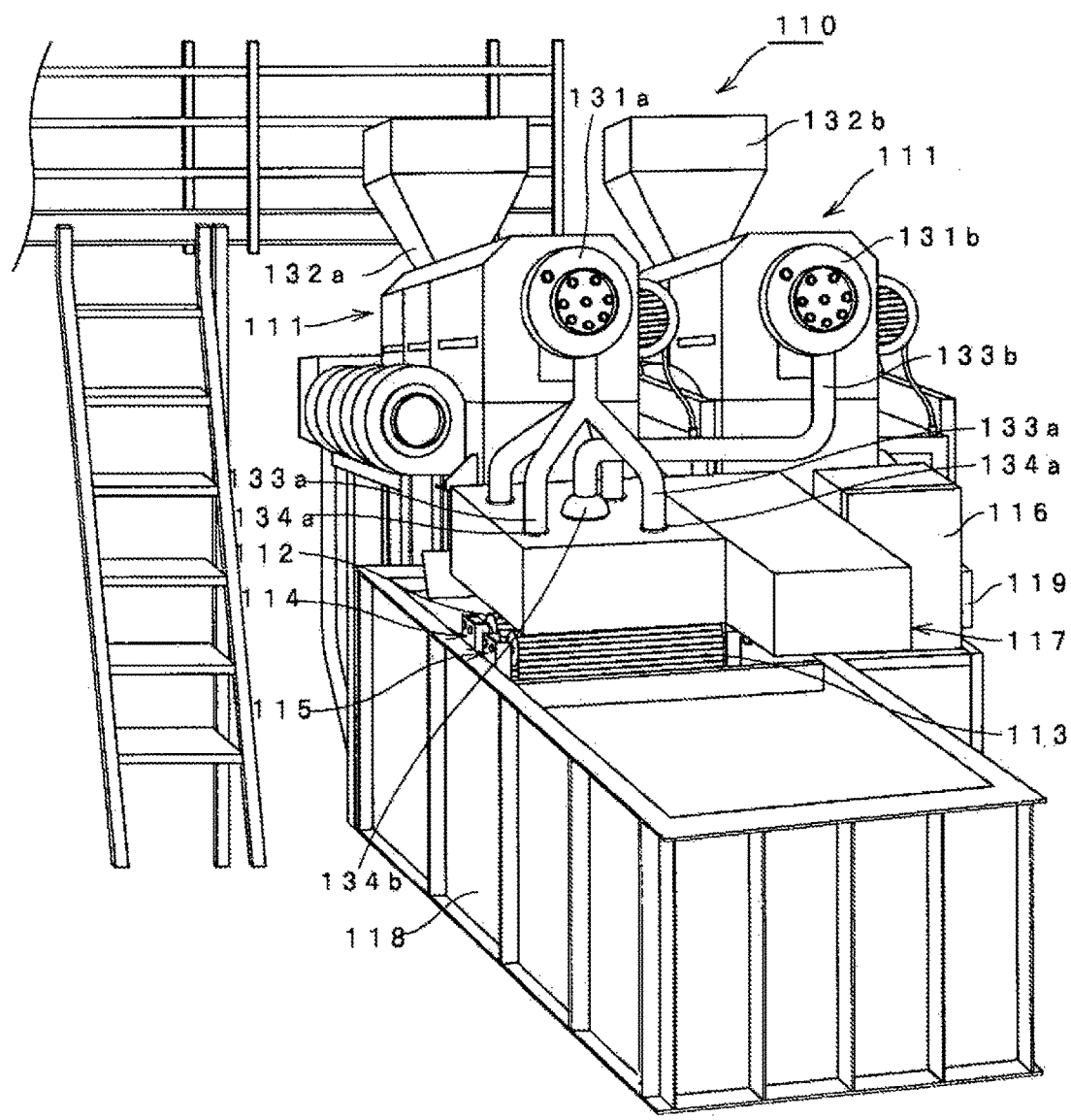
FIG. 15 is a perspective view of the apparatus for manufacturing a three-dimensional netted structure of another exemplary embodiment of the invention.

This apparatus 110 for manufacturing a three-dimensional netted structure comprises, as shown in FIG. 15, an extrusion molding machine 111, a pair of endless conveyors 114, 115 provided with endless members 112, 113, a motor 116 for driving the endless members 112, 113, a transmission 117 formed of chains and gears and adapted to change the moving speed of the endless members 112, 113, a water tank 118 for submerging parts of the endless conveyors 114, 115 therein, a control unit 119 and meters, etc.

The description of endless members 112, 113, etc. will be described by quoting that given previously with respect to endless members 12, 13.

As shown in FIG. 15, the extrusion molding machine 111 is formed of containers 131a, 131b storing therein the same or different raw thermoplastic resin materials, raw material supply ports 132a, 132b provided at upper portions respectively of the containers 131a, 131b, raw material supply pipes 133a, 133b connected to the containers 131a, 131b respectively, a complex die 135 (refer to FIGS. 16A and 16B) connected to the raw material supply pipes 133a, 133b via packings 134a, 134b, a mouthpiece 136 (refer to FIGS. 16A and 16B) detachably fixable to a lower end portion of the complex die 135, etc. The raw material supply pipe 133a branches at an intermediate portion thereof into a plurality of (four in this embodiment) pipe members striding over the raw material supply pipe 133b. The lower end portions of the branches of the raw material supply pipe 133a are arranged around that of the raw material supply pipe 133b.

Figure 16A:
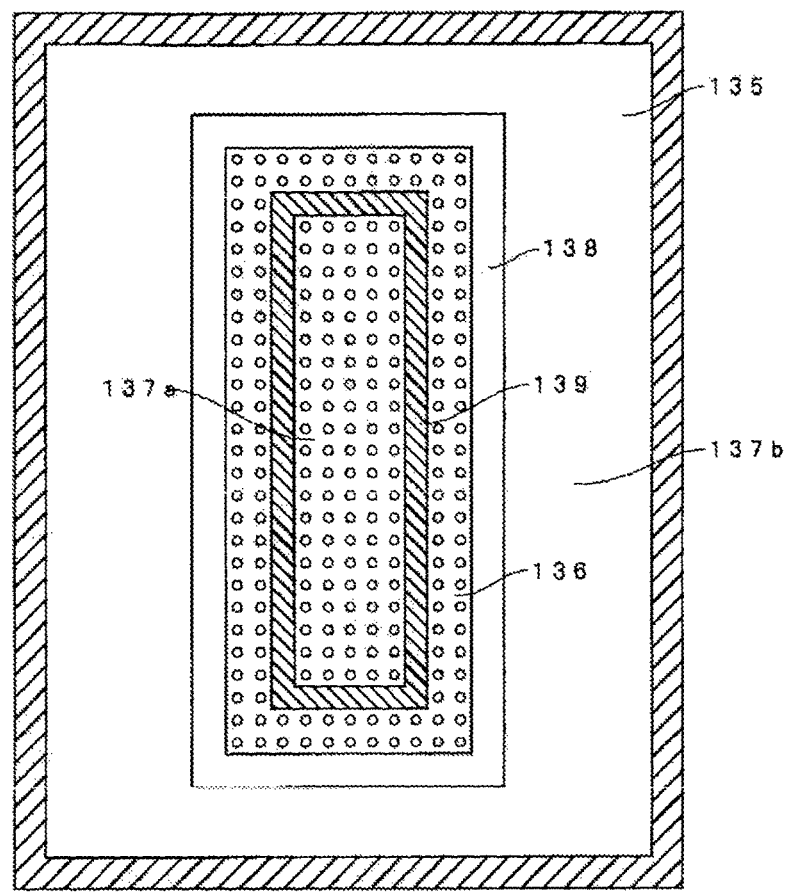
FIG. 16A is a horizontal sectional view showing the portion of the apparatus for manufacturing a three-dimensional netted structure according to the invention which is in the vicinity of an upper part of a mouthpiece of a complex die.
Figure 16B:
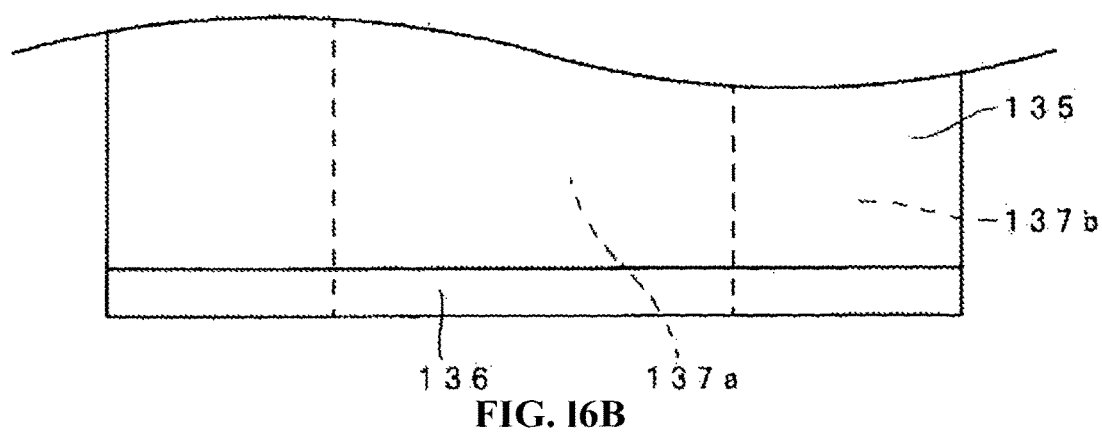
FIG. 16B is a front view of a lower portion of the complex die according to an exemplary embodiment of the invention.
Figure 17A:
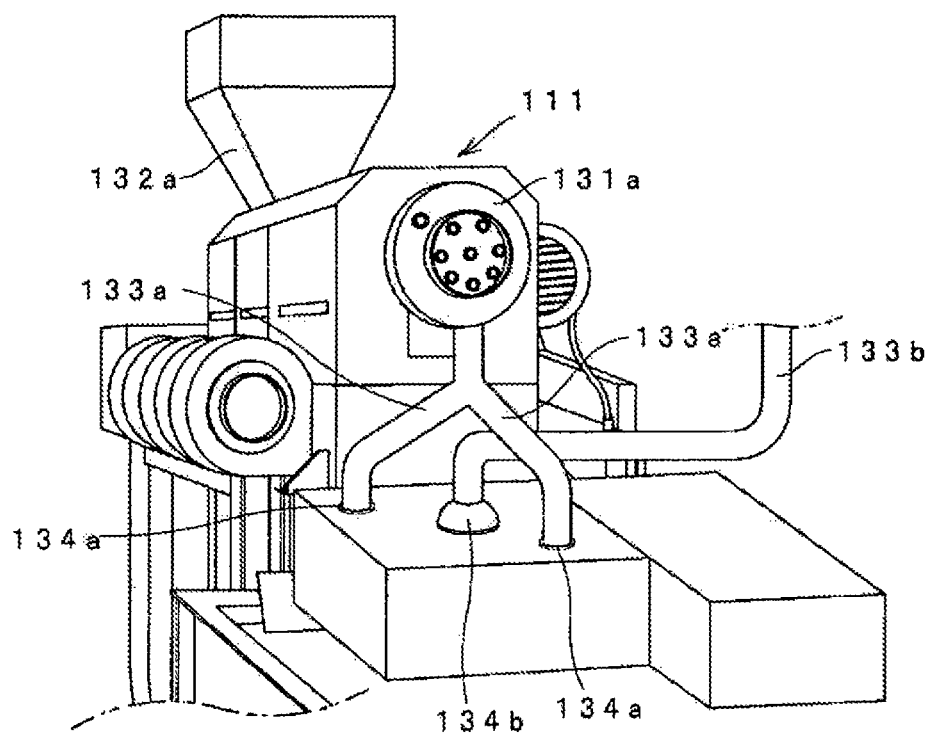
FIGS. 17A and 17B are drawings illustrating other exemplary embodiments of the apparatus for manufacturing a three-dimensional netted structure.
Figure 17B:
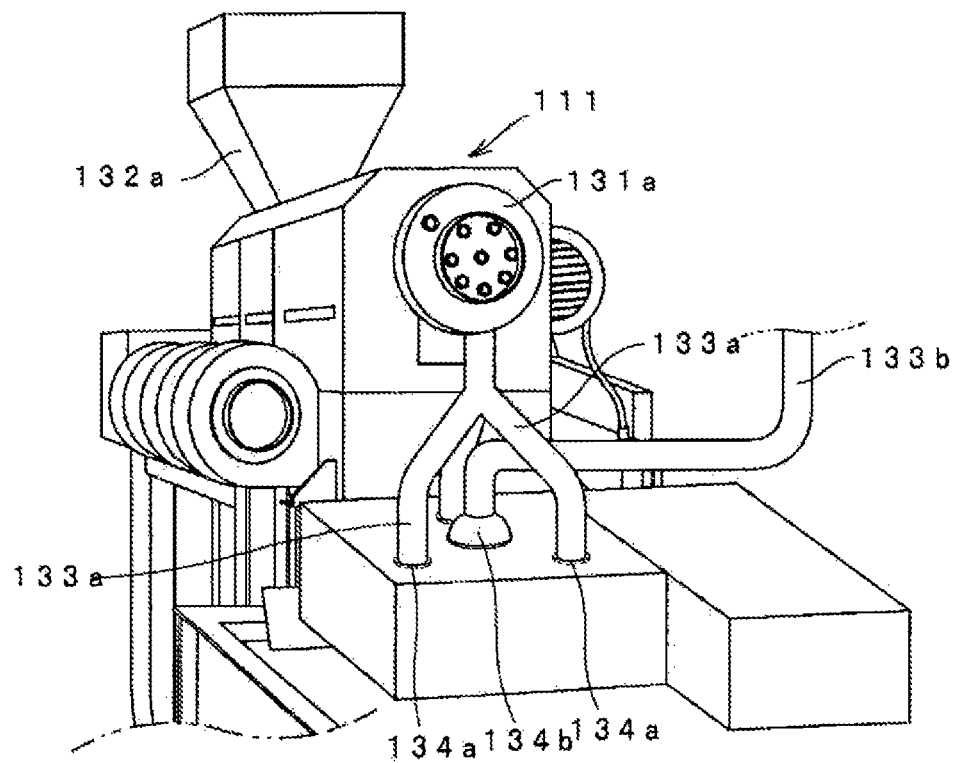

As shown in FIGS. 16A and 16B, the complex die 135 has a frame type partition wall 139 in an inner region of an outer frame 138 so that the interior of the complex die 135 is divided into two chambers 137a, 137b, i.e., the complex die is formed so that the same kind of raw material or two different kinds of raw materials supplied thereto via the raw material supply pipes 133a, 133b are not mixed with each other. Even when the raw material supplied through these supply pipes is the same, it is preferable to provide the partition wall 139 for the purpose of regulating the extrusion rates separately. The particular parts of the interior of the die of the extrusion molding machine 111 are formed by utilizing the corresponding parts of the first mode of embodiment. Although the raw material supply pipe 133a is made to branch into four members, the pipe may also be made to branch into a suitable number of members, such as two members (refer to FIG. 17A), three members (refer to FIG. 17B), etc.

Figure 18A:
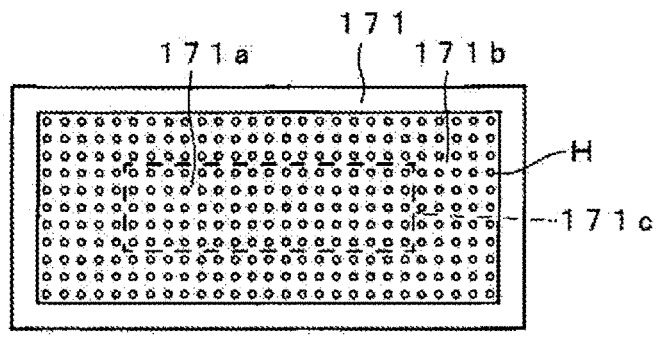
FIGS. 18A, 18B and 18D are plan views showing other exemplary embodiments of mouthpieces of dies.

A mouthpiece 136 has not smaller than two regions so that a raw material is supplied thereto separately. Therefore, the regulation of the extrusion speed or extrusion rate of filaments is made very easily, and the moldability of the raw material is improved remarkably. The details of a description of the mouthpiece will be given for comparison by quoting the corresponding parts of the description of apparatus 10. In this embodiment, a mouthpiece 171 (the area of the region thereof which is provided with holes H accounts for 90% of a total area of the mouthpiece 171)(refer to FIG. 18A) having the holes at substantially regular intervals or at suitable intervals is used. In this mouthpiece 171, an inner region 171a and an outer region 171b are defined by a partition wall 171c shown by a broken line, and filaments of the same or different materials are extruded separately and independently from these regions correspondingly to raw material supply pipes 133a, 133b.

Figure 18B:
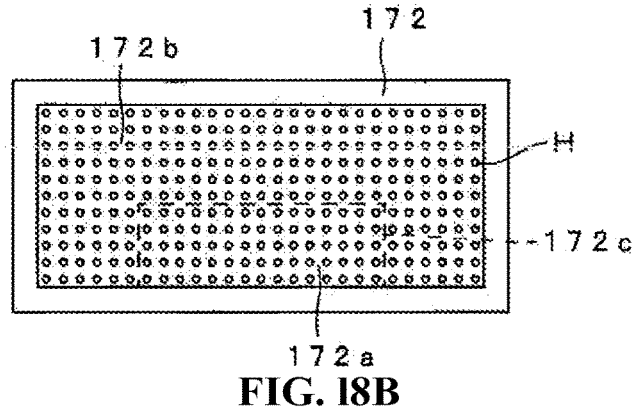

A mouthpiece 172 (refer to FIG. 18B) may also be used, in which an inner region 172a and an outer region 172b which are provided with a multiplicity of holes H are defined by a partition wall 172c shown by a broken line. The inner region 172a is formed in a deflected manner with respect to the outer region 172b so that the filaments corresponding to the inner region 172a are separated easily.

Figure 18C:
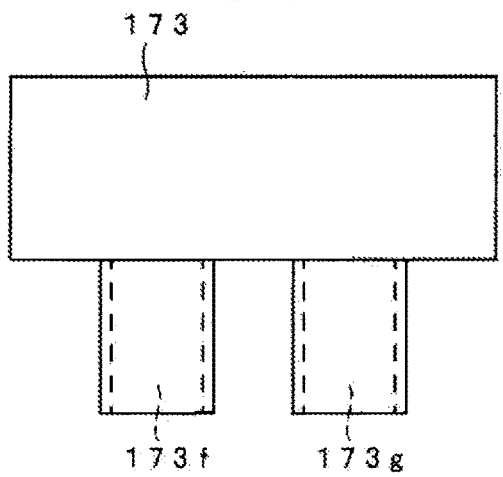
FIG. 18C is a front view of the mouthpiece shown in FIG. 18D.
Figure 18D:
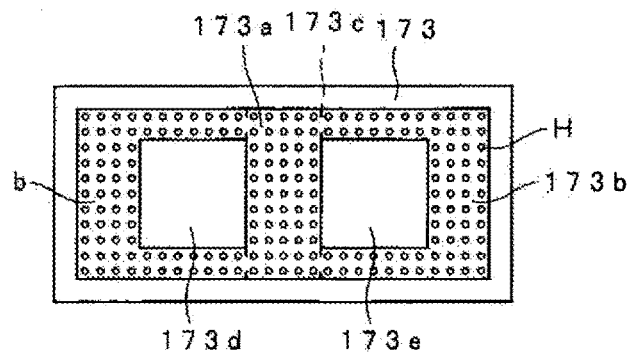

A mouthpiece 173 (refer to FIGS. 18C and 18D) may also be used. An inner region 173a and an outer region 173b which are provided with a multiplicity of holes H are defined by a partition wall 173c shown by a broken line. The inner region 173a is held between the pair of outer region 173b. In order to form hollow portions in this mouthpiece, regions 173d, 173e which do not have holes H are provided in the portions thereof which correspond to the hollow portions, and cross-section square introduction members (pipes and the like) 173f, 173g extending downward are provided on lower portions of the two regions.

Figure 19A:
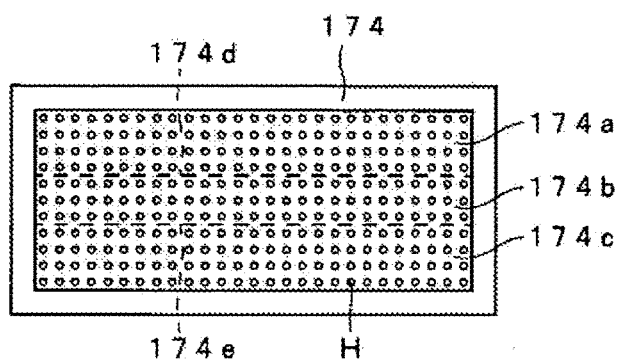
FIGS. 19A, 19B, 19C, and 19D are plan views showing exemplary embodiments of the mouthpieces of the dies.

A mouthpiece 174 (refer to FIG. 19A) may be also used, in which an upper region 174a, a central region 174b and a lower region 174c which are provided with a multiplicity of holes H are defined by partition walls 174d, 174e shown by broken lines to form three stages (three layers) of regions.

Figure 19B:
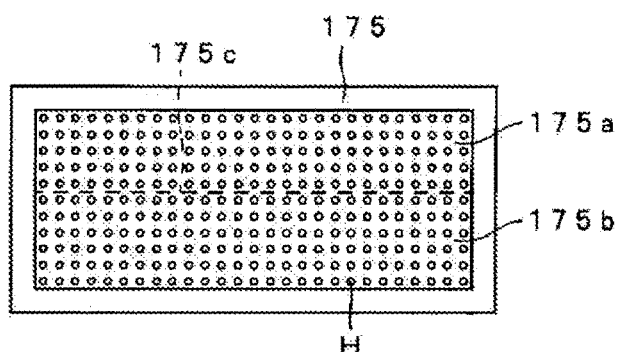

A mouthpiece 175 (refer to FIG. 19B) may be also used, in which an upper region 175a and a lower region 175b which are provided with a multiplicity of holes H are defined by a partition wall 175c shown by a broken line to form two stages (two layers) of regions.

Figure 19C:
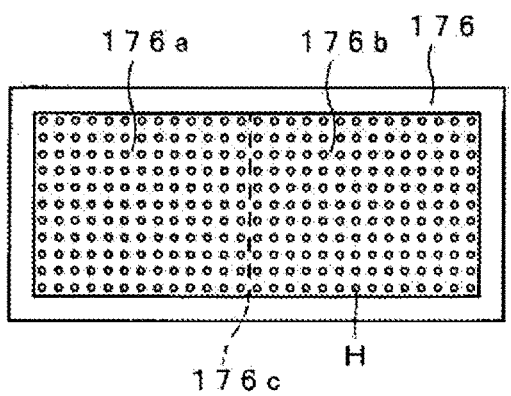

A mouthpiece 176 (refer to FIG. 19C) may be also used, in which a left region 176a and a right region 176b which are provided with a multiplicity of holes H are defined by a partition wall 176c shown by a broken line to form two rows (two layers) of regions.

Figure 19D:
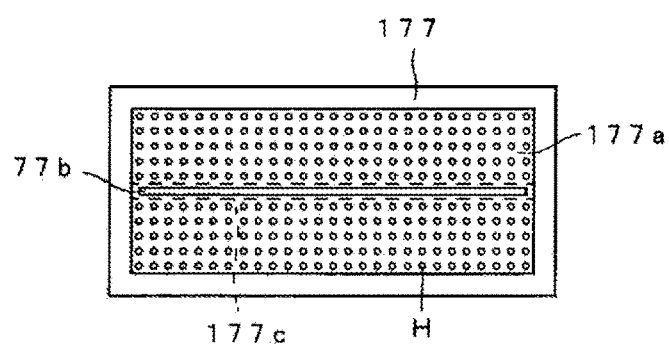

A mouthpiece 177 (refer to FIG. 19D) may be also used, in which a region 177a provided with a multiplicity of holes H, and a slit (linear hole) 177b formed in a suitable portion, such as a central portion, etc. so as to extend parallel to a predetermined direction (lengthwise direction in this example) are defined by partition walls 177c shown by broken lines. The slit 177b exists in a region between the partition walls 177c shown by broken lines. The width, length or position of the slit (linear hole) 177b can be suitably selected. When a raw material is supplied from the same die to the region 177a having many holes H and slit (linear hole) 177b, the wavy form of FIG. 3B is deformed, and the moldability of the material is deteriorated in some cases. However, when the above-mentioned mouthpiece 177 is used, the raw material is supplied from not smaller than two kinds of extrusion molding machines 111 separately and independently to the holes H of the region 177a and slit 177b, so that a suitable wavy form is obtained. Instead of the slit 177b, holes H may be provided. In such a case, it is recommended that the density of the holes H be set high.

Besides these mouthpieces, mouthpieces of various other specifications can be used in practice. The density of the holes H formed in the above-described mouthpieces is preferably set to 1 to 5/cm².

The method of manufacturing a three-dimensional netted structure 1 is utilized.

According to the three-dimensional netted structures 101 to 107, a resin difficult to be separated or a resin impossible to be separated is used to form the first region 101a, while a resin possible to be separated is used to form the second region 101b, this resin being separated during a recycling operation, so that the recycling operation can be carried out repeatedly.

A three-dimensional netted structure divided into regions in accordance with the properties of the thermoplastic resins can be manufactured, and the recycling of the thermoplastic resins can be done smoothly. A simple operation, such as a region separating operation or some other similar operation advantageously makes it possible to change the shape of the netted structure afterward. Since a raw material is supplied to the mouthpiece from a plurality of extruders separately and independently, the moldability of the material for the three-dimensional structure is improved.

An apparatus 210 for manufacturing three-dimensional netted structure aims at providing a method of and an apparatus for manufacturing a three-dimensional netted structure, capable of preventing the deformation of the endless belts, which causes inconveniences, omitting a finishing operation on a later stage, improving the degree of straightness of the surfaces of a netted structure, meeting a demand for a netted structure of modified shapes, and manufacturing a netted structure of an improved durability.

The construction of the parts of the apparatus for manufacturing the three-dimensional netted structure 210 which are different from the corresponding parts of the apparatuses of other embodiments will be described by utilizing the description of apparatus 10, etc.

Figure 20:
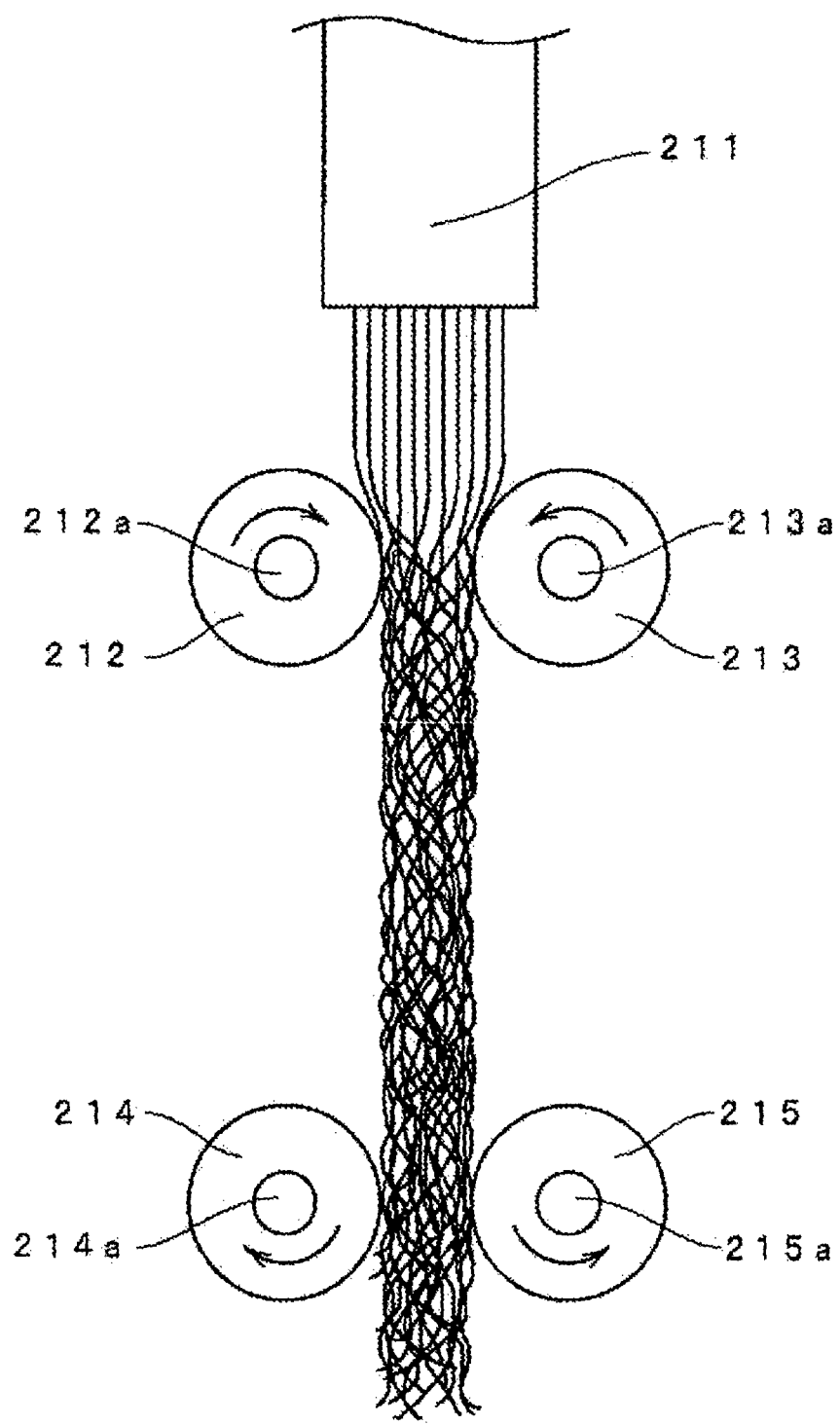
FIG. 20 is an explanatory drawing showing the condition of an operation of another exemplary embodiment of the apparatus for manufacturing a three-dimensional netted structure.

The apparatus 210 is formed of an extrusion molding machine 211, a pair of rolls 212, 213 provided in horizontal positions spaced from each other by a predetermined distance, a pair of rolls 214, 215 (refer to FIG. 20 and FIGS. 21A and 21B) provided below and in alignment with the two rolls 212, 213 horizontally so as to be spaced from each other by a predetermined distance, a motor for driving the rolls 212 to 215, a transmission formed of chains and gears and adapted to change the moving speed of the rolls 212 to 215, a water tank for partly submerging of the two rolls 212, 213 and completely submerging the two rolls 214, 215, a control unit, meters, etc. Referring to FIG. 20, a structure provided with three rolls by removing one of the lower rolls may be employed.

Figure 22A:
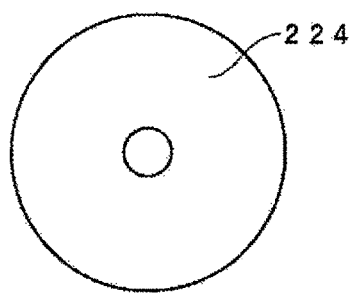
FIGS. 22A, 22B, 22C, 22D, 22E, 22F, and 22G are side views of other embodiments of rolls in the same apparatus for manufacturing a three-dimensional netted structure.
Figure 22B:
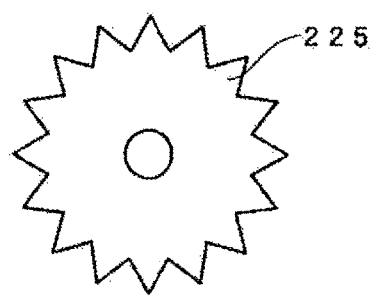
Figure 22C:
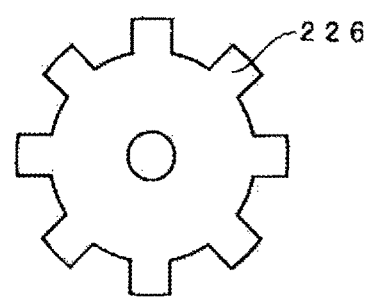
Figure 22D:
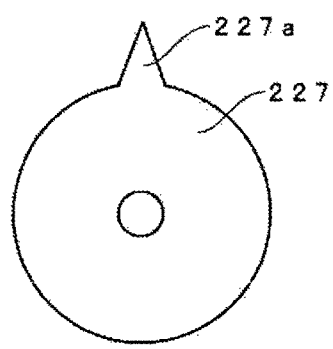
Figure 22E:
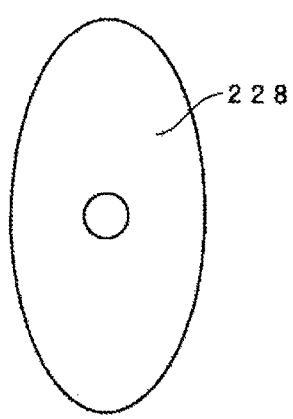
Figure 22F:
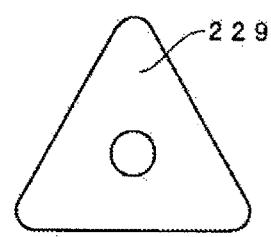
Figure 22G:
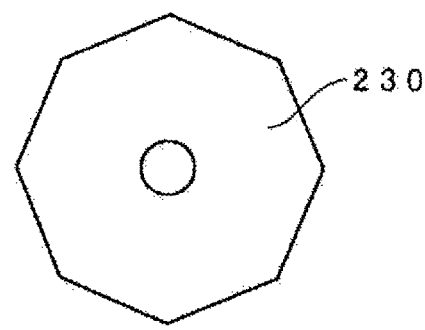
Figure 24A:
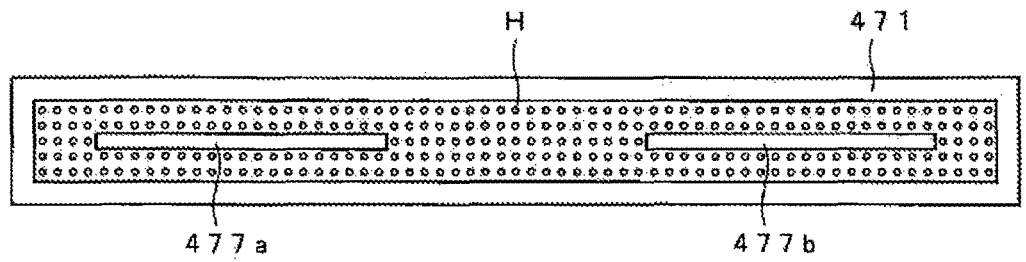
FIG. 24A is a plan view of a mouthpiece of a die in another exemplary embodiment of the apparatus for manufacturing a three-dimensional netted structure.
Figure 24B:
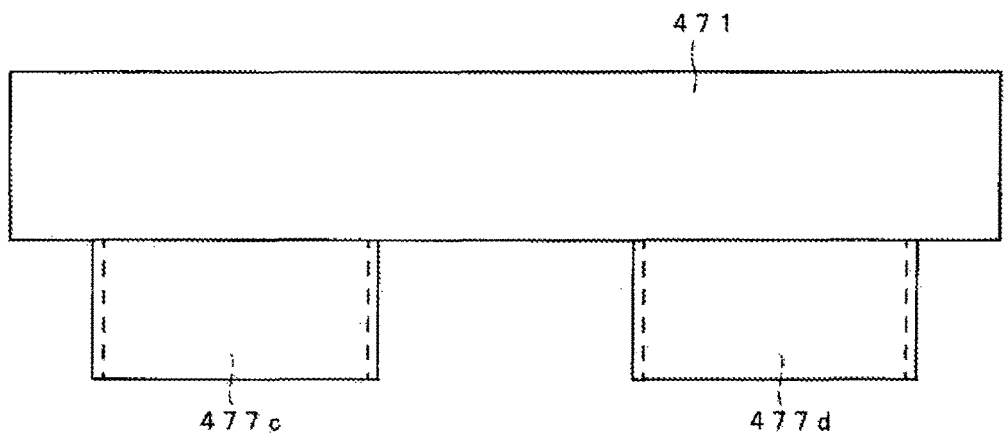
FIG. 24B is a front view thereof.
Figure 24C:
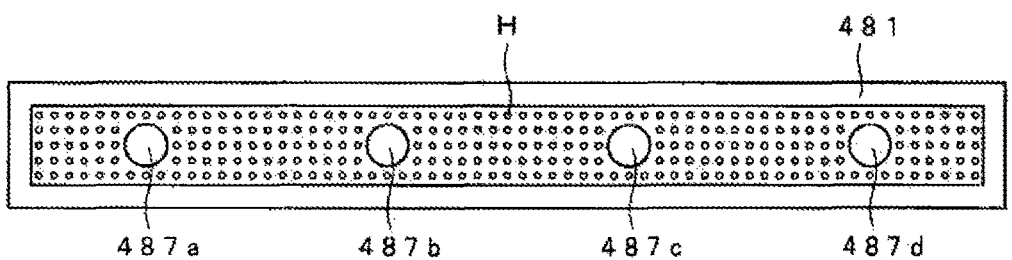
FIG. 24C is a plan view of a mouthpiece of another die.
Figure 24D:
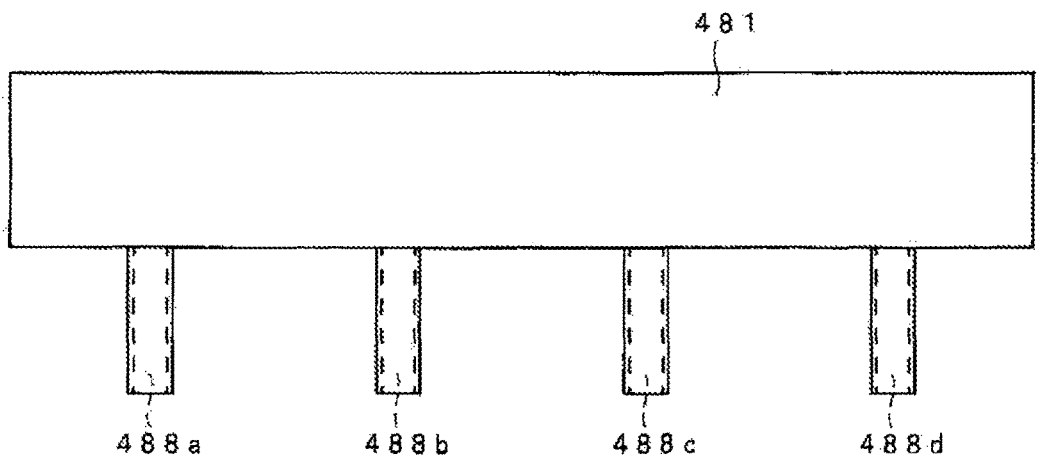
FIG. 24D is a front view thereof.

The rolls 212, 213 may be formed of cross-section circular rolls 224 (refer to FIG. 22A) as well as rolls of modified shapes. Various modified modes of rolls are conceivable which include, for example, a roll 225 (refer to FIG. 22B) having a cross-section saw-tooth outer circumference, a roll having continuously formed recesses and projections, for example, a roll 226 (refer to FIG. 22C) having an outer circumferential surface similar to that of a gear in section, a roll 227 (refer to FIG. 22D) having not smaller than one projection 227a (for example, a triangular or circular projection) on an outer circumferential surface thereof, a cross-section elliptic roll 228 (refer to FIG. 22E), a cross-section triangular or a hand-made or mechanically molded rice-shaped roll 229 (refer to FIG. 22F), a cross-section polygonal roll, for example, a cross-section octagonal roll 230 (refer to FIG. 22G), etc.

Figure 21A:
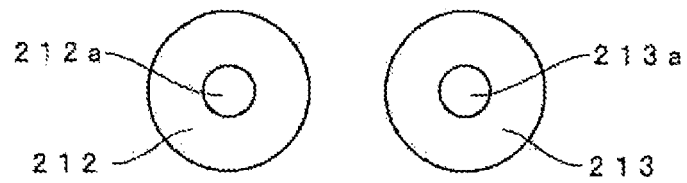
FIGS. 21A and 21B are side views and front views, respectively, of rolls in the same apparatus for manufacturing a three-dimensional netted structure.
Figure 21A:
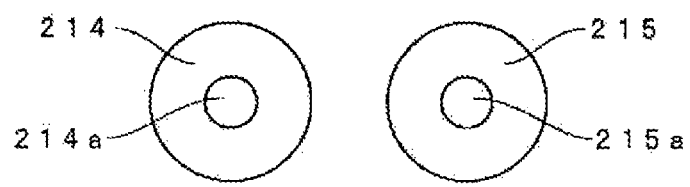
Figure 21B:
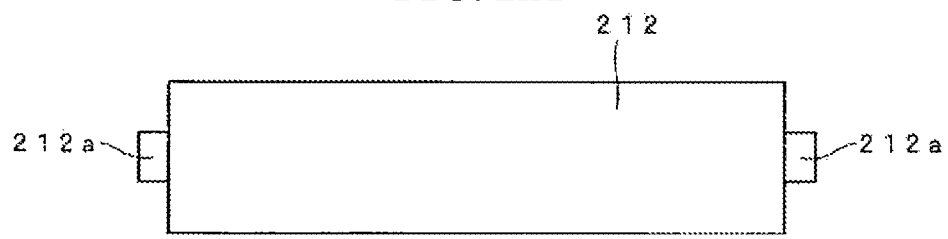
Figure 21B:
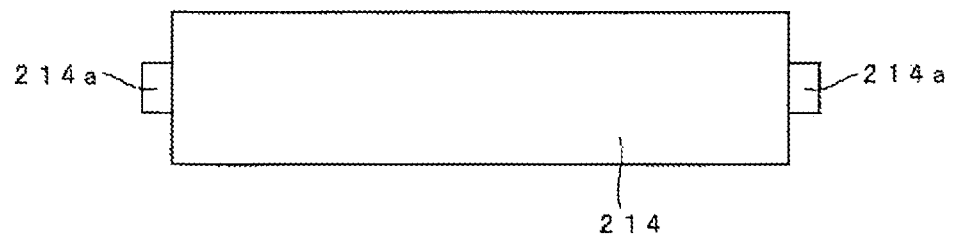

As shown in FIGS. 21A and 21B, the rolls 212 to 215 are provided with driving shafts 212a to 215a respectively. The driving shafts 212a to 215a are supported rotatably on the respective bearings, and driven in the directions of arrows in FIG. 20 by a driving motor via the transmission.

According to the apparatus 210 described above for manufacturing a three-dimensional netted structure, it becomes possible to omit a finishing operation carried out in a later stage, heighten the degree of straightness of surfaces of a netted structure, meet a demand for obtaining netted structures of modified shapes and improve the durability of a netted structure.

A three-dimensional netted structure 401 is a netted structure in which sparse portions and dense portions are provided. This netted structure can be applied to, for example, a wall material from which a gardening container is suspended, a deck on which a gardening container is placed, a blind, a screen, a bamboo blind-like article, a fence, and a gardening cushioning material applied to a floral decoration and the like.

The sparse and dense portions of the three-dimensional netted structure 401 are formed through an operation for regulating a transfer speed of the draw-down unit, for example, endless conveyors or rollers, by controlling the rotational speed of the motor. This method enables a netted structure having sparse and dense portions stabler than those of a netted structure manufactured by regulating the liquid pressure of the extrusion molding machine to be obtained.

As shown in FIG. 23A, low-density portions 401a and high-density portions 401b are formed in order and in repetition. In addition, as shown in FIG. 23B, hollow portions 406A, 406B are provided through a netted structure so as to extend in a predetermined direction. A modified mode of this netted structure may be a gardening cushioning material 402 having a plurality of small through holes 407a to 407d extending therethrough in the lengthwise direction as shown in FIG. 23D. The ranges of the density of the sparse portions 401a and dense portions 401b can be set suitably. The raw material of the thermoplastic resin, etc. will be described by utilizing the description embodiments described above.

In order to make hollow portions in the netted structure, regions 477a, 477b not provided with the holes H are formed in the corresponding parts of the mouthpiece 471 as shown in FIGS. 24A, 24B, 24C, and 24D, and downwardly extending cross-section square introduction members (plate members, pipes, etc.) 477c, 477d are provided (refer to FIG. 24B) on lower portions of these regions. There is another example of the mouthpiece which is formed of a mouthpiece 481 (the area of the region thereof which is provided with the holes H accounts for 90% of a total area of the mouthpiece)(refer to FIG. 24C) in which a predetermined number of holes H are formed at substantially regular intervals. In order to form hollow portions in the netted structure, this mouthpiece is provided with regions 487a to 487d not provided with the holes H in the corresponding parts thereof, and downwardly extending cross-section square introduction members (plate members, pipes, etc.) 488a to 488d are provided (refer to FIG. 24D) on lower portions of the mentioned regions. The density of the holes H formed in the mouthpiece is preferably 1 to 5/cm$^2$. Besides these mouthpieces, mouthpieces of various specifications can be used in practice.

Figure 25:
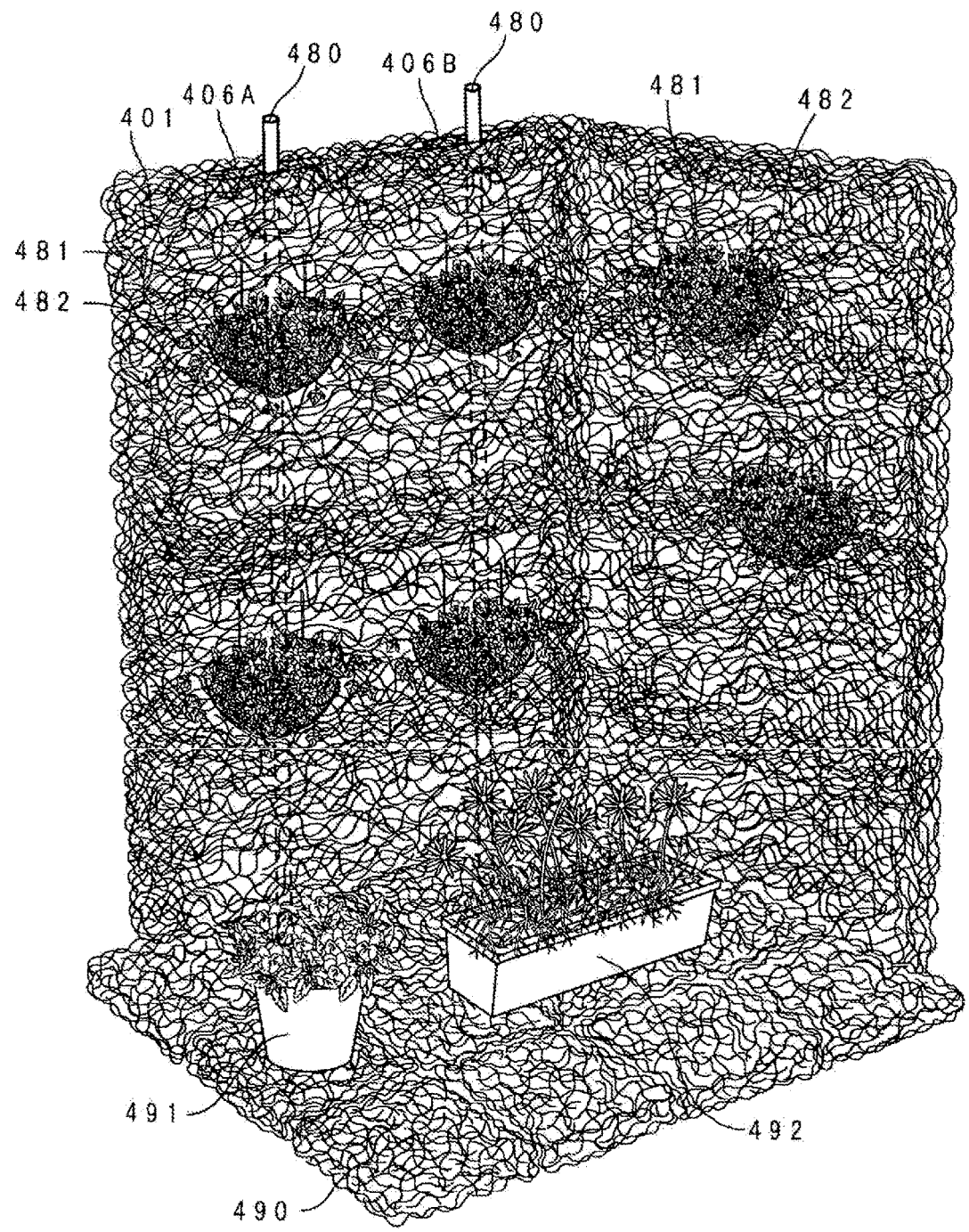
FIG. 25 is an explanatory drawing showing the condition of use of another exemplary embodiment of the three-dimensional netted structure.

The three-dimensional netted structure 401 can be used as substitutes for a wall member from which a gardening container is suspended, a wall member for a floral decoration, a blind and a fence. For example, as shown in FIG. 25, piles 480 (posts may be used instead) are driven into the ground and set up, and the resultant piles are thrust into the hollow portions 406A, 406B of the three-dimensional netted structure 401 and fixed. The three-dimensional netted structure 401 may be divided into a plurality of parts, and dimensional selectivity thereof may be secured by combining the divided netted structures with each other. A suitable number of hanging baskets 482 provided with hooks 481 are hung on the sparse portions 401a. The hooks 481 are hung on sparse portions 401a more easily than on dense portions 401b.

Figure 26:
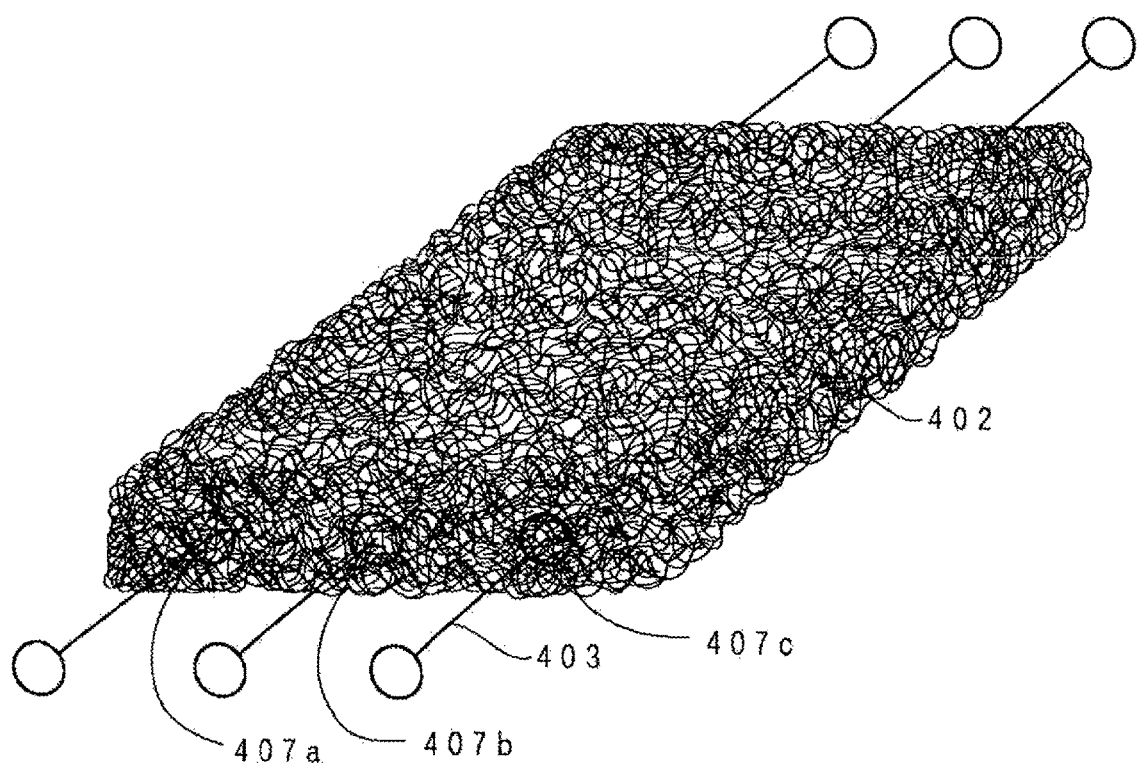
FIG. 26 is an explanatory drawing showing the condition of another use of another exemplary embodiment of the three-dimensional netted structure.

This netted structure can also be utilized as a deck. For example, a three-dimensional netted structure 490 is not provided with hollow portions but it is manufactured in a step similar to the step of manufacturing the three-dimensional netted structure 401, so that a culture pot 491, a container 492 and the like can be placed thereon. The netted structure 490 can also be applied to a screen, a bamboo blind-like article, a fence, a floral decoration, etc. As shown in FIG. 26, a three-dimensional netted structure 402 can be utilized as a roof, a screen, and a partition for plants in a median strip of a road. The netted structure 402 is formed so that it can be fixed to a structure by a suitable device or by passing connecting members 403, such as strings, rings, pipes and the like through small holes 407a to 407c thereof. When this netted structure is utilized as a partition for the plants in a median strip of a road, a glare-proofing effect is displayed with respect to the light of an automobile.

According to the three-dimensional netted structure 401 described above, it can be applied to a wall member for hanging baskets, a deck, a blind, etc. Moreover, this netted structure reduces the manufacturing cost, and has durability with respect to the wind and rain and sunlight. The netted structure is not rotted, and the flexure thereof does not occur. The netted structure is rarely discolored. This netted structure can employ various colors, and the coloring of the netted structure can be done freely, so that the range of the selection of colors expands. Moreover, the netted structure has a very high resiliency, and enables a blinding effect to increase and an outer appearance of different sense of quality to be provided, so that the netted structure is very convenient.

The three-dimensional netted structure can also be used as a seedbed for planting a roof with trees. The netted structure is laid in a hole or a recess formed in a suitable position on a gas-permeable and a water-permeable tile. The culture earth is put in the hole or recess, and tree is planted therein.

The three-dimensional netted structure can also be used as a pavement material by pasting gas-permeable and water-permeable tiles on an upper surface thereof. Owing to the netted structure, the temperature can be reduced.

A three-dimensional netted structure can also be manufactured the characteristics of which reside in that the netted structure is formed by preparing as a raw material or a main raw material a thermoplastic resin containing a brittleness causing element, such as an inorganic substance, for example, talc; forming a plurality of helically and randomly entangled and partly and thermally bonded filaments of the raw material by extrusion molding; and cooling these filaments with a liquid, the brittle fracture of the product becoming able to be effected by applying an external force thereto.

A three-dimensional netted structure obtained by preparing a thermoplastic resin as a raw material or a main raw material; forming a plurality of helically and randomly entangled and partly and thermally bonded filaments of the raw material by extrusion molding; cooling these filaments with a liquid, and applying a fire resistant material to the resultant filaments or enclosing the filaments with a nonwoven carbon fiber, or a similar three-dimensional netted structure made of the same thermoplastic resin to which the fire resistant material is added can also be manufactured. The three-dimensional netted structure enclosed with a nonwoven cloth of carbon fiber can be provided in the ceiling and walls.

Figure 27:
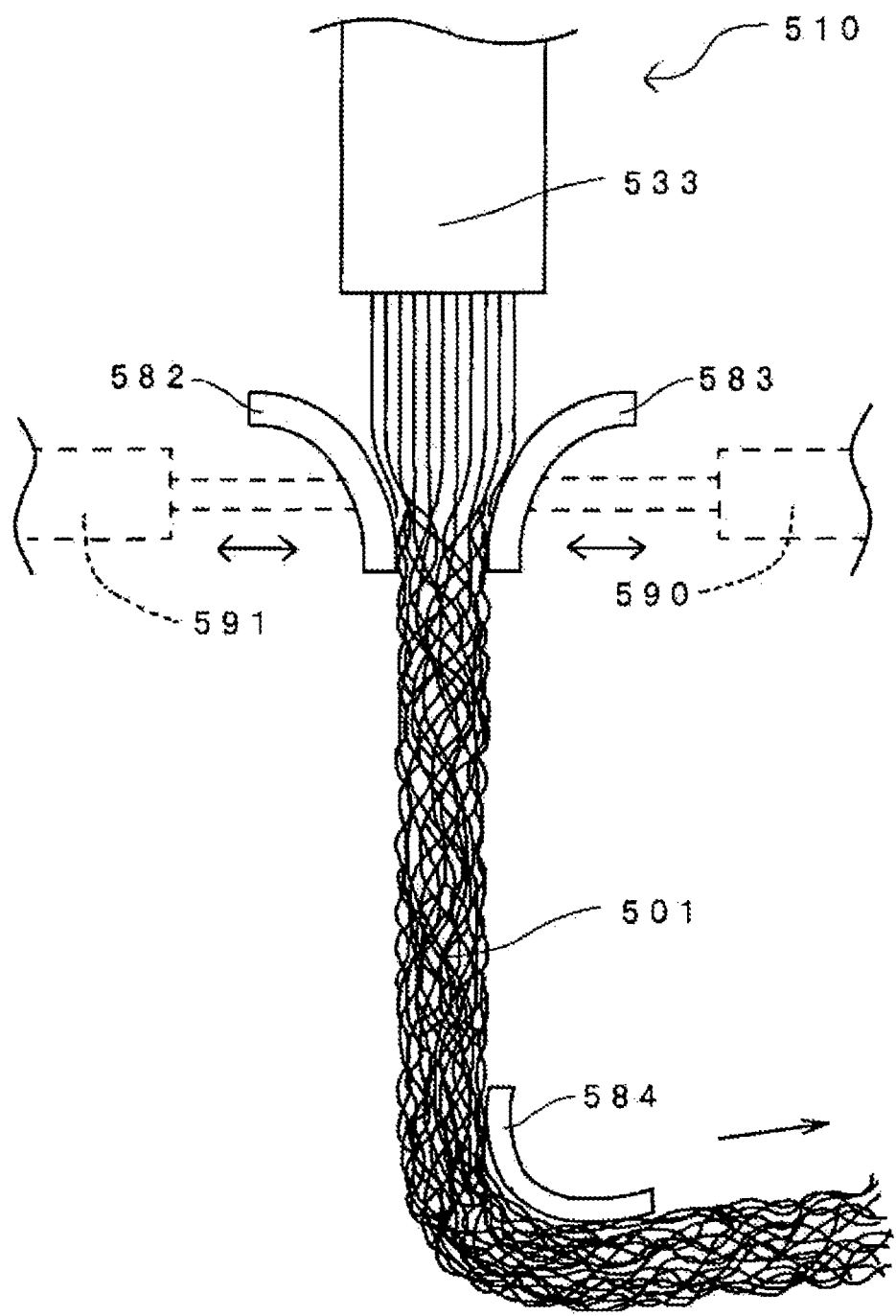
FIG. 27 is a construction diagram of a part of another exemplary embodiment of the apparatus for manufacturing a three-dimensional netted structure.

A three-dimensional netted structure 510 is manufactured by forming a three-dimensional netted structure 501 by using curved plates 582, 583 as shown in FIG. 27, instead of using the endless members and rolls. The curved plates 582, 583 extend perpendicularly to the surface of the drawing, and are given at their outer surfaces a slidability by coating the same with polytetrafluoroethylene. The curved plates are rectangular in side elevation. The curved plates 582, 583 are arranged so that a distance therebetween decreases from upper portions thereof toward lower portions thereof. The curved plates 582, 583 may have a fixed structure, or they may be formed so that the density and shape thereof in the lateral and longitudinal directions can be varied by rendering a distance of the curved plates variable as shown by broken lines by reciprocating driving units 590, 591 (for example, fluid pressure cylinders). A curved plate 584 is also provided below the curved plates 582, 583, and introduces the netted structure 501 suitably to a downstream side draw-down unit.

An apparatus 601 for manufacturing a three-dimensional netted structure in other exemplary embodiment is explained below referring to FIGS. 28, 29A, 29B, 30A, and 30B. Reference numbers in the sixth exemplary embodiment are in the 600s corresponding to reference numbers of similar members in the first exemplary embodiment. Explanation of the first exemplary embodiment is quoted herein.

The inventor has developed an iron chute and then a stainless steel chute and a chute which surface is coated by a layer made of TEFLON®. However, there were problems that they needed too much water, that water did not spread evenly on the chutes, that oil is attached on the surface of the chutes, and that resistance was high. The inventor then developed a shot blasted chute with a surface roughness of from Rz 1 to 80. However, it had similar problems as the stainless steel chute and the TEFLON® chute except that necessary water was reduced. The inventor then developed a chute, of which surface was not polished and was ceramic-coated instead, and a metal mesh chute. However, both of them had similar problems as the shot blasted chute. The inventor then covered the surface of a chute with a stretched water-permeable sheet (a cloth, for example) and supplied water on the chute and the water-permeable sheet. The inventor has thus invented an apparatus and a method for manufacturing a three-dimensional netted structure with a smooth surface and a high accuracy of dimension that can solve all of the above problems.

Water amount can be made proper according to the present invention. Too much supplied water on the chute cools filaments too much, and loops of filaments cannot be bonded to each other adequately. If supplied water is too little, resin falling from the nozzle may stick to the surface of the chute to make an uneven surface of the product, or to make filaments be stretched thin. Additionally, water amount may be varied according to the condition of the pump when using well water. Water amount may be varied with time even when using tap water. Such variation in water amount may affect surface state and bonding state of the product.

In the present invention, water spreads evenly by using a water-permeable sheet. There is no influence of oil derived from resin. At first, there was a problem that the surface of the product was concaved due to corrugation in the water-permeable sheet when using rather high amount of water. This problem has been solved by fixing an upper part and a lower part of the water-permeable sheet to the chute with fixing members.

Maintenance can be done by only changing the water-permeable sheet once a month, so maintenance is easy.

Inclination angle of the chute is preferably 35 to 45 degrees. The chute has longitudinal side chutes located longitudinally, lateral side chutes located laterally and a rectangular hole formed by assembling the longitudinal side chutes and the lateral side chutes in a rectangular shape. The lateral side chutes have an inclination angle steeper than that of the longitudinal side chutes. The lateral side chutes are shorter than the longitudinal side chutes. Usually, it is sufficient to supply water on only the longitudinal side chutes, although water may be supplied also on the lateral side chutes. Cross-section of the chutes may not be angled at two points.

Figure 28:
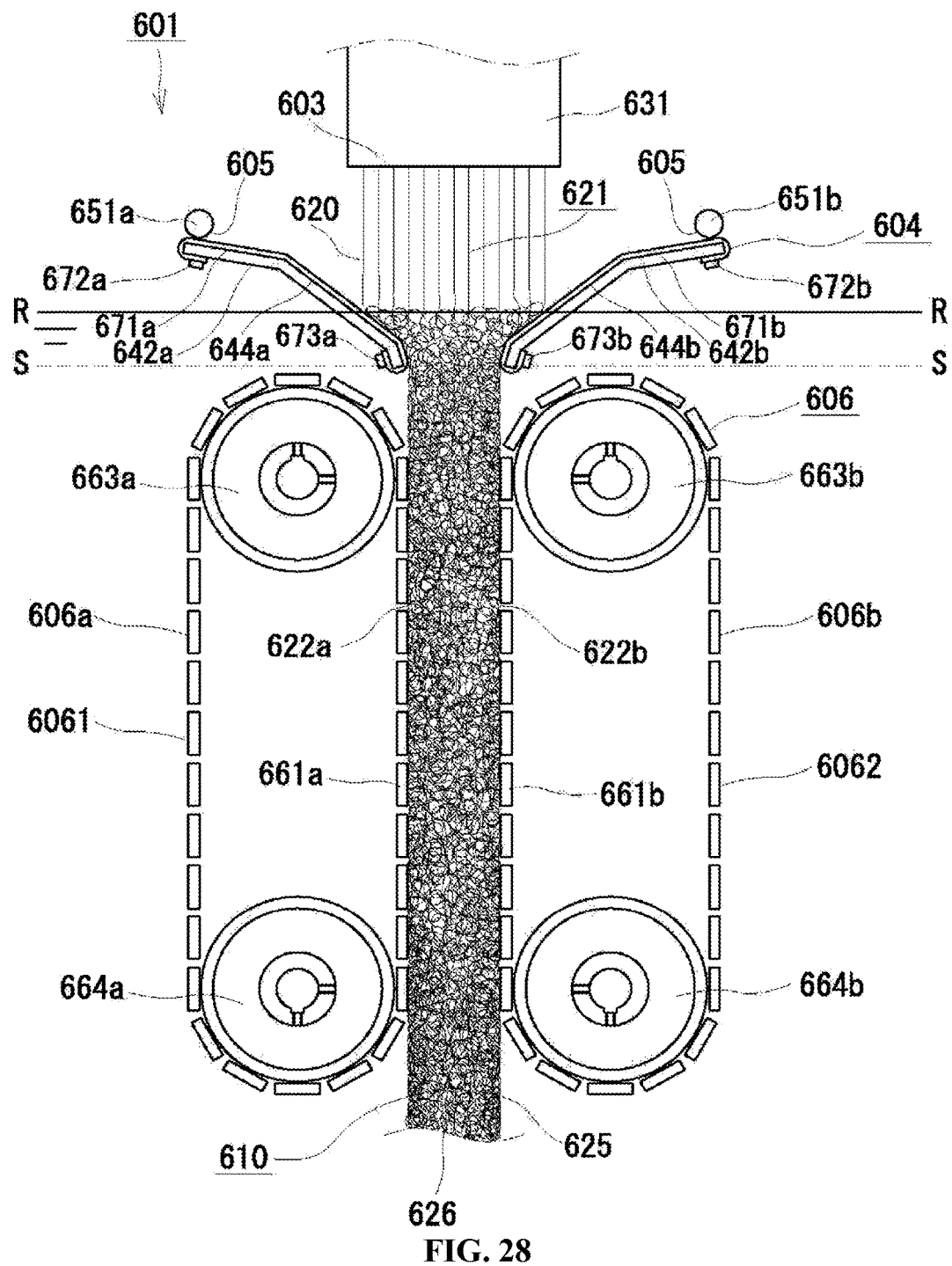
FIG. 28 is an explanatory drawing showing the condition of an operation of an apparatus 601 for manufacturing a three-dimensional netted structure in the exemplary embodiment.
Figure 29A:
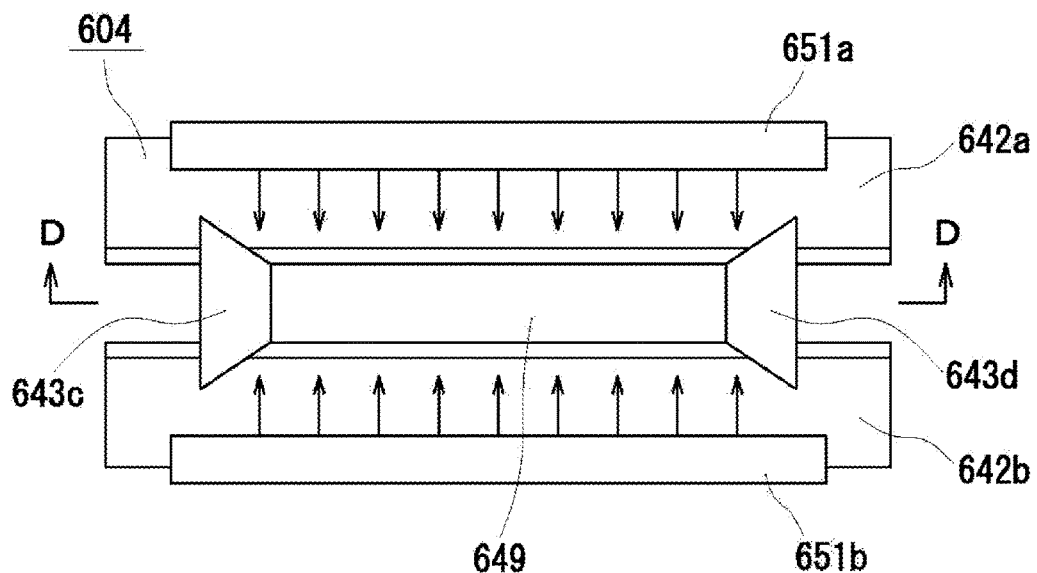
FIGS. 29A and 29B show a chute 604 in the exemplary embodiment.
Figure 29B:
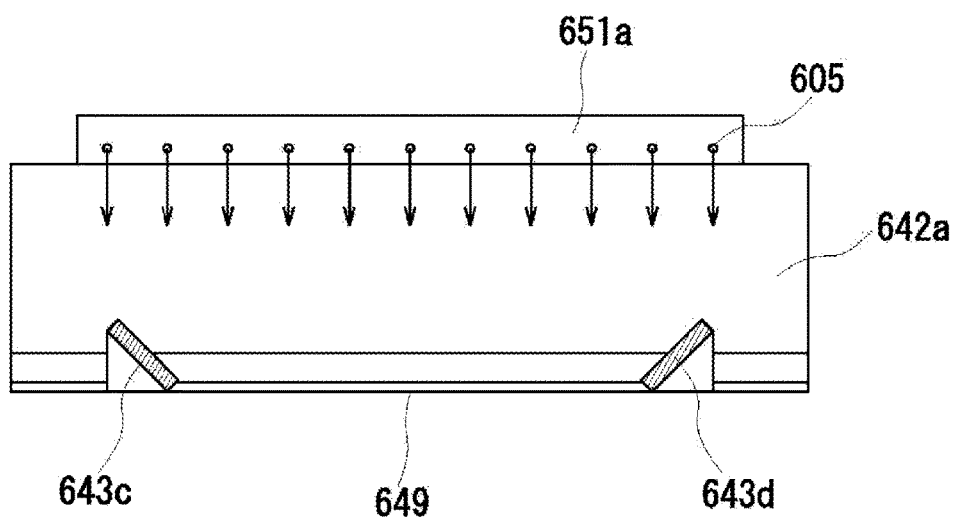

Water level R, S as shown in FIG. 28 is preferably higher than the lower end of the chute or the first angled point of the chute. Water level S shows the minimum level. Water level is ordinary between the levels R and S. Distance between the drawing-down units may be narrower or wider than the distance between the lower ends of the longitudinal side chutes. An exemplary embodiment with the same distance is shown in the figure. Water level R is higher than water level S by from 2 to 30 mm, preferably by from 3 to 20 mm, more preferably by from 5 to 12 mm.

Water amount of 0.8 L/min per 1 m of chute is not sufficient. Water surface becomes almost even when water amount is 1.0 L/min, and becomes excellently even when water amount is 1.3 L/min. Water amount of 4.0 L/min it too much, and air is accumulated under the water-permeable sheet. Fusion bonding strength (tensile strength) was measured using a sample of the three-dimensional netted structure having a thickness of 35 mm, a width of 5 cm, a length of 8 cm and an apparent density of 0.0749 g/cm³. Fusion bonding strength was measured with a spring balance with the upper end and the lower end of the sample being fixed with chucks. Forces applied to the spring balance were measured when the sample was stretched long by 10 mm (namely, when fusion bonding began to break) and when the sample was stretched long by 30 mm. In the case with the water-permeable sheet, the sample was stretched long by 10 mm and fusion bonding began to break at 41.1 N, and was stretched long by 30 mm at 117.6 N under the condition of water amount of 1.5 L/min per 1 m. In the case without the water-permeable sheet, the sample was stretched long by 10 mm and fusion bonding began to break at 25.5 N, and was stretched long by 30 mm at 39.2 N under the condition of water amount of 10 L/min per 1 m. This result shows that high fusion bonding strength can be achieved in the case with the water-permeable sheet.

As shown in FIG. 28, an apparatus 601 for manufacturing a three-dimensional netted structure manufactures a three-dimensional netted structure 610 by entangling the filaments 620 of thermoplastic resin into random loops and thermally bonding the contacting parts of the filaments. The apparatus 601 for manufacturing a three-dimensional netted structure has a mouthpiece 603, a chute 604 located below the mouthpiece 603, water supplying outlets 605 located above the chute 604, a drawing-down unit 606 located below the chute 604. In this exemplary embodiment, the apparatus 601 also has a water-permeable sheet 671 set to cover the surface of the chute 604 and fixing members to fix the water-permeable sheet 671 to the chute 604 at the rear upper part and the rear lower part of the chute 604. Cooling water is supplied on the surface of the chute 604. The cooling water receives the filaments 620 in a surface part of a filament assembly 621, to form loops in the filaments 620 and make the adjacent filaments 620 contact and be entangled with each other. The chute 604 and cooling water move the filaments 620 in the surface part inward of the filament assembly 621 along the inclination of the chute 604 enough to make the surface part smooth with a lower porosity. A surface layer 625 having a higher apparent density and an inner layer 626 having a lower apparent density is thus formed by the chute 604. Width of the filament assembly 621 is reduced to the width of the three-dimensional netted structure 610 with the ratio of 6-25%, preferably 3-10%, more preferably 4-7%.

Chute 604 comprises longitudinal side chutes 642a, 642b and lateral side chute 643c, 643d, and has a rectangular shape in a plan view. A through hole 649 is formed at the center.

The drawing-down unit 606 has a pair of drawing-down units 606a and 606b. The detailed structure thereof is already explained. The longitudinal direction of the drawing-unit 606 is parallel to the longitudinal direction of the chute. The upper part of the drawing-down unit is situated below the longitudinal side chutes 642a and 642b. The distance between the longitudinal side chutes 642a and 642b is the same as the distance between the drawing-down units 606a and 606b. However, the former may be set to be wider than the latter so that the thickness of the three-dimensional netted structure is further narrowed by the drawing-down unit 606. According to the exemplary embodiment, in order to obtain the three-dimensional netted structure 1 as shown in FIG. 1C, a rotational speed of a screw of an extruding machine for the mouthpiece 603 can be set to 70 rpm, and a draw-down speed of the drawing-down unit 606 set to 16.3 m/h.

As shown in FIG. 28, a water-permeable sheet 671 is a sheet member having a water-permeability and comprising water-permeable sheets 671a and 671b respectively covering a surface of the longitudinal side chutes 642a and 642b. The water-permeable sheets 671a and 671b covering the longitudinal side chutes 642a and 642b are respectively fixed to the longitudinal side chutes 642a and 642b with upper fixing members 672a, 672b and lower fixing members 673a, 673b located respectively at the upper part and lower part of the longitudinal side chutes 642a and 642b. Supplying pipes 651a and 651b are provided above the longitudinal side chutes 642a and 642b and above the water-permeable sheets 671a and 671b. In this exemplary embodiment, the water-permeable sheet 671 does not cover the lateral chutes 643c and 643d located vertically to the longitudinal side chutes 642*a*, 642*b* and forming the lateral direction of the three-dimensional netted structure 610 (refer to FIGS. 29A and 29B). However, water-permeable sheets may be set also on lateral side chutes.

Operation and effects of this exemplary embodiment is explained below. As shown in FIGS. 28, 29A, 29B, and 30A, cooling water supplied from the supplying pipes 651*a* and 651*b* to the longitudinal side chutes 642*a* and 642*b* permeates the water-permeable sheets 671*a*, 671*b* on the surface of the longitudinal side chutes 642*a* and 642*b* and forms a cooling water layer on the water-permeable sheets 671*a*, 671*b*, while flowing down the surface of the longitudinal side chutes 642*a* and 642*b*. The surface of the longitudinal side chutes 642*a*, 642*b* has a good hydrophilicity due to the water-permeable sheets 671*a*, 671*b*. This enables the cooling water layer spread evenly all over the surface of the longitudinal side chutes 642*a*, 642*b*, preventing the filaments 620 from sticking to the chute and preventing poor formation of the three-dimensional netted structure 610 due to lack of cooling water. Cooling solidification of the filament assembly 621 and formation of the three-dimensional netted structure 610 can be thus done smoothly.

Figure 30A:
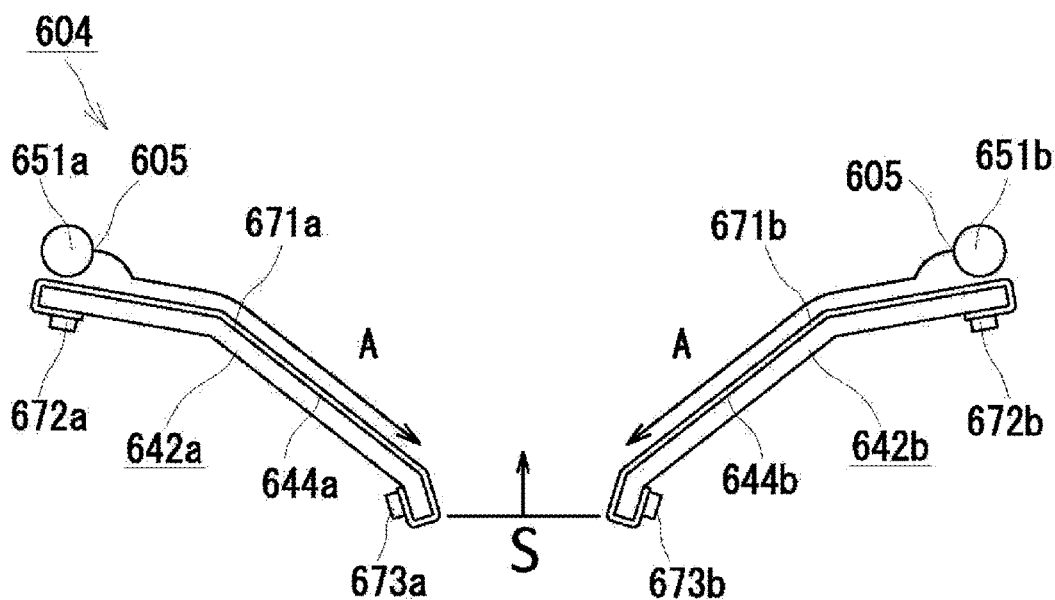
FIGS. 30A and 30B are explanatory drawings showing the effects of a chute 604 in the exemplary embodiment.
Figure 30B:
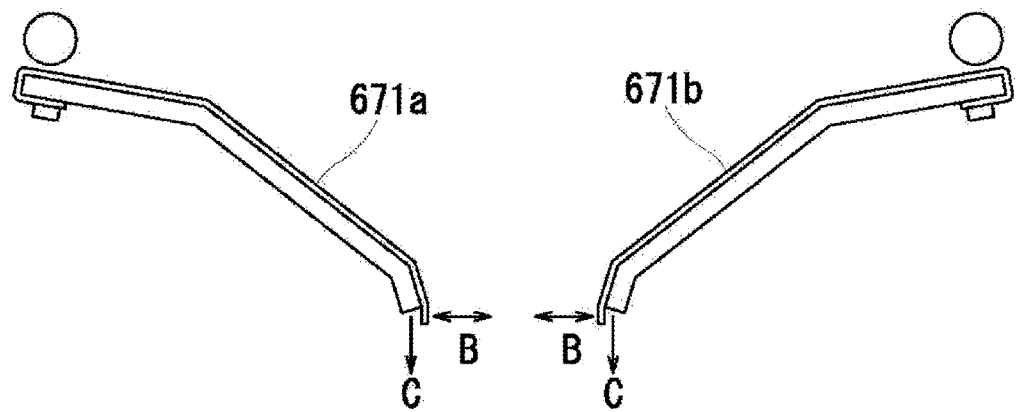

If the lower fixing members 673*a*, 673*b* are not provided as shown in FIG. 30B, significant amount of the cooling water flows off from the rear surface of the water-permeable sheets 671*a*, 671*b* as shown by the arrow C, and the water-permeable sheets 671*a*, 671*b* flap in the direction of the arrow B. This causes a poor formation of the three-dimensional netted structure 610. However, in the apparatus 601 for manufacturing a three-dimensional netted structure of the present invention, the water-permeable sheets 671*a*, 671*b* are fixed to the longitudinal side chutes 642*a*, 642*b* with the upper fixing members 672*a*, 672*b* and the lower fixing members 673*a*, 673*b*. Such poor formation of the three-dimensional netted structure 610 can be thus prevented.

Figure 31:
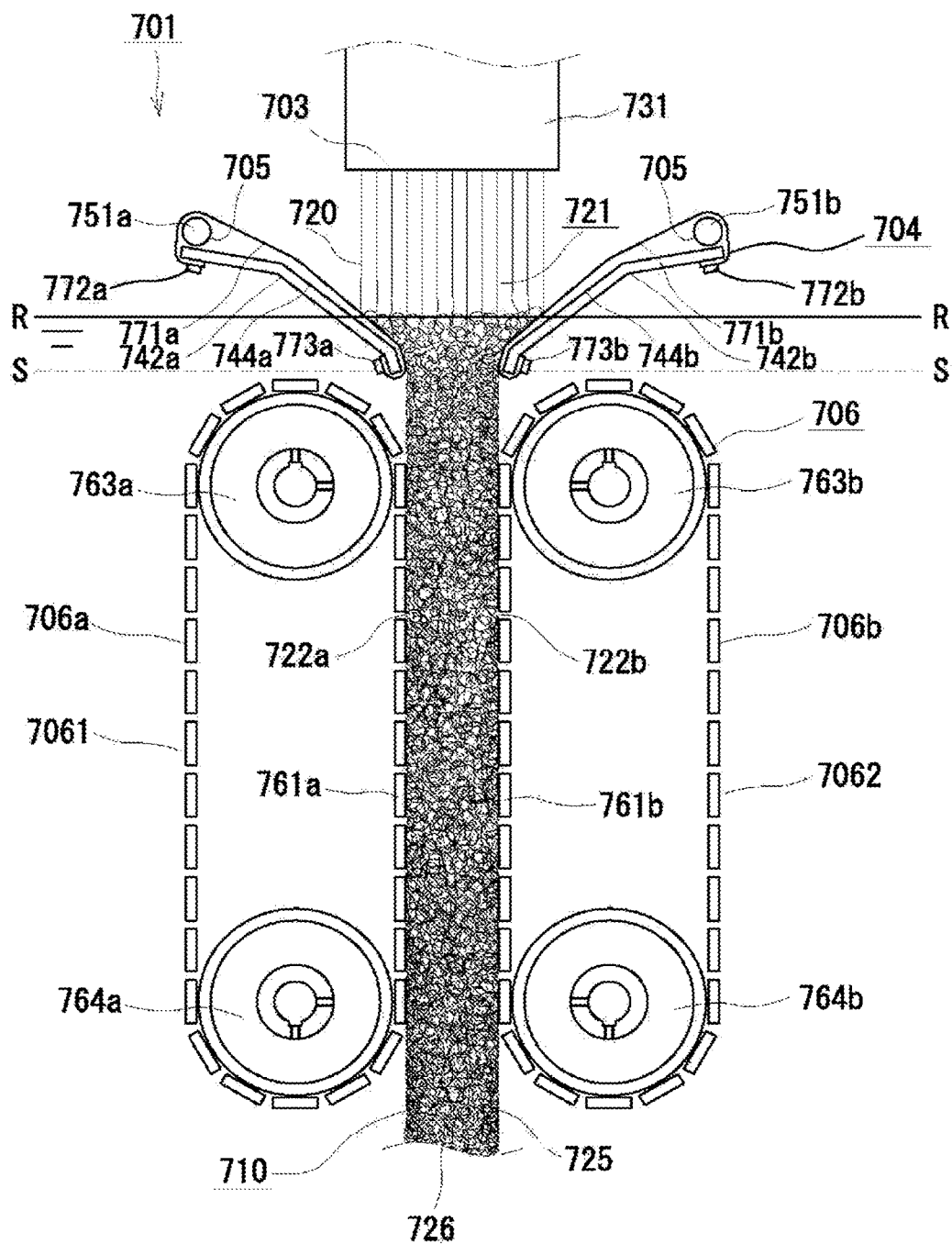
FIG. 31 is an explanatory drawing showing the condition of an operation of an apparatus 701 for manufacturing a three-dimensional netted structure in the exemplary embodiment.
Figure 32A:
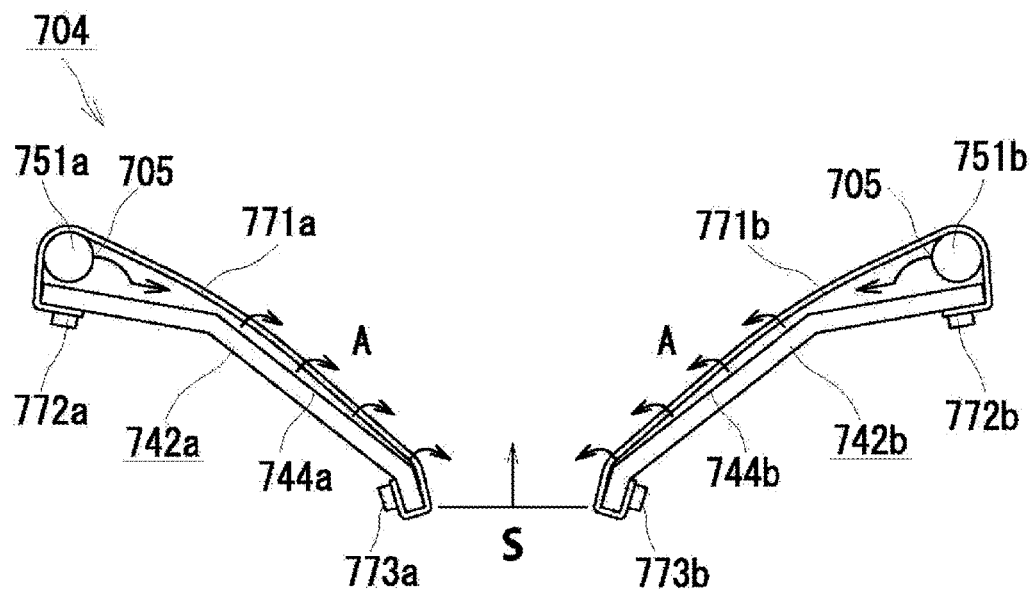
FIGS. 32A and 32B are explanatory drawings showing the effects of a chute 704 in the exemplary embodiment.
Figure 32B:
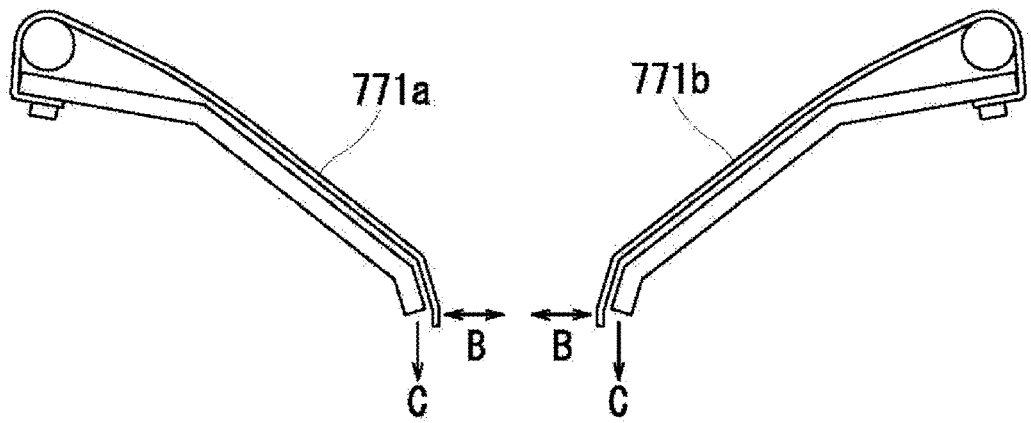

An apparatus 701 for manufacturing a three-dimensional netted structure in the seventh exemplary embodiment is explained below referring to FIG. 31 and FIGS. 32A and 32B. Reference numbers in the seventh exemplary embodiment are in the 700s corresponding to reference numbers of similar members in the sixth exemplary embodiment. Explanation of the sixth exemplary embodiment is quoted herein.

Main feature of the apparatus 701 for manufacturing a three-dimensional netted structure is that supplying pipes 751*a*, 751*b* are covered by water-permeable sheets 771*a*, 771*b* together with the longitudinal side chutes 742*a*, 742*b*. The supplying pipes 751*a*, 751*b* are located above the longitudinal side chutes 742*a*, 742*b* in a similar way as the sixth exemplary embodiment, but the water-permeable sheets 771*a*, 771*b* are located above the longitudinal side chutes 742*a*, 742*b* and the supplying pipes 751*a*, 751*b* to cover all of them. These water-permeable sheets 771*a*, 771*b* are fixed to the longitudinal side chutes 742*a*, 742*b* with the upper fixing members 772*a*, 772*b* and the lower fixing members 773*a*, 773*b* located respectively at an upper part and a lower part of the longitudinal side chutes 742*a* and 742*b*.

Operation and effects of the seventh exemplary embodiment is explained below. As shown in FIGS. 31 and 32A, cooling water supplied from the water supplying outlets 705 of the supplying pipes 751*a* and 751*b* to spaces between the longitudinal side chutes 742*a*, 742*b* and the water permeable sheets 771*a*, 771*b* and forms lower cooling water layers. Water of the lower cooling water layers flow downward, while part of water of the lower cooling water layers permeates the water-permeable sheets 771*a*, 771*b*, and forms upper cooling water layers on the upper surfaces of the water-permeable sheets 771*a*, 771*b* and flows on the surfaces of the longitudinal side chutes 742*a*, 742*b*. The surfaces of the longitudinal side chutes 742*a*, 742*b* have a good hydrophilicity due to the water-permeable sheets 771*a*, 771*b*. This enables upper cooling water layer spread evenly all over the surface of the longitudinal side chutes 742*a*, 742*b*, preventing the filaments 720 from sticking to the chute and preventing poor formation of the three-dimensional netted structure 710 due to lack of cooling water. Cooling solidification of the filament assembly 721 and formation of the three-dimensional netted structure 710 can be thus done smoothly. Different from the sixth exemplary embodiment, the upper cooling water layers are formed by water permeating from the lower surfaces to the upper surfaces of the water-permeable sheets 771*a*, 771*b* and spreads. More even upper cooling layer can be thus achieved. Water amount can be further reduced compared to the sixth exemplary embodiment. Similar to the sixth exemplary embodiment, corrugation of the three-dimensional netted structure is prevented and the water amount is reduced in the seventh exemplary embodiment compared to a comparative example without fixation of lower part of the water-permeable sheets. Fusion bonding strength can be improved by reducing water amount.

Figure 33A:
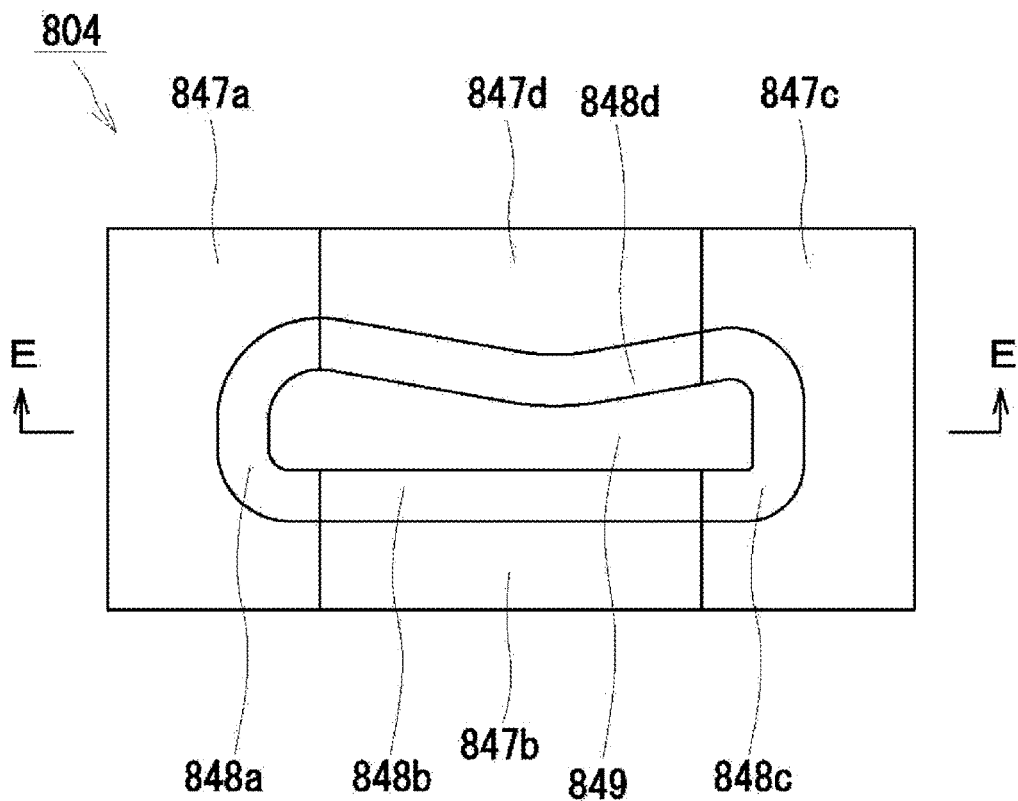
FIGS. 33A and 33B show a chute 804 in the eighth exemplary embodiment.
Figure 33B:
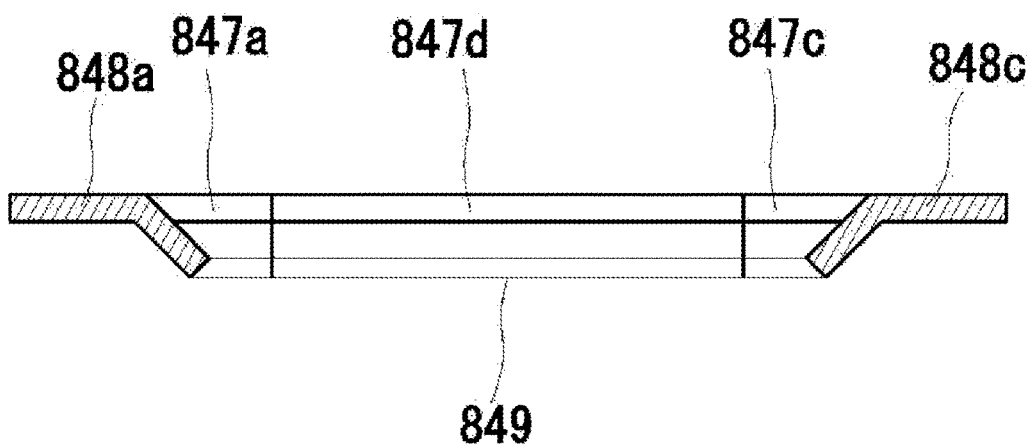

An apparatus 801 for manufacturing a three-dimensional netted structure in the eighth exemplary embodiment is explained below referring to FIGS. 33A and 33B. Reference numbers in the eighth exemplary embodiment are in the 800s corresponding to reference numbers of similar members in the sixth exemplary embodiment. Explanation of the sixth exemplary embodiment is quoted herein. For example, the three-dimensional netted structure is applied for a pillow.

A chute 804 of the apparatus 801 for manufacturing a three-dimensional netted structure has separated chutes 847*a*, 847*b*, 847*c*, 847*d* and their respective separated inclined surfaces 848*a*, 848*b*, 848*c*, 848*d*. The separated chutes 848*a*, 848*c*, 848*d* of a curved shape and separated chute 848*b* of a straight shape are assembled to form a continuous surface. In this case, cooling water may be also supplied to lateral part. However, it is sufficient to supply cooling water to longitudinal part, namely the separated chutes 847*b*, 847*d* and a little left and right from these separated chutes.

Separated type chute 804 has an advantage that three-dimensional netted structures of not only rectangular cross-sectional shape but also of arbitrary cross-sectional shapes can be manufactured by changing a part of the chute 804.

The chute 804 may be made of an integral single plate (not shown).

Usually, a surface layer having a higher apparent density and an inner layer having a lower apparent density located inside said surface layer are formed by the chute although there is the range of the grade of hardness. Feeling in bed is good and it's more comfortable. Feeling in bed is good and it's more comfortable. Moreover, combination with a non-woven fabric and combination with urethane sheet, pad, or cloth are made to last long. When something, for example mortar, is put in a core of three dimensional netted structure for shock absorber, a three dimensional netted structure can be made without a surface layer having a higher apparent density by rising water level more than standard level or by reducing the number of the filament of a surface layer. Apparent density is changed according to the speed of the draw-down apparatus.

An apparatus 901 for manufacturing a three-dimensional netted structure in other exemplary embodiment is explained below referring to FIGS. 34A and 34B. Reference numbers in the ninth exemplary embodiment are in the 900s corresponding to reference numbers of similar members in the first exemplary embodiment. Explanation of the first exemplary embodiment is quoted herein.

Figure 34A:
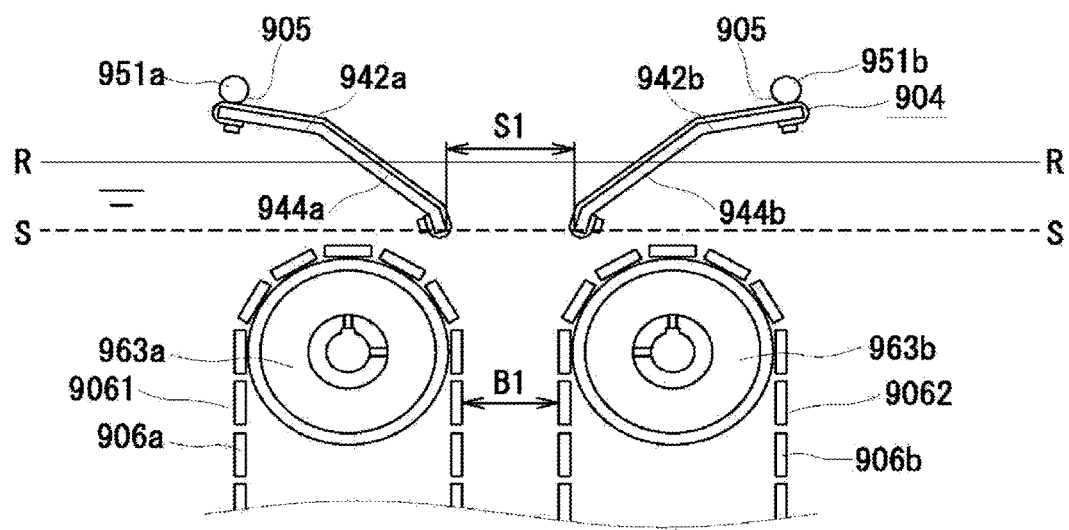
FIGS. 34 A and 34B show a water level with respect to conveyor.
Figure 34B:
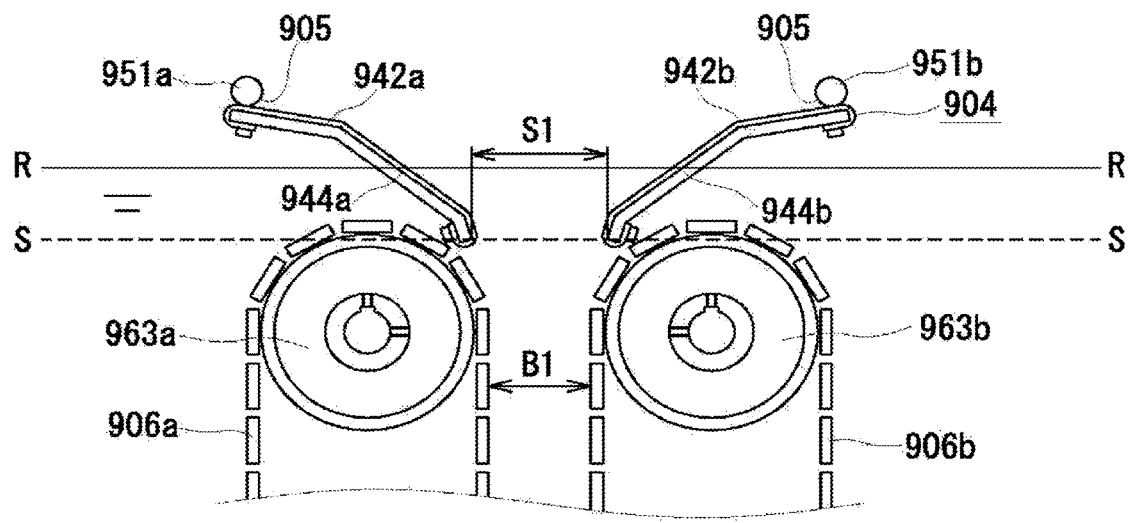

The upper end of the drawing-down units 906 may be above or under the water depending on the condition of the water level as shown in FIGS. 34A and 34B. The distance B1 between the drawing-down units 906 is narrower than the distance S1 between the chutes 942a, 942b with a % ratio of B1:S1=99–87:100, preferably 98–90:100.

Figure 35:
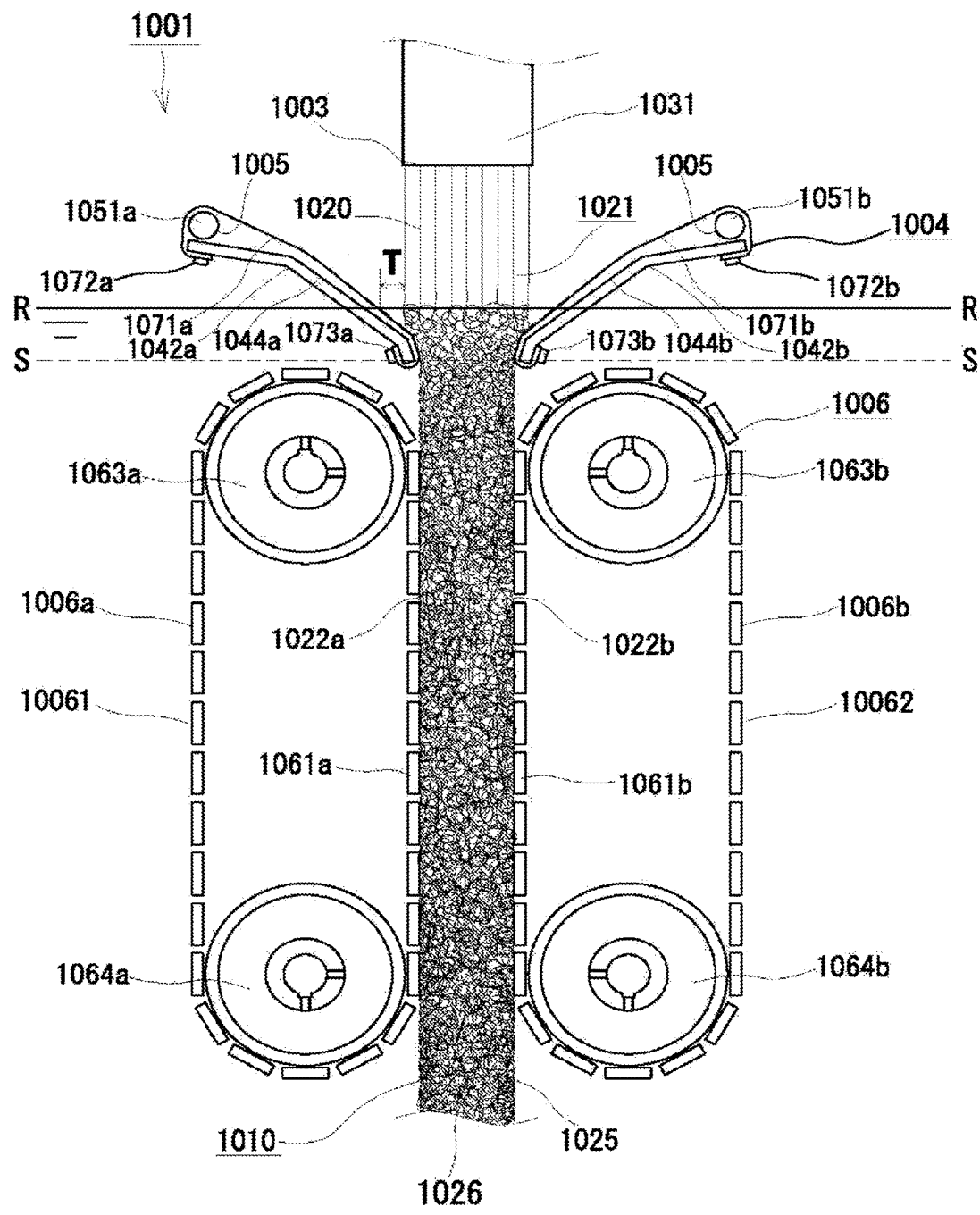
FIG. 35 shows the exemplary embodiment where a water level is shown with respect to conveyor.

An apparatus 1001 for manufacturing a three-dimensional netted structure in other exemplary embodiment is explained below referring to FIG. 35. Reference numbers in the tenth exemplary embodiment are in the 1000s corresponding to reference numbers of similar members in the first exemplary embodiment. Explanation of the first exemplary embodiment is quoted herein.

There is provided a predetermined interval T between the edge of the filament assembly 1020 and the boundary that defined by water level R and the water-permeable sheets 1071a, 1071b so that the filament assembly 1020 is set within such boundary. The filament assembly 1020 contacts with the water-permeable sheets 1071a, 1071b below water surface. The width of the 1031 can be further narrowed.

INDUSTRIAL APPLICABILITY

Three-dimensional netted structure, capable of omitting a finishing operation in a later stage, meeting a demand for obtaining netted structure of modified shapes, and improving the durability of the netted structure can be provided, and the value of industrial utilization of these inventions in various kinds of industries is very large. The three-dimensional netted structure can be applied to a seat for vehicle, a cushion, a mattress, a shock absorber, or the like.

What is claimed is:

1. A method of manufacturing a three-dimensional netted structure, the method comprising:

extruding molten filaments of a thermoplastic resin downward from a die via a mouthpiece of the die having a plurality of holes, whereby the filaments drop under the force of gravity in between chutes and a pair of drawing-down units, said drawing-down units being submerged or partly-submerged in a liquid, wherein a distance between upper parts of said chutes is wider than a width of an assembly of said extruded filaments, and a distance between lower parts of the chutes and a distance between said drawing-down units are smaller than the width of the assembly of said extruded filaments;

flowing the filaments along a liquid layer formed on said chutes to form loops in the filaments, contacting adjacent filaments with each other, entangling the filaments with each other, and dropping the filaments in-between said drawing-down units;

drawing down the assembly of extruded filaments at a speed lower than the filament dropping speed by said drawing-down units, wherein four surfaces of the assembly of said filaments are contacting said chutes and a pair of said drawing-down units before or after said drawing-down units are submerged; and cooling said resultant filaments with a liquid.

2. A method of manufacturing a three-dimensional netted structure, the method comprising:

a) extruding filaments of a thermoplastic resin downward from a die via a mouthpiece of the die, the mouthpiece having a plurality of holes, whereby the filaments drop in between drawing-down units under a force of gravity at a dropping speed and form an assembly of filaments, the drawing-down units being submerged or partly-submerged in a liquid, wherein a distance between the drawing-down units is smaller than a width of the assembly of filaments;

b) drawing down the assembly of filaments at a speed lower than the dropping speed by the drawing-down units, and contacting and compressing four surfaces of the assembly of filaments by the drawing-down units, whereby the four surfaces are formed to be flat, and a density of regions of the assembly of filaments which extend a predetermined distance from the four surfaces into an inner portion of the assembly of filaments is higher than a density of the inner portion; and c) cooling the assembly of filaments in a liquid.

3. The method of claim 2, wherein the mouthpiece further comprises a slit extending in a lengthwise direction of the mouthpiece whereby the three-dimensional netted structure further comprises a substantially non-void-carrying sheet which forms a wavy shape in a direction in which the thermoplastic resin is extruded.

4. The method of claim 2, wherein after extruding the filaments of the thermoplastic resin downward from the die via the mouthpiece, the filaments flow along a liquid layer formed on a chute to form loops in the filaments, and the filaments contact one another and become entangled with one another.

* * * * *